United States Patent
Kang et al.

(10) Patent No.: US 12,251,049 B2
(45) Date of Patent: Mar. 18, 2025

(54) BLENDER

(71) Applicant: LG ELECTRONICS INC., Seoul (KR)

(72) Inventors: Ki Joong Kang, Seoul (KR); Hyun Woo Park, Seoul (KR); Young Soo Kim, Seoul (KR); Yang Ho Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 287 days.

(21) Appl. No.: 17/694,817

(22) Filed: Mar. 15, 2022

(65) Prior Publication Data

US 2022/0322883 A1  Oct. 13, 2022

(30) Foreign Application Priority Data

Apr. 9, 2021 (KR) .................. 10-2021-0046691

(51) Int. Cl.
*A47J 43/07* (2006.01)
*A47J 43/046* (2006.01)
(Continued)

(52) U.S. Cl.
CPC ......... *A47J 43/0722* (2013.01); *A47J 43/046* (2013.01); *B01F 27/112* (2022.01);
(Continued)

(58) Field of Classification Search
CPC .................. A47J 43/0711; A47J 43/0722
See application file for complete search history.

(56) References Cited

U.S. PATENT DOCUMENTS 10,925,438 B1    2/2021 Klocker
2002/0139884 A1 10/2002 Williams et al.
(Continued)

FOREIGN PATENT DOCUMENTS

CN    201147211 Y  * 11/2008
CN    201847473 U  *  6/2011
(Continued)

OTHER PUBLICATIONS

Extended European Search Report of European Patent Office in Appl'n No. 22166102.8, dated Aug. 30, 2022.

*Primary Examiner* — Jared O Brown
(74) *Attorney, Agent, or Firm* — Bryan Cave Leighton Paisner LLP

(57) ABSTRACT

Proposed is a blender in which multiple blades have different bending or twisting angles. The blender includes a container body in which food is received, a main body provided under the container body and configured to support the container body, a container lid mounted detachably to the upper surface of the container body and configured to open and close the upper surface of the container body, and a blade assembly which crushes food contained in the container body by blades. The blade assembly includes a main blade unit having multiple main blades, and an auxiliary blade unit having an auxiliary blade located between the multiple main blades, wherein the multiple main blades have bending or twisting angles different from each other. In such a blender, the cutting efficiency of food materials is improved and noise is decreased.

15 Claims, 38 Drawing Sheets
(8 of 38 Drawing Sheet(s) Filed in Color)

(51) Int. Cl.
  *B01F 27/112* (2022.01)
  *B01F 27/808* (2022.01)
  *B01F 27/90* (2022.01)
  *B01F 101/06* (2022.01)
(52) U.S. Cl.
  CPC ............ *B01F 27/808* (2022.01); *B01F 27/90* (2022.01); *B01F 2101/06* (2022.01)

(56) References Cited

U.S. PATENT DOCUMENTS

| | | | |
|---|---|---|---|
| 2002/0176320 A1* | 11/2002 | Wulf | A47J 43/0722 366/205 |
| 2009/0114616 A1* | 5/2009 | White | A47J 43/046 366/330.3 |
| 2011/0101138 A1 | 5/2011 | Unteregger et al. | |
| 2014/0211586 A1 | 7/2014 | Conti | |
| 2016/0066748 A1 | 3/2016 | Audette | |
| 2016/0128516 A1* | 5/2016 | Gherman | A47J 43/0722 366/205 |
| 2016/0174770 A1* | 6/2016 | Lee | A47J 43/0722 464/179 |
| 2017/0208999 A1 | 7/2017 | Lee | |
| 2019/0045976 A1 | 2/2019 | Ouyang | |
| 2022/0233024 A1* | 7/2022 | Lee | A47J 43/0722 |

FOREIGN PATENT DOCUMENTS

| | | | |
|---|---|---|---|
| CN | 211355090 U | * | 8/2020 |
| CN | 213551385 U | * | 6/2021 |
| EP | 2 522 262 A1 | | 11/2012 |
| JP | 2000-005585 A | | 1/2000 |
| JP | 2014-523792 A | | 9/2014 |
| KR | 10-2007-0008547 A | | 1/2007 |
| KR | 10-1219753 B1 | | 1/2013 |
| KR | 10-1384979 B1 | | 4/2014 |
| KR | 10-2015-0019809 A | | 2/2015 |
| KR | 10-2017-0018400 A | | 2/2017 |

* cited by examiner

250

ST

New ST

SE(4)

New SE(3)

New SE(4)

New SE(5)

(a) Cavitation volume fluctuation on ST and New ST on each blade (b) Loading fluctuation on ST and New ST on each blade (a) Cavitation volume fluctuation on ST and SE on each blade (b) Loading fluctuation on ST and New ST on each blade

BLENDER

CROSS REFERENCE TO RELATED APPLICATION

The present application claims priority to Korean Patent Application No. 10-2021-0046691, filed Apr. 9, 2021, the entire contents of which are incorporated herein for all purposes by this reference.

BACKGROUND OF THE INVENTION

Field of the Invention

The present disclosure relates generally to a blender. More particularly, the present disclosure relates to a blender in which multiple blades are configured to bend or twist at angles different from each other.

Description of the Related Art

Generally, a blender is referred to as a mixer or crusher, and is mainly used for crushing or chopping food contained in a container body by rotating blades by the rotation of a motor.

In a normal blender, a main body having a motor operated by electricity is located at the lower side of the blender, and the container body receiving food is seated on the upper side of such a main body. Blades crushing or chopping food are provided inside the container body, and are rotated by the rotational force of the motor.

Accordingly, when a user drives the motor by using a manipulation button or a knob of the main body after putting food in the container body, the blades receiving the rotational force generated by the motor crush or chop food contained inside the container body.

Various types of blenders have recently been developed in accordance with a user's desire to facilitate the food intake of office workers due to their busy daily life. That is, a small hand blender has been developed, and a blender has been developed that allows food to be crushed in a larger capacity or at high speed.

However, in the structure of such a conventional container body or blade, it takes a long time to crush food and the crushing or mixing of food is not properly performed.

For example, a cutter for mixer is disclosed in Korean Patent No. 10-1219753. In this conventional technology, two cutters (blades) are configured to be symmetrical to each other at left and right sides, respectively, and are installed to be horizontal.

Accordingly, since the cutters (the blades) rotate while maintaining horizontal states thereof to the container body, crushing of food is focused only on food located at the lower end of the container body. Accordingly, the crushing and mixing of entire food are not properly performed, and further, it takes a long time to crush food.

In addition, in Korean Patent No. 10-1384979, an improved blade compared to the above blade is disclosed. That is, four blades are provided respectively at front, rear, left, and right side, and are installed to be horizontal and be bent downward. However, even in such a structure, an area in which food is cut by the blades is limited, so it takes a considerable time to process and mix food.

In order to solve the problems of these conventional blenders, as disclosed in US Patent Application Publication No. 2016-0066748A1, blades of a blender are configured to be bent upward and downward. Furthermore, to reinforce the bent portions of the blades, gussets are provided.

However, even in such a conventional technology, the crushing or noise problem of the blades is not resolved. That is, in the conventional technology, by bending the blades upward and downward, an area in which food is crushed by the blades is increased to some degree, but only four blades are provided to crush food and thus the crushing ability of food by the blades is not considerably improved.

Furthermore, although gussets are formed on the blades, the gussets function to reinforce the strength of the bent portions of the blades, the gussets do not decrease noise occurring due to the rotation of the blades, but rather generate vortices or noise.

Besides, US Patent Application Publication No. 2019-0045976A1 discloses a technology in which multiple blades are bent upward and downward to crush food. However, even in this technology, each of the blades is configured as a flat plate having a predetermined thickness, and only the number of the blades is increased, so noise is increased due to the multiple blades.

DOCUMENTS OF RELATED ART (Patent Document 1) Korean Patent No. 10-1219753
(Patent Document 2) Korean Patent No. 10-1384979
(Patent Document 3) US Patent Application Publication No. 2016-0066748A1
(Patent Document 4) US Patent Application Publication No. 2019-0045976A1

SUMMARY OF THE INVENTION

Accordingly, the present disclosure has been made keeping in mind the above problems occurring in the related art, and the present disclosure is intended to propose a blender in which the blade of an auxiliary blade unit and the blade of a main blade unit are installed to intersect with each other at a predetermined angle.

The present disclosure is intended to propose a blender in which multiple blades have bending angles different from each other.

The present disclosure is intended to propose a blender in which multiple blades have twisting angles different from each other.

The present disclosure is intended to propose a blender in which some parts of the main blades are upward blades; some parts thereof are horizontal blades; and the remaining parts thereof are downward blades.

The present disclosure is intended to propose a blender in which the leading edge portion of a blade is configured to be corrugated.

The present disclosure is intended to propose a blender in which noise generated due to vortex occurring at the rear of a blade is decreased.

In order to achieve the above objectives, according to one aspect of the present disclosure, there is provided a blender including a main blade unit provided with multiple main blades, and an auxiliary blade unit having an auxiliary blade located between the multiple main blades. Accordingly, food with a large volume may be easily cut.

In the blender of the present disclosure, the multiple main blades constituting the main blade unit may have bending angles different from each other. Accordingly, the cutting of food (materials) may be evenly performed.

In the blender of the present disclosure, the multiple main blades constituting the main blade unit may have twisting angles different from each other. Accordingly, lift and non-uniform vortices may be generated.

In the blender of the present disclosure, the multiple main blades may include a horizontal blade, an upward blade directed more upward than the horizontal blade, and a downward blade directed more downward than the horizontal blade.

Furthermore, the upward blade may be larger in number than the downward blade.

In addition, in the blender of the present disclosure, the leading edge portion of each of the main blades may have a corrugated shape.

The corrugated shape may include at least three corrugated shapes.

The corrugated shapes may correspond to the shapes of sawteeth.

In the blender of the present disclosure, the auxiliary blade unit may have a size smaller than the size of the main blade unit.

The auxiliary blade of the auxiliary blade unit and the main blade of the main blade unit may be installed to intersect with each other.

The auxiliary blade of the auxiliary blade unit and the main blade of the main blade unit may be installed to intersect with each other at 45°.

The main blades may include four main blades installed at equal intervals from each other.

The multiple main blades may include one horizontal blade, two upward blades and one downward blade.

The upward blades may have bending angles of 18° and 24°, respectively.

The bending angle of the downward blade may be −7°.

The auxiliary blade of the auxiliary blade unit may be installed to be directed upward.

The auxiliary blade of the auxiliary blade unit may have an upward bending angle of 45° or 60°.

In the blender of the present disclosure, at least one main blade of the multiple main blades may have a shape twisted at a predetermined angle.

The multiple main blades may have twisting angles different from each other.

Each of the multiple blades may have a twisting angle of a zero or positive value.

At least one of the main blades may have a twisting angle of 2.1°.

One of the multiple main blades may have a twisting angle of 11°.

The blender of the present disclosure may have the following effects.

First, in the blender of the present disclosure, a blade assembly which crushes food may be provided with the auxiliary blade unit in addition to the main blade unit. Accordingly, food may be cut or crushed doubly by the auxiliary blade unit and the main blade unit, so the crushing efficiency of the blender may be improved.

Second, in the blender of the present disclosure, the auxiliary blade of the auxiliary blade unit may be located between the main blades of the main blade unit. Accordingly, food contained in the container body may sequentially hit the auxiliary blade of the auxiliary blade unit and the main blades of the main blade unit to be cut, and thus the load of a motor assembly may be decreased. That is, food may be cut or crushed with a load smaller than a load generated when the food is cut by one blade unit.

Third, in the blender of the present disclosure, the auxiliary blade of the auxiliary blade unit may be configured to have length shorter than the length of the main blade of the main blade unit. Accordingly, food having a predetermined size may first be located between the main blades and some of the food may be cut by the auxiliary blade, and then the remaining food or more portion of the food than the part of the food cut by the auxiliary blade may be cut by the main blades, thereby preventing failure or error of the blender due to overload of the motor assembly or the blade assembly.

Fourth, in the blender of the present disclosure, the auxiliary blade of the auxiliary blade unit may be configured to be bent more upward than the main blade of the main blade unit. That is, the auxiliary blade may be located at an upper center relative to the main blade. Accordingly, the auxiliary blade bent upward may prevent cut food from gathering in the center of the container body or may cut food gathered in the center and create a vortex such that the food is mixed well.

Fifth, in the blender of the present disclosure, the main blade may include even-numbered main blades provided to be symmetrical to each other relative to a main coupling part. The multiple main blades may be configured to be bent upward and downward relative to the main coupling part, and the auxiliary blade may be bent more upward than the main blade. Accordingly, an area in which food is crushed by the blades of the blade assembly may be increased up to the lower and central portions of the container body, thereby improving the crushing efficiency of the blender.

Sixth, in the blender of the present disclosure, the multiple main blades constituting the main blade unit may have bending angles different from each other. Accordingly, food contained in the container body may be evenly cut, and each blade may be little influenced by the rear vortex of a blade anterior thereto, thereby decreasing the rotational load or noise of the blender.

Seventh, in the blender of the present disclosure, the multiple main blades constituting the main blade unit may have twisting angles (angles of attack) different from each other. Accordingly, food contained in the container body may be evenly mixed, and lift and non-uniform vortices may be generated.

Eighth, in the blender of the present disclosure, the leading edge portion of a blade may have a sawtooth-shaped corrugation. Accordingly, food may be introduced into the recess of the leading edge portion of the blade and may be cut without being removed therefrom such that even relatively soft food is efficiently cut, thereby improving a crushing function.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objectives, features, and other advantages of the present disclosure will be more clearly understood from the following detailed description when taken in conjunction with the accompanying drawings, in which.

DETAILED DESCRIPTION OF THE INVENTION

Hereinafter, a blender of the present disclosure will be described in detail with reference to the accompanying drawings.

Figure 1:
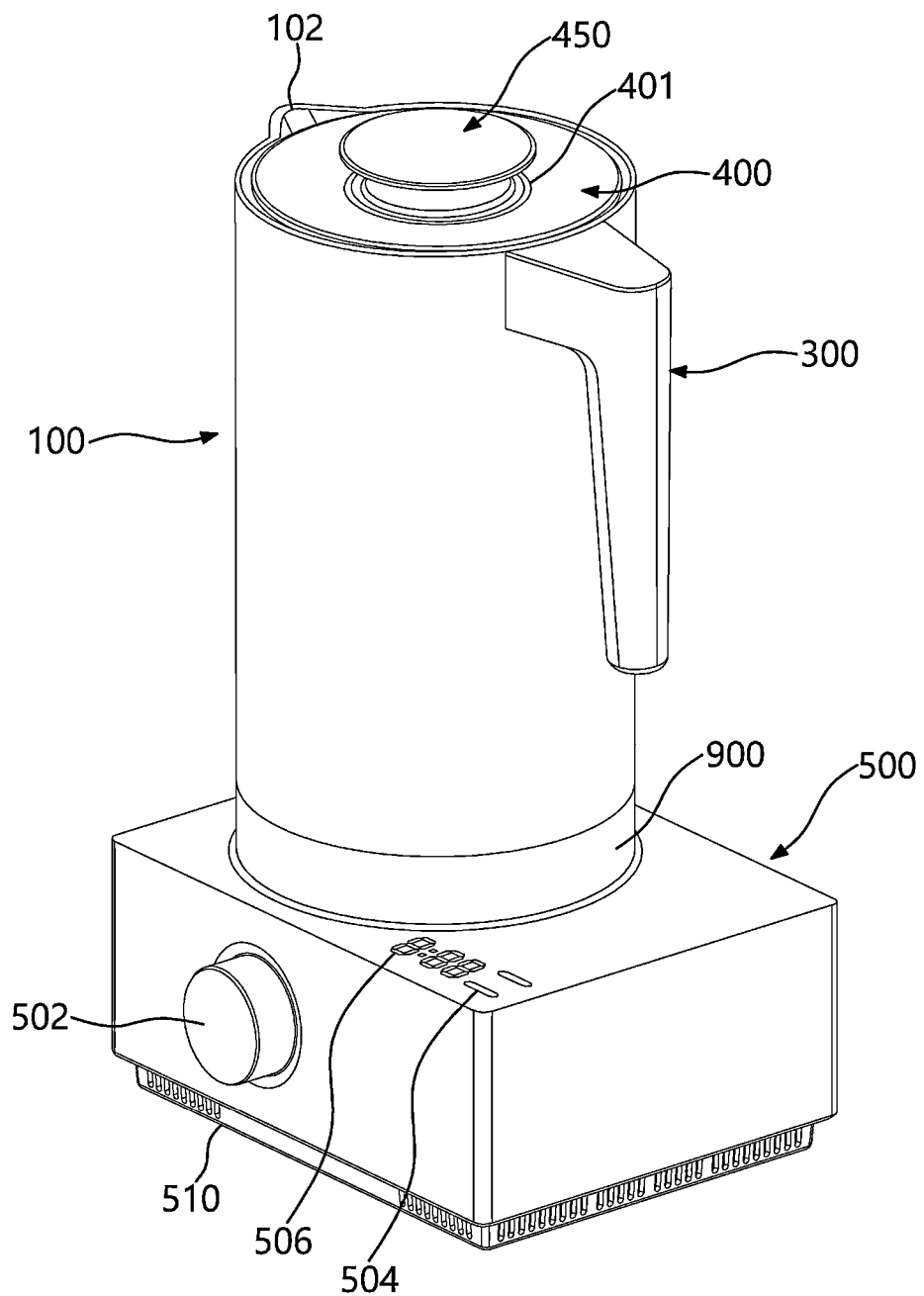
FIG. 1 is a perspective view illustrating the configuration of a blender according to an exemplary embodiment of the present disclosure.
Figure 2:
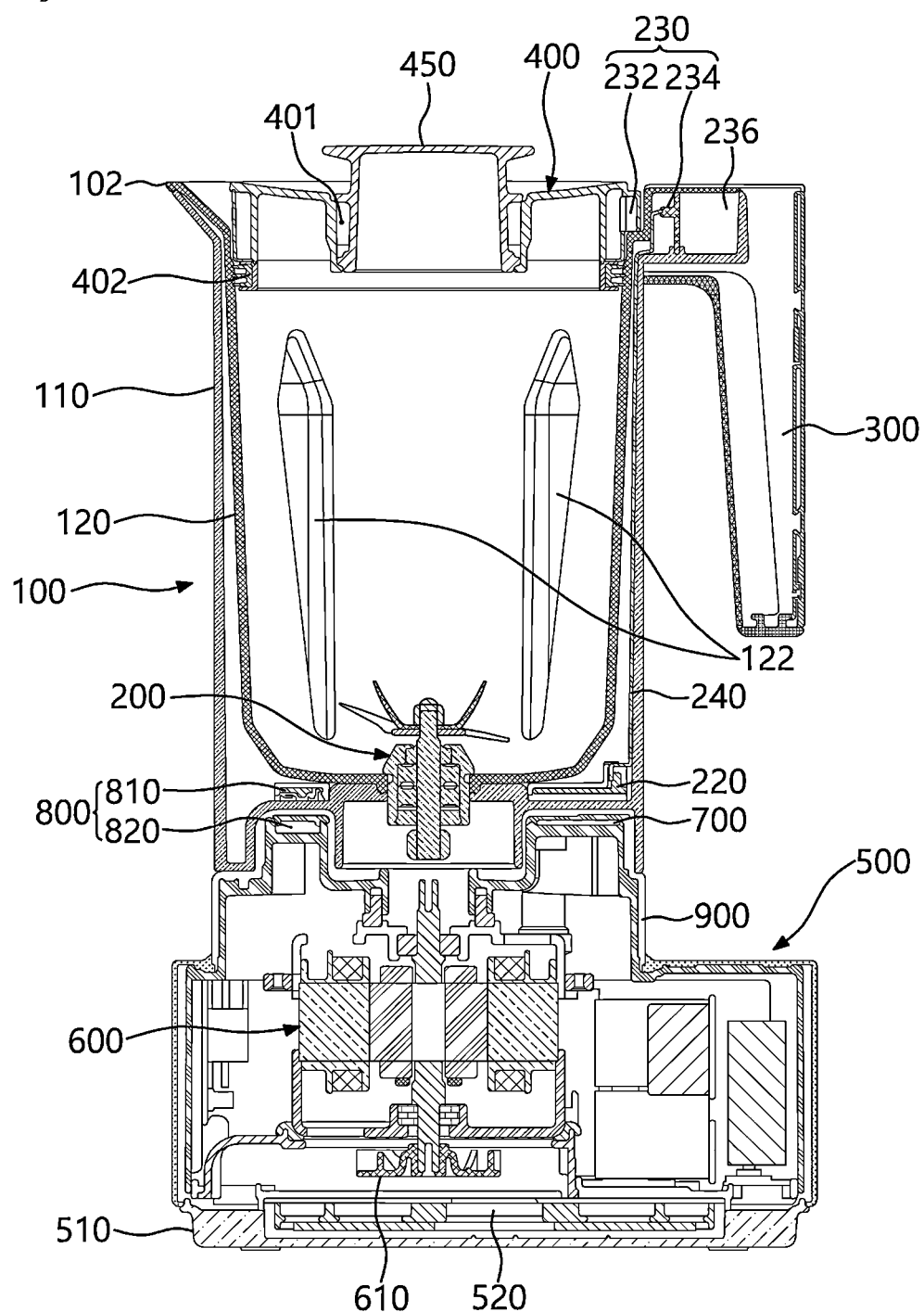
FIG. 2 is a vertical sectional view illustrating the inner configuration of the blender of the present disclosure.

FIGS. 1 and 2 are a perspective view and a vertical sectional view, respectively, illustrating the configuration of the blender according to an embodiment of the present disclosure.

As illustrated in these drawings, the blender of the present disclosure may include a container body 100 located relatively at the upper side thereof and configured to receive food, and a main body 500 provided at the lower side of the container body 100 and configured to support the container body 100.

The container body 100 may be a part in which food is received and the process of cutting or crushing the food occurs, and the main body 500 may support the container body 100. Furthermore, multiple parts may be provided inside such a main body 500 to control the cutting or crushing of the food received in the container body 100, or to supply electric power.

The container body 100 may have a cylindrical shape as a whole, and the upper surface thereof may be configured to be open to introduce food thereinto.

The container body 100 may be made of a transparent material such that the inside thereof can be seen from the outside. That is, the container body 100 may be made of glass or transparent plastic so that a user can check the state of food contained inside the container body 100 from the outside.

A blade assembly 200 may be provided in the inner lower portion of the container body 100. The blade assembly 200 may have multiple blade units mounted rotatably thereto such that the blade units chop or crush food received in the container body 100.

The blade assembly 200 may be connected to a motor assembly 600 to be described below, and be configured to be rotated by a rotational force generated by the motor assembly 600.

The container body 100 may be formed to have a double structure. That is, the container body 100 may be composed of an outer container body 110 constituting the appearance thereof and an inner container body 120 provided inside the outer container body 110. The outer container body 110 and the inner container body 120 may be configured to be in contact with each other or to be spaced apart by a predetermined distance from each other. Furthermore, only a portion of each of the outer container body 110 and the inner container body 120 may be configured to be in contact with each other.

At least one inner guide 122 may be provided in the container body 100 to have a predetermined length in a vertical direction. The inner guides 122 are intended to guide food rotating in the container body 100, and may be configured in pairs symmetrical to each other in the front and rear or left and right of the inner container body 120.

A handle 300 grasped by a user may be formed on the right surface of the container body 100 by protruding therefrom to the right side. Such a handle 300 may be configured such that a user can grasp the handle with his or her one hand, and in the present disclosure, the upper end of the handle is illustrated to be connected integrally to the upper surface of the container body 100.

Meanwhile, a spout 102 may be formed at the opposite side to the handle 300.

As illustrated in FIG. 2, the spout 102 may be formed on the upper end of the left surface of the container body 100, and may be a part through which food completely crushed in the container body 100 is guided to be easily poured to the outside. Accordingly, such a spout 102 may be configured to more protrude gradually upward in the left direction.

The upper surface of the container body 100 may be covered by a container lid 400. That is, the container lid 400 may be removably mounted to the upper surface of the container body 100, and open and close the upper surface of the container body 100.

The container lid 400 may cover the upper surface of the container body 100 such that food contained in the container body 100 is not removed to the outside and foreign matter of the outside is not introduced into the container body 100.

The container lid 400 may be configured to be mounted to the container body 100 by pressing or rotating the container lid 400 by a user. A gasket 402 may be provided in the outer circumferential surface of the container lid 400 and block a gap between the container lid 400 and the container body 100. Of course, such a gasket 402 may function to allow the container lid 400 to be pressed and fitted to the container body 100.

A cap 450 may be provided in the container lid 400. That is, a lid hole 401 which is a circular hole having a predetermined size may be formed vertically through the center of the container lid 400, and the cap 450 may be mounted to such a lid hole 401 and cover the lid hole 401.

As illustrated in the drawings, the cap 450 may be installed at the center of the container lid 400, and as a whole, may be formed to have a diameter smaller than the diameter of the container lid 400. The cap 450 may be removably mounted to the container lid 400 by forcible fitting by pressing or by rotating.

In the present disclosure, it is illustrated that the cap 450 is configured to be attached to and detached from the container lid 400 by being rotated, and a detailed configuration thereof will be described below.

Since the cap 450 may be removably mounted to the container lid 400, a user may see food contained inside the container body 100 by opening only the cap 450 without opening the container lid 400, and insert food into the container body 100 by opening the cap 450, or insert a mixing rod thereinto and stir the food contained inside the container body 100.

The upper end of the cap 450 may be configured by protruding toward a side upper than the upper end of the container lid 400, so the cap 450 may function as the handle of the container lid 400 grasped by a user when the user opens or closes the container lid 400.

As illustrated in the drawings, the main body 500 may be configured to have a hexahedral shape having the shape of a rectangular barrel as a whole and be provided under the container body 100 so as to support the container body 100, wherein the motor assembly 600 and multiple electronic parts such as a PCB (a printed circuit board) may be installed inside the main body 500. Of course, the external shape of such a main body 500 may be variously changed as required.

The motor assembly 600 may be provided at the center of the inside of the main body 500. The motor assembly 600 may generate a rotational force by power supplied from the outside such that the blades constituting the blade assembly 200 rotate.

Accordingly, the lower end of the blade assembly 200 may be connected to the upper end of the motor assembly 600.

A knob 502 may be provided on the front surface of the main body 500 by protruding forward therefrom. The knob 502 is intended to set the operation of the blender of the present disclosure, and may be rotatably mounted to the main body 500.

The knob 502 may be configured to control the operation intensity of the motor assembly 600. That is, the knob 502 may be configured to change the rotational speed of the motor assembly 600 to high speed or low speed by the clockwise or counterclockwise rotation of the knob 502.

Meanwhile, a manipulation part 504 may be provided on the upper surface of the main body 500.

The manipulation part 504 is intended to manipulate the blender of the present disclosure by touching, and may be configured to manipulate the starting and stopping of the operation of the blender.

Of course, the knob 502 and the manipulation part 504 may be configured to selectively set or manipulate the operation of the blender, or may be configured to overlap each other in the functions of the setting and manipulating. That is, for convenience, the knob 502 and the manipulation part 504 may be configured to overlap each other in the functions such that a user may select any one of the knob 502 or the manipulation part 504 to set or manipulate the operation of the blender.

A display part 506 may be provided at a side of the manipulation part 504 (a left side of FIG. 1). That is, the display part 506 may be provided on the upper surface of the main body 500. Such a display part 506 may function to display the state of the operation of the blender such that a user can check the state thereof. Accordingly, such a display part 506 may be configured as a seven-segment display.

A cooling fan 610 may be provided at the lower side of the motor assembly 600.

The cooling fan 610 may be connected to the lower end of the motor assembly 600 and be rotated by a rotating force generated by the motor assembly 600, thereby introducing an outside air into the main body 500 and forcing the flow of the air. Accordingly, the cooling fan 610 may allow air to be introduced into the main body 500 from the outside and to flow therein, and function to cool parts such as the PCB provided in the main body 500.

A base end 510 may be provided on the lower surface of the main body 500.

The base end 510 may be formed by protruding downward from the lower surface of the main body 500 and may have a space having a predetermined size therein to receive a wireless power module 520. The wireless power module 520 may function to receive external wireless power in a wireless method using induced electromotive force and to supply the wireless power to the motor assembly 600 provided inside the main body 500.

Meanwhile, a detection system may be provided in the main body 500 and the container body 100 described above so as to detect whether the container lid 400 is mounted to the container body 100.

The detection system may allow an electric circuit (not shown) which can be turned on and off to be formed in the container body 100, and allow such an electric circuit to form a closed circuit, so that the detection system may be configured to detect whether electric current flows in the closed circuit by voltage supplied by the main body 500.

More particularly, the detection system may include: a power transmission means 700 provided in the main body 500 and configured to supply power to the container body 100; a power reception means 220 provided in the container body 100 and configured to receive the power supplied by the power transmission means 700; an on/off means 230 provided at the upper side of the container body 100 and configured to turn on/off the electric circuit formed in the container body 100 depending on whether the container lid 400 is closed; a transparent electrode film 240 made of a transparent material provided on a surface of the container body 100 and connecting the power reception means 220 and the on/off means 230 to each other so as to allow electricity to flow therebetween; and a detection means 800 provided on one side of the main body 500 or the container body 100 and allowing the electric circuit formed by the connection of the power reception means 220 with the on/off means 230 to form a closed circuit so as to detect whether electric current flows.

The power transmission means 700 is intended to transmit power, which is introduced to the main body 500 from the outside of the main body 500 or stored in advance in the main body 500, to the container body 100, and may use an induction coil in which induced electromotive force can be generated.

The power reception means 220 is intended to receive the power transmitted from the main body 500, and may be configured to have a structure corresponding to the structure of the power transmission means 700. That is, the power reception means 220 may use a coil such that power is transmitted by induced electromotive force generated between the power transmission means 700 and the power reception means 220.

The power transmission means 700 and the power reception means 220 may be located to be adjacent to each other so as to generate induced electromotive force. Accordingly, in the present disclosure, the power transmission means 700 is illustrated to be mounted to the right upper end of the main body 500, and the power reception means 220 is illustrated to be mounted to the right lower end of the container body 100.

The on/off means 230 may be configured to turn on/off the electric circuit (not shown) formed in the container body 100 depending on whether the container lid 400 is mounted to the container body 100, and may include a permanent magnet 232 and a reed switch 234 provided in the container lid 400 and the container body 100, respectively.

As illustrated in FIG. 2, in the present disclosure, the permanent magnet 232 is illustrated to be mounted to the right edge of the container lid 400, and the reed switch 234 is illustrated to be mounted to the right upper end (a portion of the handle) of the container body 100.

More specifically, the reed switch 234 may be mounted to be received in a reed switch groove 236 formed in the upper end portion of the handle 300.

It is widely known that the reed switch has magnetic movable contacts enclosed in a glass tube, and when a magnet approaches the reed switch, the contacts in the glass tube contact with each other. Here, further detailed description of the configuration and principle of the reed switch will be omitted.

Of course, except for the use of the permanent magnet 232 and the reed switch 234 as such an on/off means 230, other electric on/off means or mechanical structures may be used to turn on/off the electric circuit, and the mounting positions of the permanent magnet 232 and the reed switch 234 respectively mounted to the container lid 400 and the container body 100 may be exchanged oppositely.

Various types of electrical devices or structures having a function that can detect whether electric current flows in the electric circuit formed in the container body 100 turned on/off by the on/off means 230 may be used as the detection means 800. However, in the present disclosure, a photosensor is used to detect light as an example.

Accordingly, the detection means 800 may include a light transmission module 810 provided in the container body 100 to generate light, and a light reception module 820 provided in the main body 500 to receive the light transmitted by the light transmission module 810.

The light transmission module 810 and the light reception module 820 may be located at positions adjacent to each other. In the present disclosure, as illustrated in FIG. 2, the light transmission module 810 may be located on the left lower end of the container body 100, and the light reception module 820 may be located on the left upper end of the main body 500.

The light transmission module 810 may use an LED that emits light by electricity, and the light reception module 820 may use the photosensor that receives light and converts the light into an electrical signal.

In addition, the transparent electrode film 240 may be provided between the outer container body 110 and the inner container body 120. More particularly, the transparent electrode film 240 may be attached to the inner surface of the outer container body 110.

The transparent electrode film 240 may be made of a transparent material such as an ITO film (an indium-tin oxide film) and may be attached to the surface of the container body 100, and may allow the on/off means 230 provided on the upper side of the container body 100 to be connected to the power reception means 220 and the light transmission module 810 provided on the lower end portion of the container body 100 so as to form the electric circuit.

Accordingly, the transparent electrode film 240 may be attached vertically and longitudinally on the surface of the container body 100 made of a transparent material and may function to guide the transmission of an electrical signal between the upper and lower ends of the container body 100.

Accordingly, when the container body 100 is made of a transparent material, and the transparent electrode film 240 is also made of a transparent material, the transparent electrode film 240 may not be visually exposed, so the appearance of the container body 100 may not be damaged and the design thereof may be maintained.

Furthermore, when the transparent electrode film 240 is attached to the surface of the container body 100, the transparent electrode film 240 may have a hole formed therein to remove air bubbles that may be generated between attached surfaces. That is, a perforated hole may be added to the center of the transparent electrode film 240 made of the ITO film to allow the air bubbles to escape therethrough such that the generation of the air bubbles is prevented.

Meanwhile, a seating step 900 may be formed on the upper surface of the main body 500 by protruding upward therefrom.

The seating step 900 may be configured to have a circular shape corresponding to the shape of the lower end of the container body 100 such that the lower end of the container body 100 is mounted to the seating step 900 to be vertically removed therefrom.

In addition, the container body 100 may be configured as a double structure. That is, the container body 100 may be composed of the outer container body 110 and the inner container body 120, and the inner guides 122 may be formed on the inner surface of the inner container body 120 by protruding inward therefrom.

Hereinafter, the configuration of the container body 100 will be described in detail.

Figure 3:
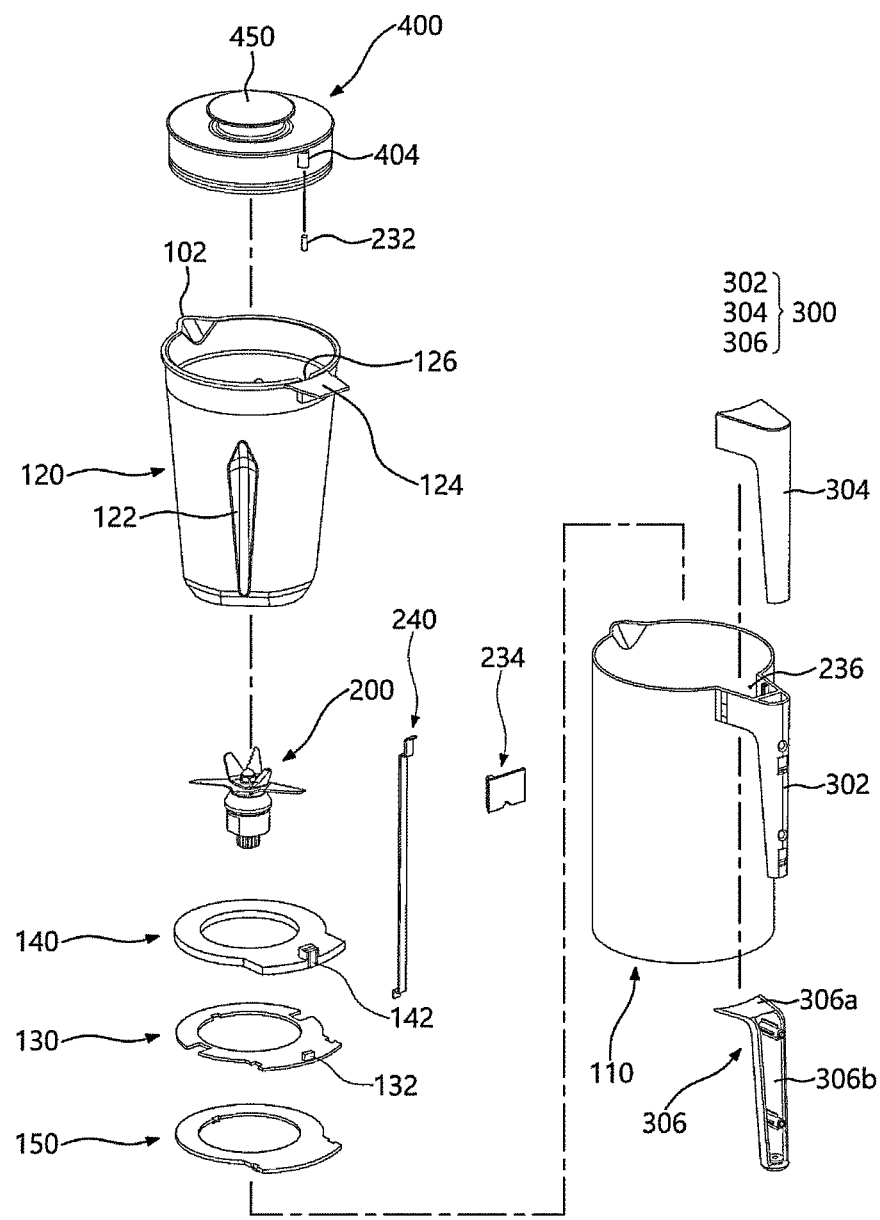
FIG. 3 is an exploded perspective view illustrating the detailed configuration of the container body constituting the blender according to the embodiment of the present disclosure.
Figure 4:
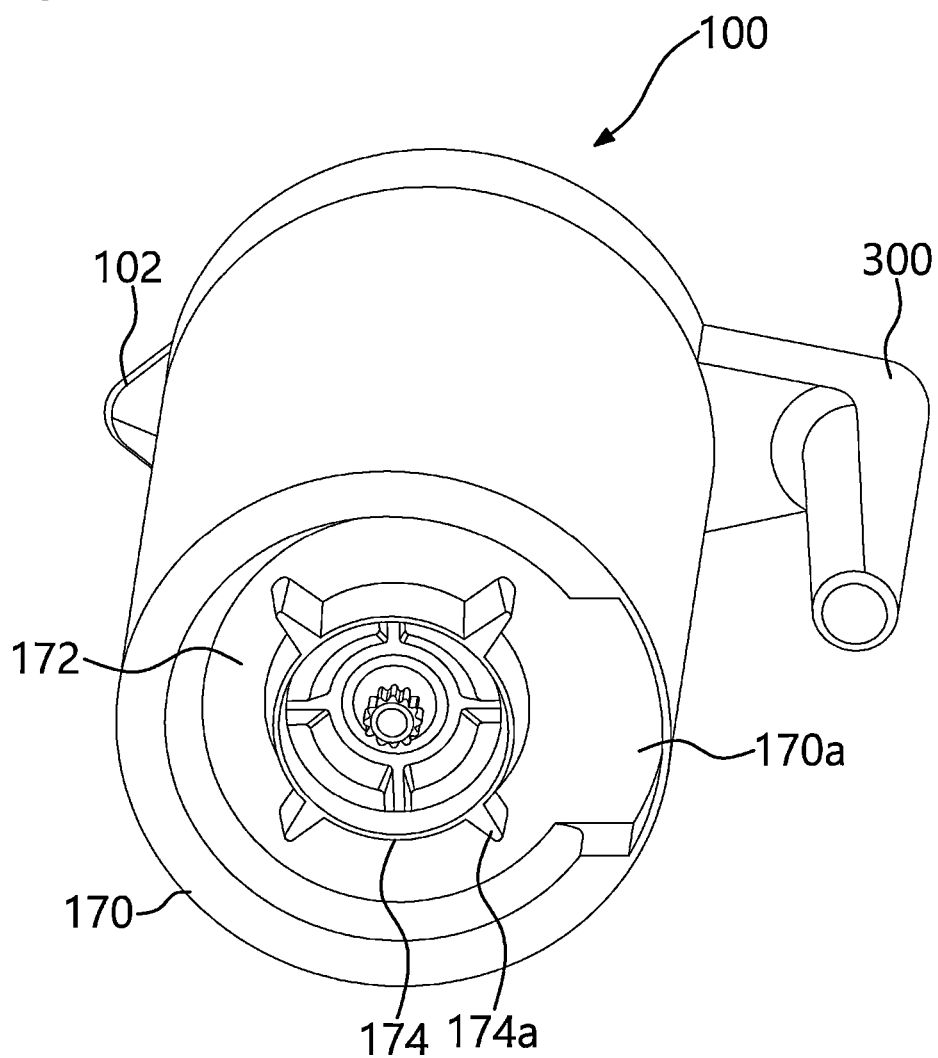
FIG. 4 is a bottom perspective view of the container body constituting the blender according to the embodiment of the present disclosure.

FIG. 3 illustrates an exploded perspective view of the container body 100, and FIG. 4 illustrates a bottom perspective view of the container body 100.

As illustrated in these drawings, the container body 100 may be configured as a double structure having a cylindrical shape as a whole. That is, the container body 100 may include the outer container body 110 constituting the appearance thereof, and the inner container body 120 provided inside the outer container body 110.

The container body 100, that is, the outer container body 110 and the inner container body 120 may be made of a transparent material. That is, the container body 100 may be made of a transparent material such as glass, Tritan, or transparent plastic such that a user can check the state of food contained inside the container body 100 from the outside.

The outer container body 110 may constitute the appearance of the container body, and be configured to have a cylindrical shape with the same top and bottom sizes, and a main handle 302 may be formed on the outer right surface of the outer container body 110 by protruding therefrom to the right such that a user can grasp the main handle.

The main handle 302 may be formed to have an L shape, and the upper end portion thereof may be connected to the right upper end of the outer container body 110. The main handle 302 may be formed integrally with the outer container body 110 by injection molding. Accordingly, the main handle 302 formed integrally with the outer container body 110 may have improved strength and durability compared to the main handle formed as a part separate from the outer container body 110 to be fixed thereto.

The reed switch groove 236 receiving the reed switch 234 may be formed at a portion at which the main handle 302 is connected to the container body 100. That is, the reed switch groove 236 may be formed in the upper end of the main handle 302, and may provide space to mount the reed switch 234 therein, and the left of such a reed switch groove 236 may be open.

An outer handle 304 and an inner handle 306 may be provided respectively on the outer and inner sides of the main handle 302. That is, as illustrated in FIG. 3, the outer handle 304 may be provided at the right of the main handle 302, and the inner handle 306 may be provided at the left of the main handle 302.

More particularly, the outer handle 304 may also be configured to have an L shape as a whole as does the main handle 302, and to cover the upper surface, right surface, and front and rear surfaces of the main handle 302. The outer handle 304 may be made of a material such as stainless steel that has a smooth surface and is resistant to rust, and may not break easily and look beautiful to a user.

The inner handle 306 may cover the left surface and lower surface of the main handle 302, and may be configured to have an L shape corresponding to the left and lower surfaces of the main handle 302, and at least a portion thereof may be made of an elastic material.

Particularly, the inner handle 306 may include a connection part 306a covering the lower part of the upper end of the main handle 302, and a grasping part 306b extending downward from the connection part 306a and covering the left surface of the main handle 302.

Like the outer handle 304, the connection part 306a may be made of a smooth and strong material, and the grasping part 306b may be a part on which a user's fingers are covered, and be made of an elastic material. That is, the connection part 306a may be made of stainless steel, and the grasping part 306b may be made of an elastic material such as rubber that can give a user a soft touch since the four fingers (except for the thumb) of the user cover the grasping part.

The inner container body 120 may be configured to have size (a diameter) smaller than the size (a diameter) of the outer container body 110 and may sit inside the outer container body 110.

The inner container body 120 may be configured to have a cylindrical shape having an open upper part. More particularly, as illustrated in FIG. 3, the inner container body 120 may be configured to have a tapered shape having a diameter gradually decreasing toward the lower side thereof.

In addition, as described above, the multiple inner guides 122 may be vertically formed on the inner surface of such an inner container body 120, and the blade assembly 200 may be mounted to the lower end of the inner container body 120.

The spout 210 may be formed on the left upper end of the inner container body 120 by protruding therefrom to the left, and a covering end 124 may be formed on the right upper end of the inner container body 120 by extending therefrom to the right.

The covering end 124 may cover the upper surface of the reed switch groove 236 of the outer container body 110. The covering end 124 may be configured to be a flat plate having a predetermined thickness, and to have width gradually decreasing toward the right to correspond to the size of the upper end of the reed switch groove 236.

The blade assembly 200 may be mounted to the lower end of the inner container body 120.

The blade assembly 200 may allow food to be finely crushed or mixed by the blades, wherein the blades configured to be rotated by receiving a rotational force generated from the motor assembly 600 and to crush food may be formed to protrude toward the upper side of the bottom surface of the inner container body 120.

A magnet holder 404 may be provided on the outer circumferential surface of the container lid 400. That is, as illustrated in FIG. 3, the magnet holder 404 may be formed on the outer circumferential surface of the container lid 400 by protruding therefrom to the outside, wherein the permanent magnet 232 may be mounted in the magnet holder 404.

The permanent magnet 232 may control the turning on/off of the reed switch 234 when the container lid 400 is mounted to or removed from the container body 100.

A coil holder assembly may be provided between the outer container body 110 and the inner container body 120.

The coil holder assembly may include a coil holder 130 having an induction coil, and an upper cover 140 and a lower cover 150 covering the upper and lower sides of the coil holder 130, respectively.

Specifically, the coil holder 130 may be provided between the bottom surface of the outer container body 110 and the lower surface of the inner container body 120, and the power reception means 220 and the light transmission module 810 may be mounted to such a coil holder 130.

The entirety of the coil holder 130 may have the shape of a circular ring having a predetermined thickness, and the power reception means 220 may be provided at the right end of the coil holder 130 having such a ring shape. That is, although not shown in detail, an induction coil which receives power may be provided at the right end of the coil holder 130, and constitute the power reception means 220.

The power reception means 220 mounted to the coil holder 130 may be embodied with a reception induction coil patterned on the same plane as the PCB. That is, in the power reception means 220 according to the embodiment of the present disclosure, the reception induction coil provided on the lower surface of the coil holder 130 may be configured to be wound multiple times on the PCB in a spiral shape relative to a reception center point.

In addition, the light transmission module 810 may be provided on the lower surface of the coil holder 130.

The light transmission module 810 may emit light by power supplied from the power reception means 220. The light transmission module 810 may be configured as a part of the detection means 800, and use the LED emitting light as described above.

The power reception means 220 and the light transmission module 810 may be electrically connected to each other. That is, the power reception means 220 and the light transmission module 810 may be configured to form the closed circuit in cooperation with the on/off means 230. Accordingly, the power reception means 220 and the light transmission module 810 provided in the coil holder 130, and the on/off means 230 may be configured to be electrically connected to each other by the PCB.

In addition, although not shown, the coil holder 130 may further include a conversion module that converts alternating current (AC) to direct current (DC).

A holder terminal 132 may be provided on the upper surface of the right end of the coil holder 130.

The holder terminal 132 may be a part to which the lower end of the transparent electrode film 240 is inserted and connected.

As illustrated in FIG. 3, the coil holder 130 may be configured to have an approximate ring shape as a whole, and the right end of the coil holder 130 may be configured to be relatively large in width such that the power reception means 220 may be mounted thereto.

Multiple grooves may be formed in the outer and inner circumferential surfaces of the coil holder 130.

The coil holder 130 may be protected by the upper cover 140 and the lower cover 150. That is, the upper cover 140 and the lower cover 150 may be provided on the upper surface and lower surface of the coil holder 130, respectively, so as to cover the upper surface and lower surface thereof, the upper cover and lower cover having shapes corresponding to the upper surface and lower surface of the coil holder 130, respectively.

A terminal holder 142 may be formed on the right end of the upper cover 140 by protruding upward therefrom to receive the holder terminal 132 of the coil holder 130 therein. Accordingly, the holder terminal 132 may be received in the terminal holder 142 by being introduced thereto from the lower side of the terminal holder 142, and the upper part of such a terminal holder 142 may be formed to be partially open and may have a film hole 142*a* such that the lower end of the transparent electrode film 240 passes therethrough.

A hook may be formed on the upper cover 140 such that the upper cover 140 is coupled to the lower cover 150.

As described above, the transparent electrode film 240 may be made of a transparent material such as the ITO film, and may be configured to have length corresponding to the vertical length of the container body 100.

The transparent electrode film 240 may be provided between the outer container body 110 and the inner container body 120. Accordingly, when the transparent electrode film 240 is provided between the outer container body 110 and the inner container body 120, the transparent electrode film 240 may be prevented from being in contact with food contained in the inner container body 120, and may be prevented from being in contact with foreign matter outside of the outer container body 110.

The transparent electrode film 240 may be attached to the surface of the outer container body 110, or the surface of the inner container body 120. That is, the transparent electrode film 240 may be attached to the inner surface of the outer container body 110 or the outer surface (an outer circumferential surface) of the inner container body 120.

Here, the transparent electrode film 240 attached vertically to the inner surface of the outer container body 110 will be described as an example.

As is illustrated in FIG. 3, each of the upper and lower ends of the transparent electrode film 240 may be bent at least one time. The lower end of the transparent electrode film 240 may pass through the terminal holder 142 of the upper cover 140 and be connected to the holder terminal 132 of the coil holder 130, and the upper end of the transparent electrode film 240 may be connected to the reed switch 234.

A film guide 160 to which the transparent electrode film 240 is attached may be formed vertically on the inner surface of the outer container body 110. That is, the film guide 160 may be formed vertically and longitudinally on the right inner surface of the outer container body 110 and may guide the attachment of the transparent electrode film 240.

A magnet groove 126 may be formed in the upper end of the inner container body 120 by being recessed therefrom to the outside such that the permanent magnet 232 is received in the magnet groove 126. That is, the upper end of the right surface of the inner container body 120 may be bent to be stepped to the right so as to form the magnet groove 126, and such a magnet groove 126 may be a part in which the permanent magnet 232 is located.

Meanwhile, the lower surface of the container body 100 may be configured to have a shape corresponding to the shape of the upper surface of the main body 500 such that the container body 100 is easily attached to and detached from the upper surface of the main body 500.

More specifically, the container body 100 may be mounted to the seating step 900 of the main body 500 to be described below. Accordingly, the lower surface of the container body 100 may be configured to have shape corresponding to the shape of the upper end of the main body 500, so the container body 100 may be stably mounted to and easily removed from the main body 500.

A container body end 170 having a predetermined width may be formed on the lower surface of the container body 100 by protruding downward therefrom. The container body end 170 may be a part which is in contact with the upper surface of a lower step 910 of the main body 500 to be described below, and may be configured to have a shape corresponding to the upper surface of the lower step 910.

An upper step receiving groove 172 may be formed in the center of the lower surface of the container body 100 by being recessed upward therefrom. That is, the upper step receiving groove 172 may be formed by being recessed upward at the inner side of the container body end 170 of the container body 100. When the container body 100 is mounted to the main body 500, an upper step 920 of the main body 500 to be described below may be received in such an upper step receiving groove 172.

The container body end 170 may have the shape of a circular ring having a partially open part, and the open part may be a part in which a coil seating part 940 to be described below is received. That is, the right end of the container body end 170 may be open to form a coil seating part groove 170a. The coil seating part 940 to be described below may be received in such a coil seating part groove 170a.

A circular end 174 may be formed on the center of the lower surface of the container body 100 by protruding downward therefrom. That is, the circular end 174 protruding downward may be provided in the center of the upper step receiving groove 172.

As illustrated in FIG. 4, the circular end 174 may have the shape of a circular ring and be hollow therein, and may provide a passage connecting the blade assembly 200 to the motor assembly 600.

The circular end 174 may be a part received in a circular end receiving groove 980 formed in the main body 500 to be described below.

Multiple mounting protrusions 174a may be formed on the outer circumferential surface of the circular end 174 by protruding radially therefrom. Each of the mounting protrusions 174a may function to tightly mounting the container body 100 to the corresponding position of the main body 500 such that the container body 100 is held without being rotated. The mounting protrusion 174a may include at least one mounting protrusion.

In the present disclosure, the mounting protrusion 174a is illustrated to have four mounting protrusions 174a. As illustrated in FIG. 4, such a mounting protrusion 174a may be formed to have thickness gradually decreasing toward the outside. This is intended to easily receive the mounting protrusions 174a in protrusion grooves 982 to be described below.

Figure 5:
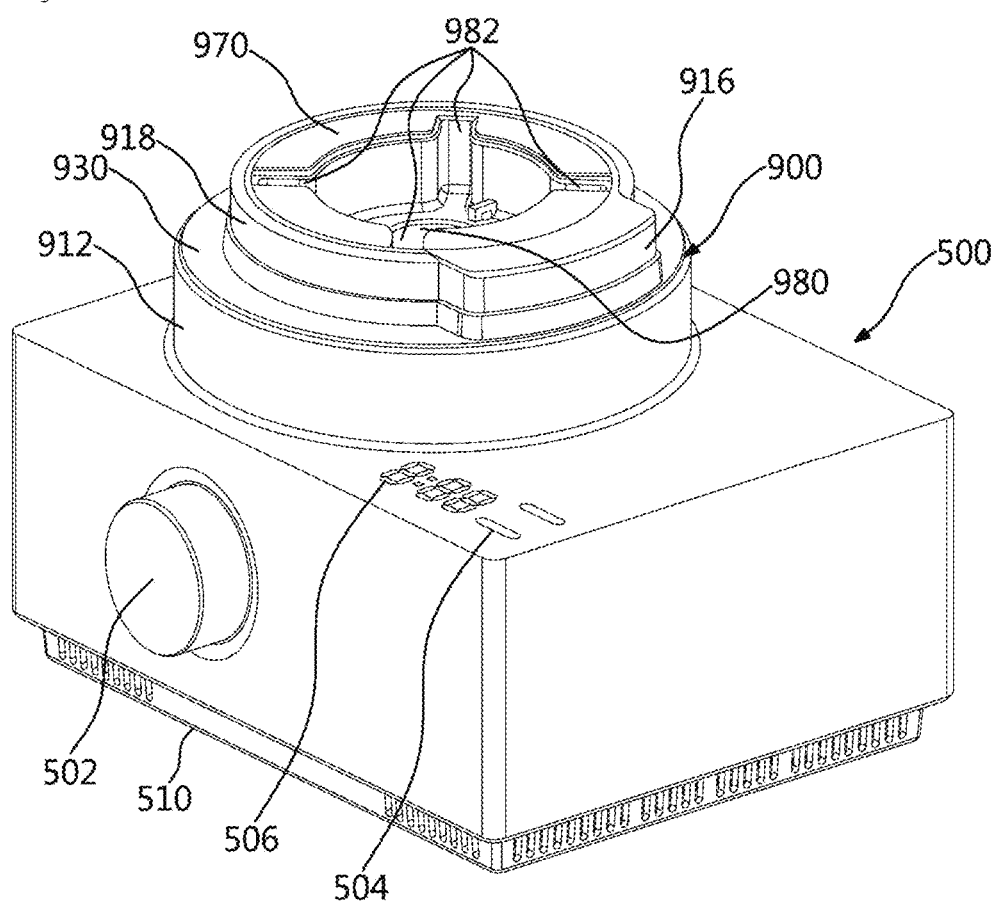
FIG. 5 is a perspective view of a main body constituting the blender according to the embodiment of the present disclosure.
Figure 6:
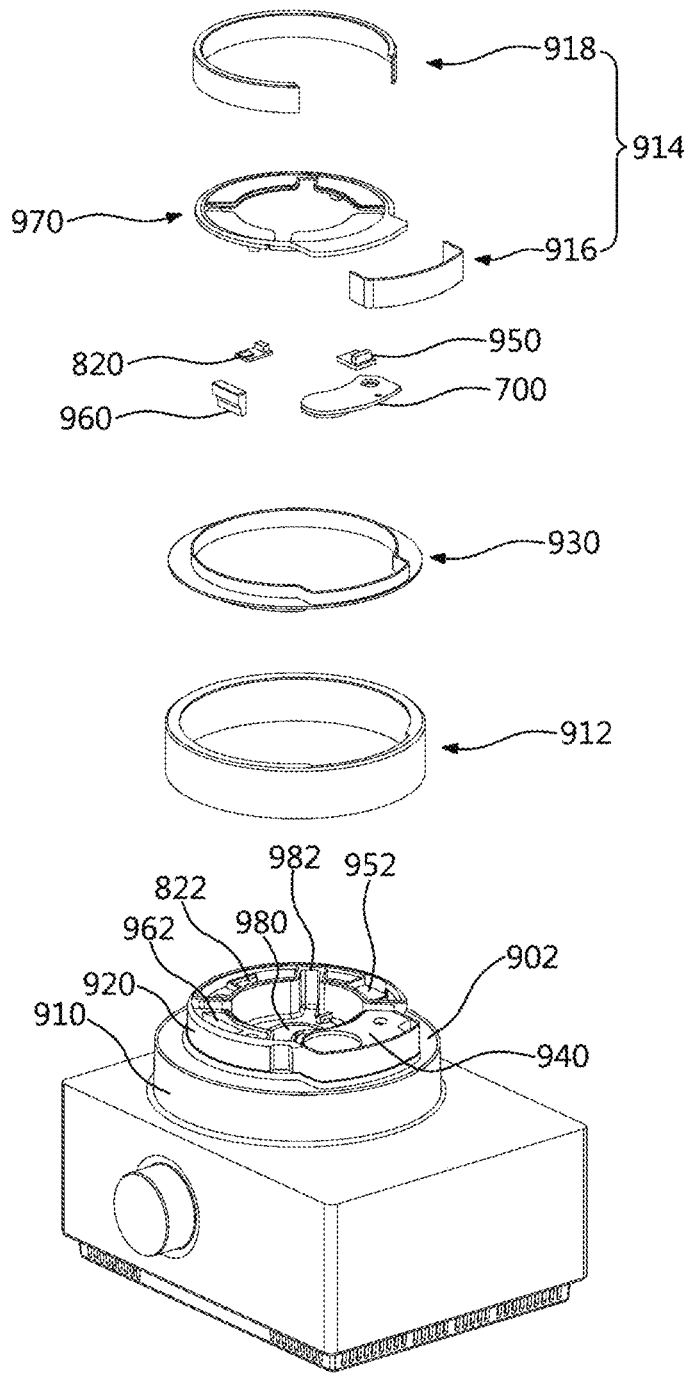
FIG. 6 is an exploded perspective view illustrating the configuration of the upper half of the main body constituting the blender according to the embodiment of the present disclosure.
Figure 7:
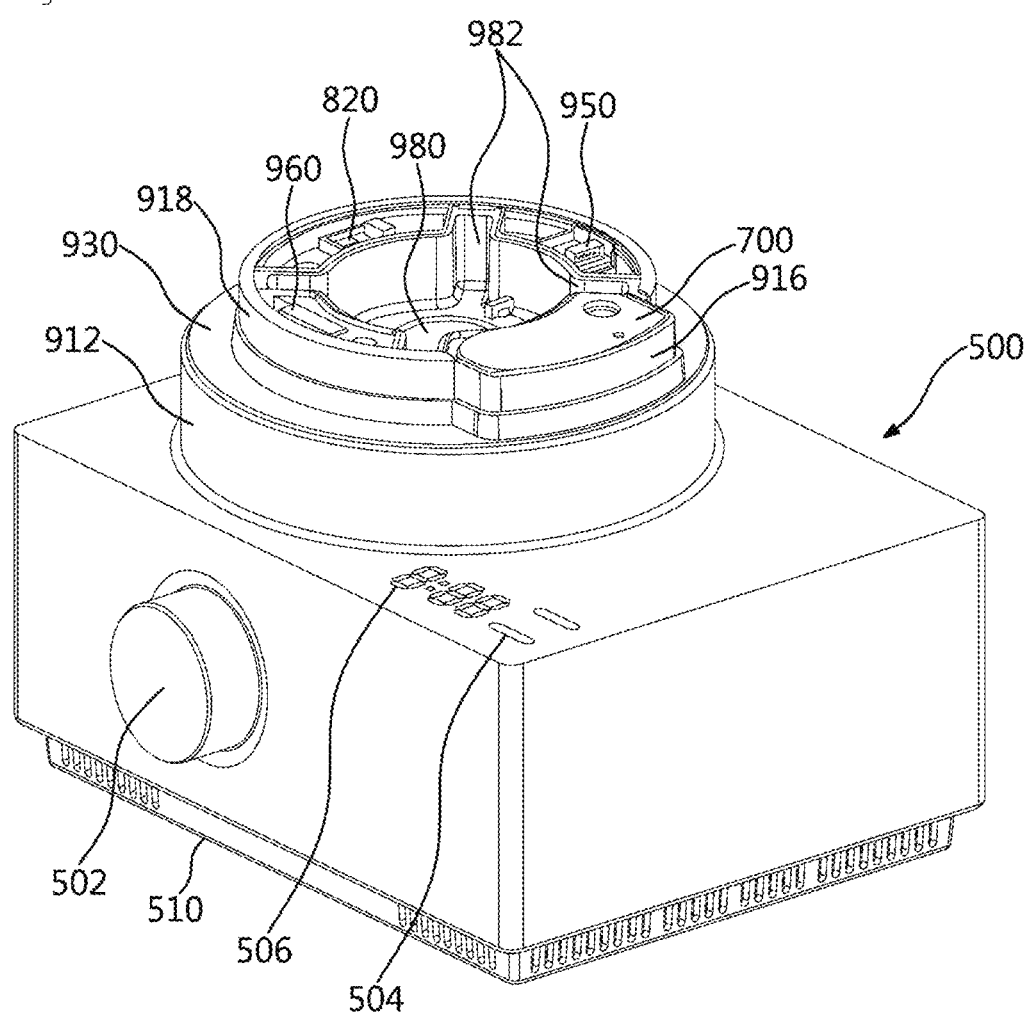
FIG. 7 is a perspective view illustrating a state in which a cover is removed from the main body constituting the blender according to the embodiment of the present disclosure.
Figure 8:
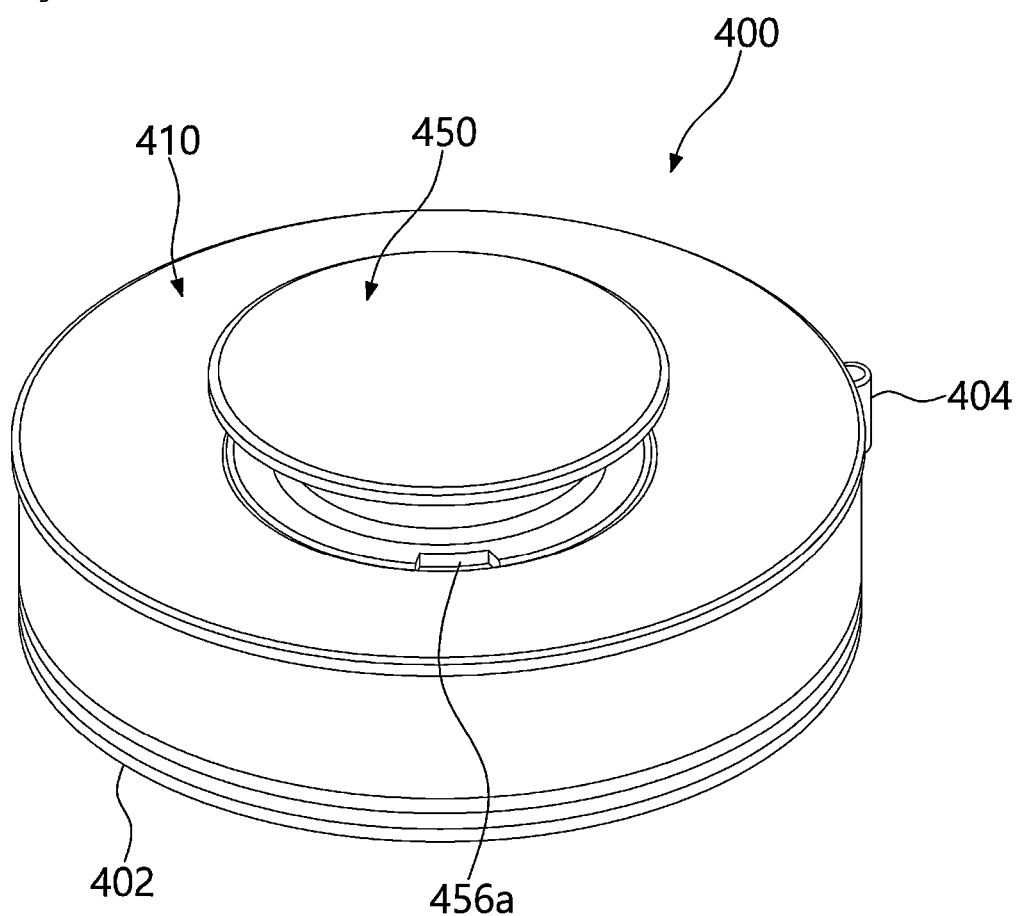
FIG. 8 is a perspective view illustrating an example of a container lid constituting the blender according to the embodiment of the present disclosure.
Figure 9:
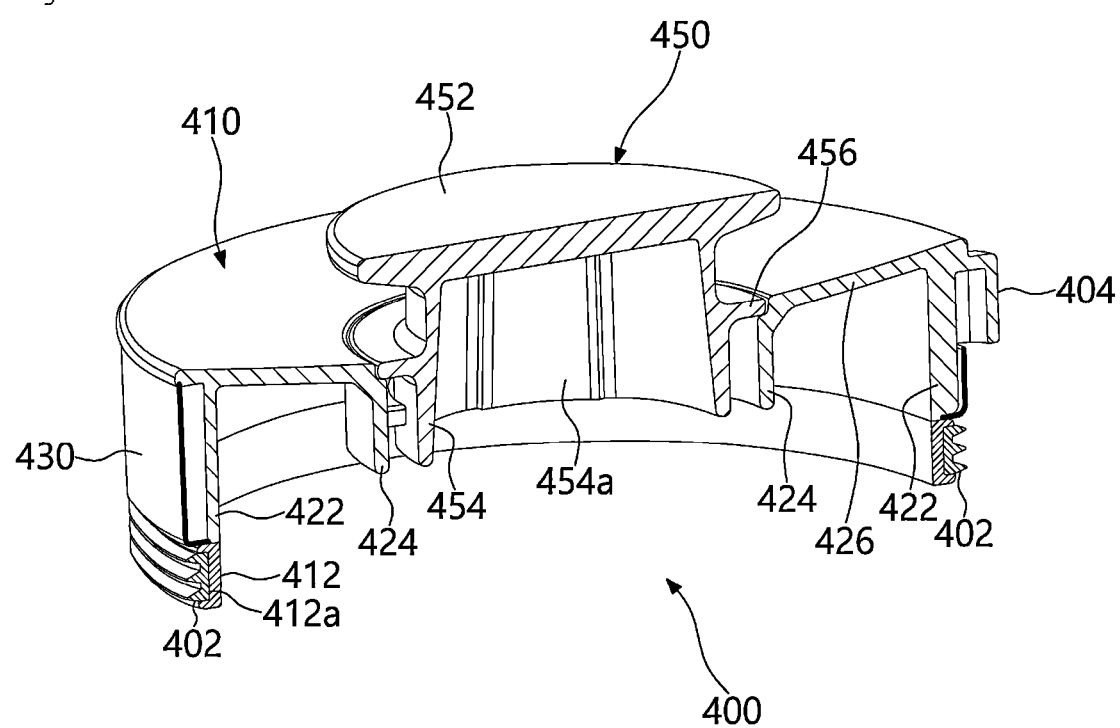
FIG. 9 is a cutaway perspective view illustrating the configuration of the inside of the container lid illustrated in FIG. 8.

In FIGS. 5 to 7, the configuration of the upper half part of the main body 500 is illustrated in detail. That is, FIG. 5 illustrates a perspective view of the main body 500; FIG. 6 illustrates an exploded perspective view illustrating the configuration of the upper half part of the main body 500; and FIG. 7 illustrates a perspective view of the configuration of the main body 500 from which the cover is removed.

As illustrated in these drawings, the seating step 900 may be provided on the upper surface of the main body 500 by protruding therefrom to be stepped upward such that the lower surface of the container body 100 is seated thereon.

The seating step 900 may be a part by which the lower end of the container body 100 is seated and be supported. Accordingly, such a seating step 900 may be configured to have shape corresponding to the shape of the lower part of the container body 100.

Specifically, the seating step 900 may be formed by being stepped, and may include the lower step 910 having a diameter corresponding to the diameter of the lower end of the container body 100, and the upper step 920 formed by protruding upward from the lower step 910 and having a diameter smaller than the diameter of the lower step 910.

As illustrated in FIG. 6, the lower step 910 may be configured to have a circular shape and a predetermined height, and the upper step 920 having a diameter smaller than the diameter of the lower step 910 may be formed on the upper part of such a lower step 910 by protruding upward therefrom to have a predetermined height. Accordingly, like the upper surface of the main body 500, a horizontal step surface 902 may be formed between the lower step 910 having the larger diameter and the upper step 920 having the smaller diameter.

A lower step ring 912 and an upper step ring 914 having shapes corresponding to the outer surfaces of the lower step 910 and the upper step 920, respectively, may be provided on the outer surfaces of the lower step 910 and the upper step 920, respectively. That is, the lower step ring 912 and the upper step ring 914 may be provided on the outer circumferential surfaces of the lower step 910 and the upper step 920, respectively, which have the outer surfaces of circular shapes, and may cover the outer surfaces (side surfaces) of the lower step 910 and the upper step 920.

The lower step ring 912 and the upper step ring 914 may protect parts thereinside and may function as exterior materials. Accordingly, like the outer handle 304, the lower step ring 912 and the upper step ring 914 may be made of a material such as stainless steel which has a smooth surface and is resistant to rust.

In addition, an elastic member 930 made of an elastic material may be provided on the step surface 902 provided between the upper step 920 and the lower step 910. As illustrated in FIG. 5, the elastic member 930 may be configured to cover the step surface 902 formed on the upper surface of the lower step 910, and to cover the lower half part of the upper step 920.

The elastic member 930 may be made of an elastic material, and thus may function to buffer impact which may be generated when the container body 100 sits on the main body 500. That is, when the lower surface of the container body 100 sitting on the upper step 920 is in contact with the upper step 920, the elastic member 930 may function to prevent breakage or noise that may occur due to the collision of the lower surface of the container body 100 with the upper step 920 and the lower step 910 of the main body 500, which are made of solid materials.

Accordingly, the elastic member 930 may be made of a material such as rubber, and may function to make the seating of the container body 100 efficient. Further, the elastic member 930 may be made of a conductive rubber when required, and in this case, a conductive rubber may be provided even on the lower surface of the container body 100.

The power transmission means 700 and the light reception module 820 may be mounted to the upper surface of the upper step 920.

Specifically, the coil seating part 940 may be formed on the right surface of the upper step 920 by protruding therefrom to the right, and the power transmission means 700 may be mounted to the upper surface of such a coil seating part 940.

The power transmission means 700 may be located to be adjacent to the power reception means 220 provided in the container body 100, and may function to supply power to the power reception means 220. Accordingly, such a power transmission means 700 may be configured as an induction coil. That is, like the power reception means 220, the induction coil may be configured by being wound multiple times on the same plane, such as a PCB, in a spiral shape relative to a transmission center point (not shown).

In addition, although now shown in detail, the main body 500 may have an oscillation circuit part therein. Such an oscillation circuit part may generate current and apply the current to the power transmission means 700. Accordingly, a magnetic field may be formed in the power transmission means 700 by the applied current. Furthermore, the oscillation circuit part may change the intensity of the current applied to the power transmission means 700, and thus the magnetic field may be changed in the power transmission means 700 by the change of the current intensity.

Accordingly, as in the present disclosure, with the power reception means 220 and the power transmission means 700 installed to vertically correspond to each other, as the intensity of current applied to the power transmission means 700 changes, the magnetic field of the power transmission means 700 may be changed, and a magnetic flux passing through the power reception means 220 may be changed due to inductive coupling between the power transmission means 700 and the power reception means 220, so the induced electromotive force may be generated in the power reception means 220. Furthermore, such an induced electromotive force may be supplied to the light transmission module 810.

The light reception module 820 may be provided at a side opposite to the power transmission means 700. That is, the light reception module 820 may be mounted in a receiving groove 822 formed in the left end of the upper surface of the upper step 920, which is a position vertically corresponding to the light transmission module 810 mounted to the container body 100.

Specifically, the receiving groove 822 having a predetermined size may be formed in the left end of the upper surface of the upper step 920 by being depressed therefrom, and the light reception module 820 may be mounted in such a receiving groove 822.

As described above, the light reception module 820 may include the photosensor. The light reception module 820 may receive light transmitted by the light transmission module 810, and transmit a light reception signal.

In addition, a Hall sensor 950 and a container body detection switch 960 may be provided on the upper surface of the upper step 920. That is, a container body switch groove 962 and a sensor groove 952 may be formed respectively in the front end portion and rear end portion of the upper surface of the upper step 920 by being depressed therefrom, and the container body detection switch 960 and the Hall sensor 950 may be mounted in the container body switch groove 962 and the sensor groove 952, respectively.

The container body detection switch 960 may be configured as a reed switch, and may detect whether the container body 100 is seated on the upper surface of the main body 500. When such a container body detection switch 960 is provided, a magnet (not shown) corresponding thereto may be provided on the lower end of the container body 100.

The Hall sensor 950 is intended to determine the type of the container body 100 seated on the main body 500, and even in this case, a signal transmission means corresponding thereto may be required on the lower surface of the container body 100.

The upper step ring 914 mounted to the edge of the upper step 920 may be configured to be divided into two parts. That is, as illustrated in FIG. 6, the upper step ring 914 may include a protruding piece 916 covering the outer surface of the coil seating part 940 formed on the right surface of the upper step 920 by protruding therefrom to the right, and a curved piece 918 covering the remaining outer surface of the upper step 920.

Meanwhile, the upper part of the upper step 920 may be covered by a cover 970. Accordingly, the power transmission means 700, the signal reception means 820, the container body detection switch 960, and the Hall sensor 950 mounted to the upper step 920 may be covered and protected by the cover 970.

In addition, the seating step 900 may have a center vertically formed therethrough such that the blade assembly 200 of the container body 100 and the motor assembly 600 provided in the main body 500 may be connected to each other.

More particularly, the circular end receiving groove 980 may be formed in the center portion of the upper step 920 by being depressed therefrom, and the circular end 174 of the lower end of the container body 100 described above may be received in such a circular end receiving groove 980. That is, the upper step 920 may have the shape of a circular ring as a whole, and the circular end receiving groove 980 having a circular shape may be formed in the center portion of such an upper step 920.

At least one protrusion groove 982 may be formed in the inner surface of the upper step 920. The protrusion groove 982 may be formed by being repressed radially from the circular end receiving groove 980, and the mounting protrusions 174*a* of the container body 100 may be seated in the protrusion grooves 982.

Accordingly, the protrusion grooves 982 may be configured to have the size and number thereof corresponding to the size and number of the mounting protrusions 174*a*, and the size of the width of the protrusion groove 982 may be configured to be the same as or larger than the size of the width of the mounting protrusion 174*a*.

Figure 10:
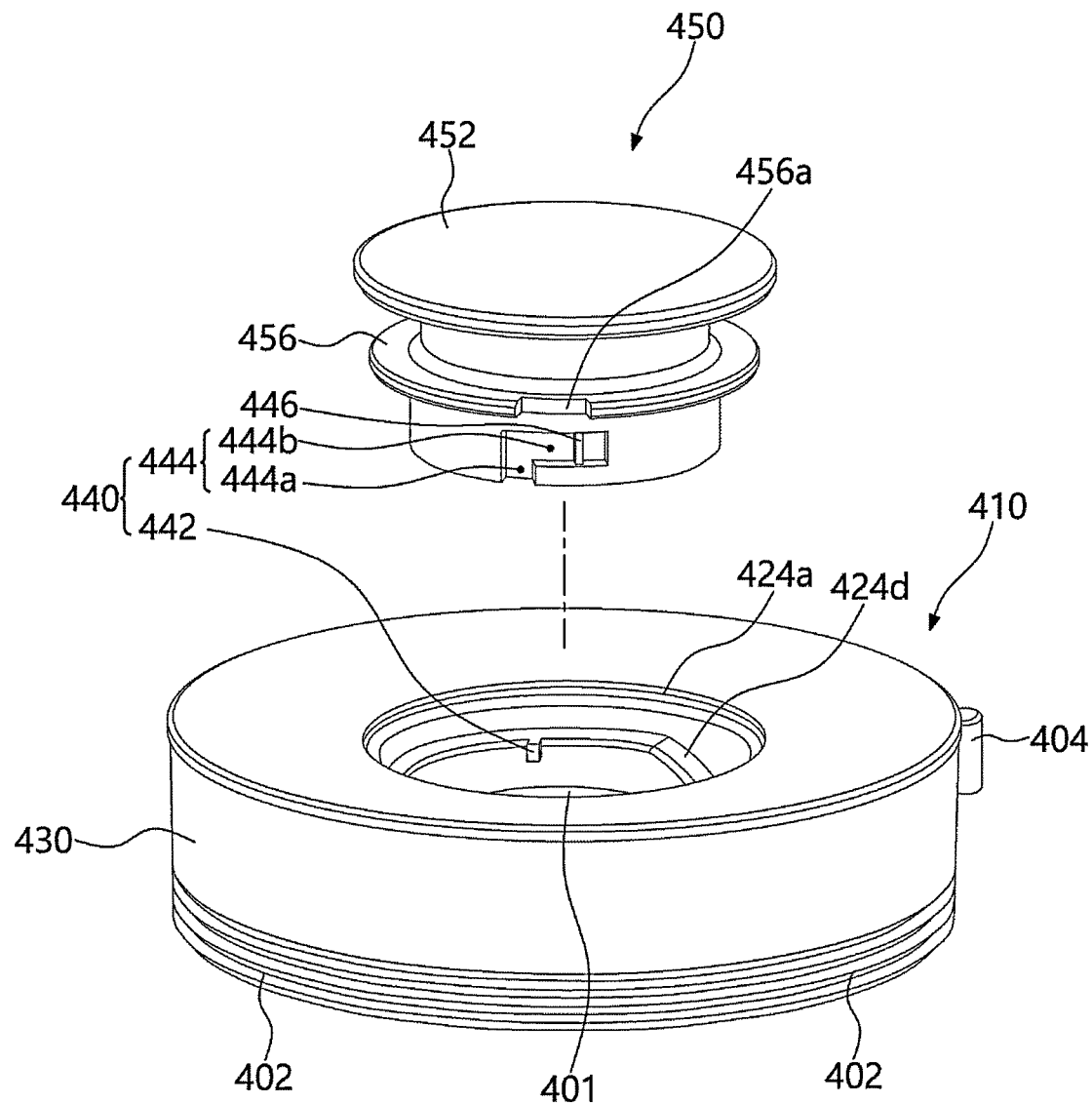
FIG. 10 is a top exploded perspective view illustrating the configuration of the container lid of FIG. 8.
Figure 11:
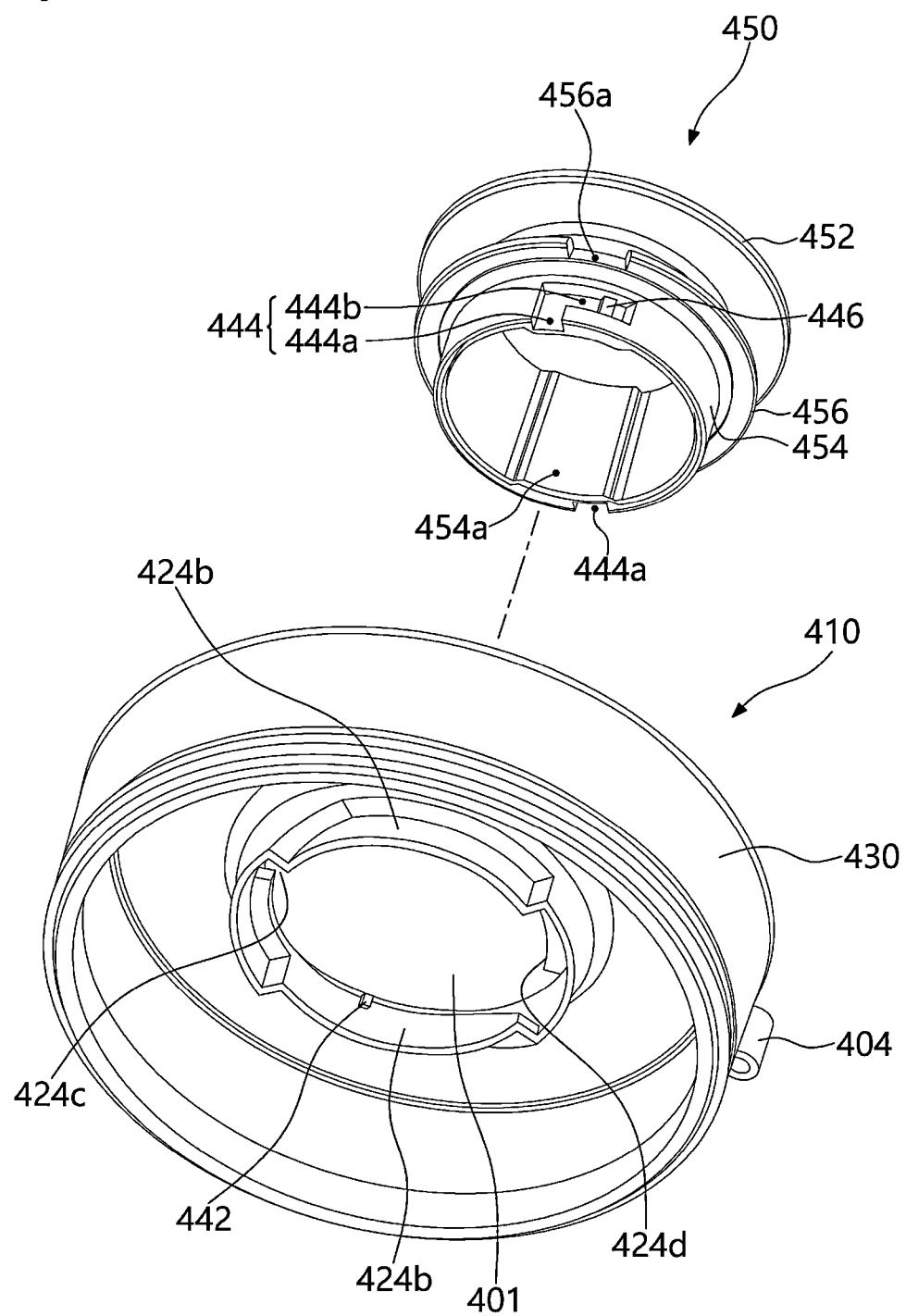
FIG. 11 is a bottom exploded perspective view illustrating the configuration of the container lid of FIG. 8.
Figure 12:
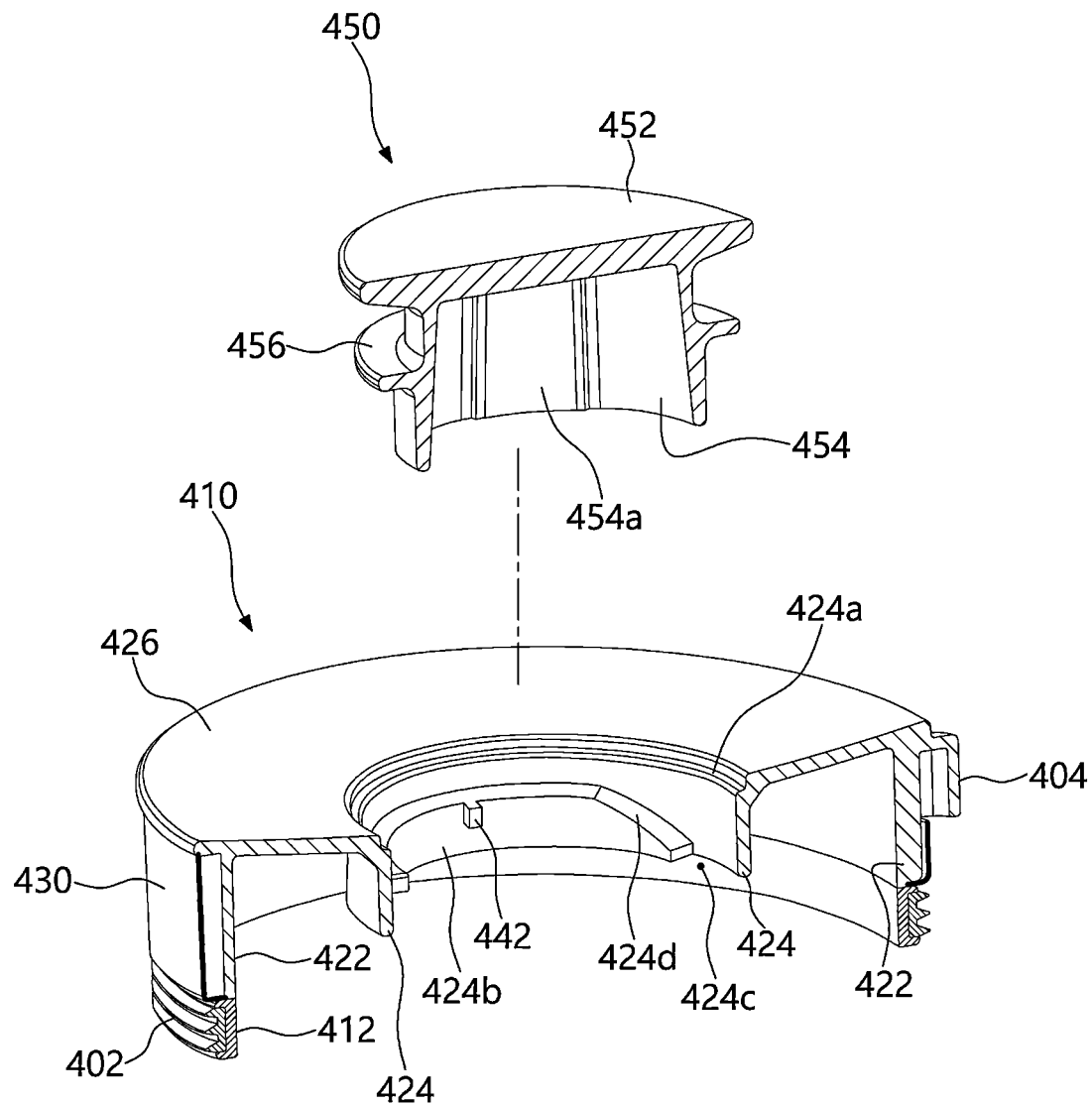
FIG. 12 is a cutaway exploded perspective view illustrating the configuration of the inside of the container lid of FIG. 8.
Figure 13:
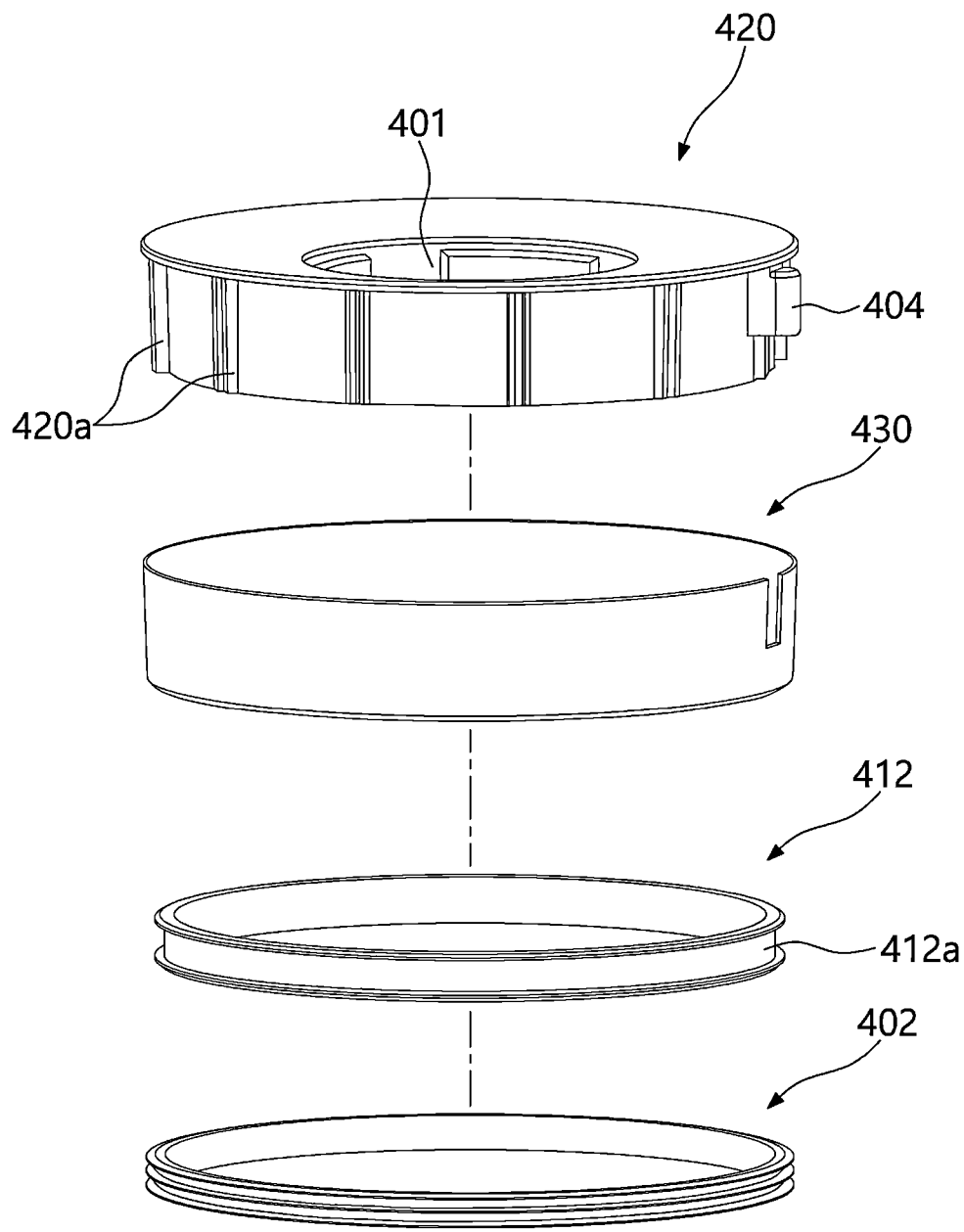
FIG. 13 is an exploded perspective view illustrating the configuration of a lid body constituting the container lid of FIG. 8.

FIGS. 8 to 13 illustrate the detailed configuration of the container lid 400. That is, FIGS. 8 and 9 respectively illustrate the perspective view and cutaway perspective view of the container lid 400, FIGS. 10 and 11 respectively illustrate the top and bottom exploded perspective views of the container lid 400, and FIG. 12 illustrates the cutaway exploded perspective view of the container lid 400. In addition, FIG. 13 illustrates the exploded perspective view of a lid body 410 of the container lid 400.

As illustrated in these drawings, the container lid 400 may include the lid body 410 having the lid hole 401 formed vertically therethrough, the cap 450 configured to cover the lid hole 401, and a locking means 440 allowing the cap 450 to be mounted detachably to the lid body 410.

Specifically, the lid body 410 may be configured to have a circular ring shape and may have the lid hole 401 formed vertically through the inner center portion thereof. In addition, the cap 450 may be mounted detachably to such a lid hole 401 and may open and close the lid hole 401.

The lid body 410 may include a lid casing 420 having the lid hole 401 formed vertically through a center thereof, and a lid exterior material 430 covering the side surface of the lid casing 420.

Multiple slit ribs 420a may be formed on the side surface of the lid casing 420 by protruding therefrom to the outside such that the lid exterior material 430 and the lid casing 420 are coupled to each other.

The slit ribs 420a may be configured in pairs, and a slit which is a gap having a predetermined size may be defined between each of such pairs of slit ribs 420a. Adhesive or an elastic material such as silicone may be applied to or fill such a slit such that the lid exterior material 430 and the lid casing 420 are coupled to each other.

Of course, the slit ribs 420a may protrude from the side surface of the lid casing 420 to the outside, so the lid exterior material 430 and the lid casing 420 may be coupled to each other by forcible fitting.

The lid casing 420 may constitute the approximate appearance and overall frame of the lid body 410. Such a lid casing 420 may have the lid hole 401 therein vertically formed therethrough and having a diameter of a predetermined size.

In addition, the lid exterior material 430 may be coupled to the outer surface of the lid casing 420 such that the appearance thereof has high quality and looks beautiful to a consumer. That is, the lid casing 420 may be made of plastic by injection molding, and the lid exterior material 430 may be made of a material such as stainless steel.

Accordingly, the lid exterior material 430 may be made of a material such as stainless steel which has a smooth surface and is resistant to rust.

The lid exterior material 430 may be coupled to the outer circumferential surface (a side surface) of the lid casing 420 by the adhesive or by forcible fitting. Accordingly, as illustrated in FIG. 13, the multiple slit ribs 420a may be formed at the same intervals on the outer circumferential surface (the side surface) of the lid casing 420 by protruding therefrom to the outside.

The lid casing 420 may include: an outer wall 422 configured to have the shape of a circular ring and to constitute the appearance thereof; an inner wall 424 configured to have a diameter smaller than the diameter of the outer wall 422 and to have the lid hole 401 formed therein; and an upper surface 426 connecting the upper ends of the outer wall 422 and the inner wall 424 to each other.

Specifically, the lid casing 420 may, as a whole, have the shape of a circular ring being hollow thereinside and having a predetermined width. That is, the lid casing 420 may have the lid hole 401 vertically formed through the center of the inside thereof, and may have the structure of a circular ring having a U-shaped section.

The container lid 400 is intended to cover the upper surface of the container body 100, and the lid hole 401 may be formed in the center of the container lid 400 by being vertically formed therethrough, and the cap 450 may be removably mounted to the lid hole 401. That is, as illustrated in the drawing, a hole may be formed in the center of the container lid 400 by being vertically formed therethrough and may constitute the lid hole 401, and the cap 450 may cover such a lid hole 401.

The gasket 402 blocking the gap between the container lid 400 and the container body 100 and a support ring 412 fixing and supporting the gasket 402 may be provided on a side of the lid body 410.

Accordingly, the support ring 412 and the gasket 402 having circular ring shapes may be provided on the lower side of the lid body 410. The support ring 412 may be fixed to the lower end of the lid body 410 by adhesive, and the gasket 402 may be in close contact with and coupled to the outer surface of the support ring 412.

More particularly, the support ring 412 may be coupled to the lower side of the outer wall 422, and the gasket 402 may be in close contact with and coupled to the outer surface of the support ring 412.

A support groove 412a may be formed in the outer surface of the support ring 412 by being recessed inward therefrom, and the gasket 402 may be received in and coupled to such a support groove 412a.

The gasket 402 may function to block the gap between the container lid 400 and the container body 100, and to prevent the container lid 400 mounted to the container body 100 from being automatically removed from the container body 100.

Accordingly, the gasket 402 may be made of an elastic material, and as illustrated in FIG. 13, multiple corrugations may be formed in the outer circumferential surface of the gasket 402.

The cap 450 may be composed of an upper plate 452 exposed to the upper side of the lid body 410, and a cap body 454, at least a portion of which is received in the lid hole 401.

As illustrated in FIG. 12, the cap body 454 may be configured to have the shape of a truncated cone or a cylinder as a whole which has a hollow inner portion. That is, the cap body 454 may be configured to have the shape of a truncated cone gradually decreasing in diameter upward or the shape of a cylinder having the same top and bottom diameters.

The upper plate 452 may cover the upper surface of the cap body 454 having a predetermined height, and as illustrated in FIG. 12, may be configured to have a diameter larger than the diameter of the upper end of the cap body 454.

A middle ring 456 may be formed on the cap body 454 by protruding therefrom to the outside, and may be in contact with the inner surface of the upper end of the lid hole 401.

Specifically, the middle ring 456 may be formed by protruding from the middle or upper end of the cap body 454 to the outside, and when the cap 450 is mounted to the lid body 410, the middle ring 456 may constitute the same plane as the upper surface 426 of the lid body 410. Accordingly, the upper surface of the middle ring 456 may be exposed to the upper side of the lid body 410.

A ventilation groove 456a may be formed in the outer circumferential surface of the middle ring 456 by being recessed inward therefrom such that air flows to the upper and lower sides of the middle ring 456 through the ventilation groove. That is, the ventilation groove 456a may function to allow air to flow to the upper and lower sides of the middle ring 456 of the cap 450 through the ventilation groove. As illustrated in FIG. 10, the ventilation groove 456a may be formed by being recessed inward from the outer circumferential surface the middle ring 456.

A seating groove 424a may be formed in the upper end of the inner wall 424 such that the edge of the middle ring 456 sits therein. That is, as illustrated in FIG. 12, the seating groove 424a may be formed in the upper end of the inner surface of the inner wall 424 by being recessed outward therefrom to be stepped.

The inner circumferential surface of the seating groove 424a may be configured to have size corresponding to or larger than the size of the outer circumferential surface of the middle ring 456, and the inner diameter of the upper end of the inner wall 424 may have size smaller than the size of the outer diameter of the middle ring 456. Accordingly, the middle ring 456 may sit in the seating groove 424a, and may be supported thereby such that the middle ring 456 does not move toward the lower side of the inner wall 424.

As illustrated in FIG. 12, the outer wall 422 may be configured to have a vertical size corresponding to the vertical size of the inner wall 424, or to have a vertical size larger or smaller than the vertical size of the inner wall 424.

The locking means 440 may include a locking protrusion 442 formed by protruding from the lid body 410 to a side thereof, and a locking passage 444 formed in the cap 450 and receiving the locking protrusion 442. That is, the locking means 440 may include the locking protrusion 442 protruding inward from the inner circumferential surface of the lid body 410, and the locking passage 444 formed by being recessed inward from the outer circumferential surface of the cap 450 such that the locking protrusion 442 moves or is received therein.

Hereinafter, the structures and positions of the locking protrusion 442 and the locking passage 444 will be described in more detail.

The locking protrusion 442 may be formed by protruding inward from the inner surface of the inner wall 424. That is, the locking protrusion 442 may be formed at a position spaced apart by a predetermined distance upward from the lower end of the inner wall 424.

More specifically, a contact surface 424b may be formed on the inner surface of the inner wall 424 by protruding inward therefrom, the contact surface being in close contact with the outer surface of the cap body 454. That is, a portion of the lower half part of the inner wall 424 may be configured by protruding inward, and constitute the contact surface 424b. Such a contact surface 424b may be configured to have multiple contact surfaces on the inner wall 424. However, in the embodiment of the present disclosure, two contact surfaces are illustrated to be formed symmetrically to each other on the front and rear or the left and right of the inner wall 424.

The locking protrusion 442 may be formed by protruding inward from the contact surface 424b. That is, as illustrated in FIG. 12, the locking protrusion 442 may be formed by protruding inward (toward the center of the container lid) from the contact surface 424b, and may be formed at the position spaced apart by the predetermined distance upward from the lower end of the contact surface 424b.

A distance by which the locking protrusion 442 is spaced apart upward from the lower end of the cap body 454 or the contact surface 424b may correspond to the vertical length of an entrance groove 444a of the cap 450 to be described below.

Of course, the locking protrusion 442 may be formed on other portions except for the contact surface 424b. The contact surface 424b may protrude inward from the inner wall 424, so in the case in which the locking protrusion 442 is formed on the inner surface of the inner wall 424 instead of the contact surface 424b, the protruding size of the locking protrusion 442 may be larger than in the case in which the locking protrusion 442 is formed on the contact surface 424b.

The locking protrusion 442 described above may formed to correspond to the locking passage 444 in number and position. Accordingly, the locking protrusion 442 may be formed to have at least one locking protrusion on the inner wall 424 or the contact surface 424b. However, in the embodiment of the present disclosure, two locking protrusions 442 are illustrated to be formed on the inner wall 424 or the contact surface 424b to face each other at positions symmetrical to each other.

A return groove 424c may be formed at a side of the contact surface 424b by being recessed therefrom to the outside more than the contact surface 424b, the return groove being a path allowing food located on the upper side of the contact surface 424b to fall downward. That is, the contact surfaces 424b may be configured to include two contact surfaces 424b formed by being divided at positions symmetrical to each other on the lower half part of the inner wall 424, and the return groove 424c may be formed between such two contact surfaces 424b.

The return groove 424c may have a shape recessed toward the outside more than the contact surface 424b, and the upper and lower parts thereof may be open. Accordingly, when food in the container body 100 splatters onto the contact surface 424b with the cap 450 mounted to the lid body 410, the food may fall downward through the return groove 424c and be introduced into the container body 100.

A return guide 424d may be formed on an end of the contact surface 424b such that the height of the upper end of the return guide gradually decreases toward a side thereof, the return guide guiding the movement of the food located on the upper side of the contact surface 424b toward the return groove 424c.

Specifically, the return guide 424d may be slantingly formed at the opposite ends of the contact surface 424b, or at a left or right end thereof to have the height of the upper end thereof gradually decreasing toward the left or right. Accordingly, food positioned on the upper side of the contact surface 424b may slide down along the return guide 424d toward the return groove 424c, and finally fall down into the container body 100 located under the return groove 424c therethrough.

The locking passage 444 may be formed in the outer circumferential surface of the cap 450; provide the moving path of the locking protrusion 442; and maintain the received state of the locking protrusion 442 therein, so that the cap 450 may be coupled to the lid body 410.

The locking passage 444 may be formed by being recessed inward from the outer circumferential surface of the cap 450, and may include the entrance groove 444a guiding the vertical movement of the locking protrusion 442, and a locking groove 444b formed by extending horizontally from the end of the entrance groove 444a and supplying space to receive the locking protrusion 442.

Specifically, a pair of locking passages 444 may be formed in the outer circumferential surface of the lower end portion of the cap body 454. The number of such a locking passage 444 may be the same as the number of the locking protrusion 442.

As illustrated in FIG. 11, the entrance groove 444a may be formed by extending upward from the lower end of the cap body 454. Such an entrance groove 444a may be formed to have a predetermined length upward from the inner surface of the lower end of the cap body 454. That is, the vertical length of the entrance groove 444a may correspond to a distance ranging from the lower end of the inner wall 424 to the locking protrusion 442.

The locking groove 444b may be formed by extending from the upper end of the entrance groove 444a to the left or right perpendicular thereto. That is, the entrance groove 444a may be formed vertically, but the locking groove 444b may be formed horizontally. Accordingly, the upper end of the entrance groove 444a may be connected to the left or right end of the locking groove 444b. Accordingly, the locking protrusion 442 may move while being received in the entrance groove 444a and the locking groove 444b.

A removal prevention protrusion 446 may be formed in the locking groove 444b by protruding therefrom to the outside, the removal prevention protrusion preventing the removal of the locking protrusion 442 received in the locking groove 444b. That is, as illustrated in FIG. 11, the removal prevention protrusion 446 having a predetermined size may be formed in the horizontally formed locking groove 444b by protruding therefrom to the outside.

The removal prevention protrusion 446 may be formed to vertically cross the locking groove 444b. The protruding size of such a removal prevention protrusion 446 may be formed to have size smaller than the depth of the locking groove 444b.

The removal prevention protrusion 446 may be formed at a position adjacent to the end of the locking groove 444b. FIG. 11 illustrates the removal prevention protrusion 446 formed at position adjacent to the right end of the locking groove 444b.

Furthermore, a reinforcement part 454a may be formed on the inner circumferential surface of the cap body 454 by protruding inward therefrom. That is, a side (the inner surface of the cap body 454) opposite to the position of the cap body 454 in which the locking passage 444 is formed may protrude inward. Accordingly, even when the locking passage 444 is formed in the outer circumferential surface of the cap body 454 located at a position at which the inner surface protruding inward is located, the cap body 454 may maintain a predetermined thickness.

Figure 14:
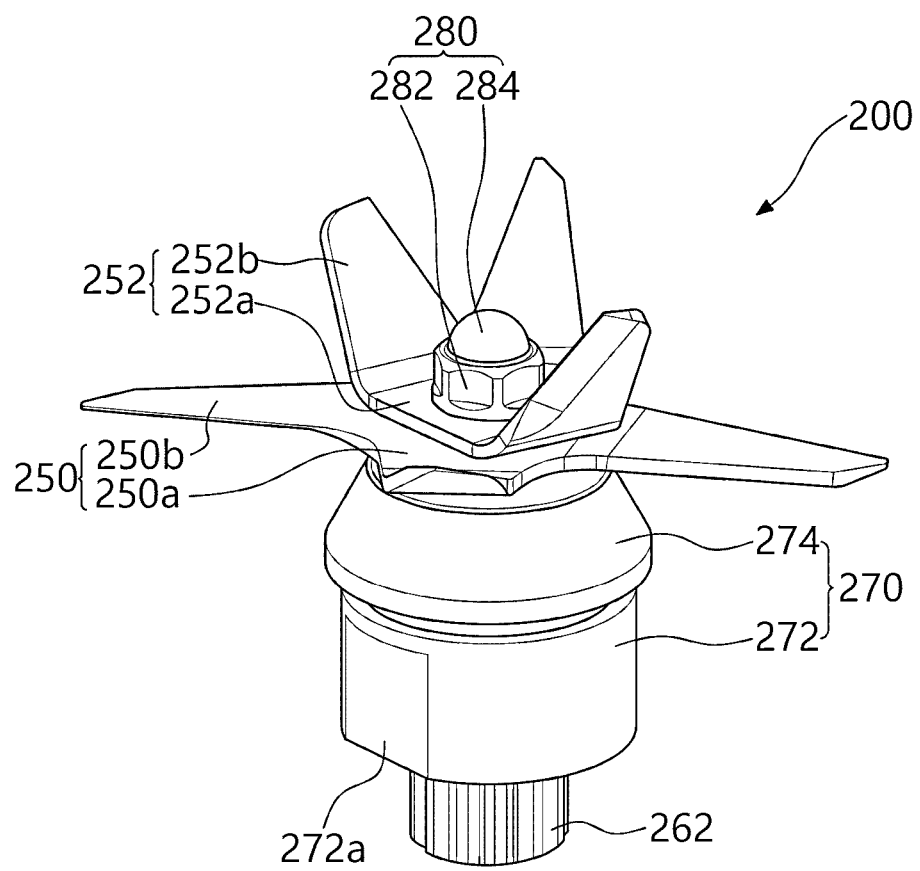
FIG. 14 is an exploded perspective view illustrating the configuration of a blade assembly constituting the blender according to the embodiment of the present disclosure.
Figure 15:
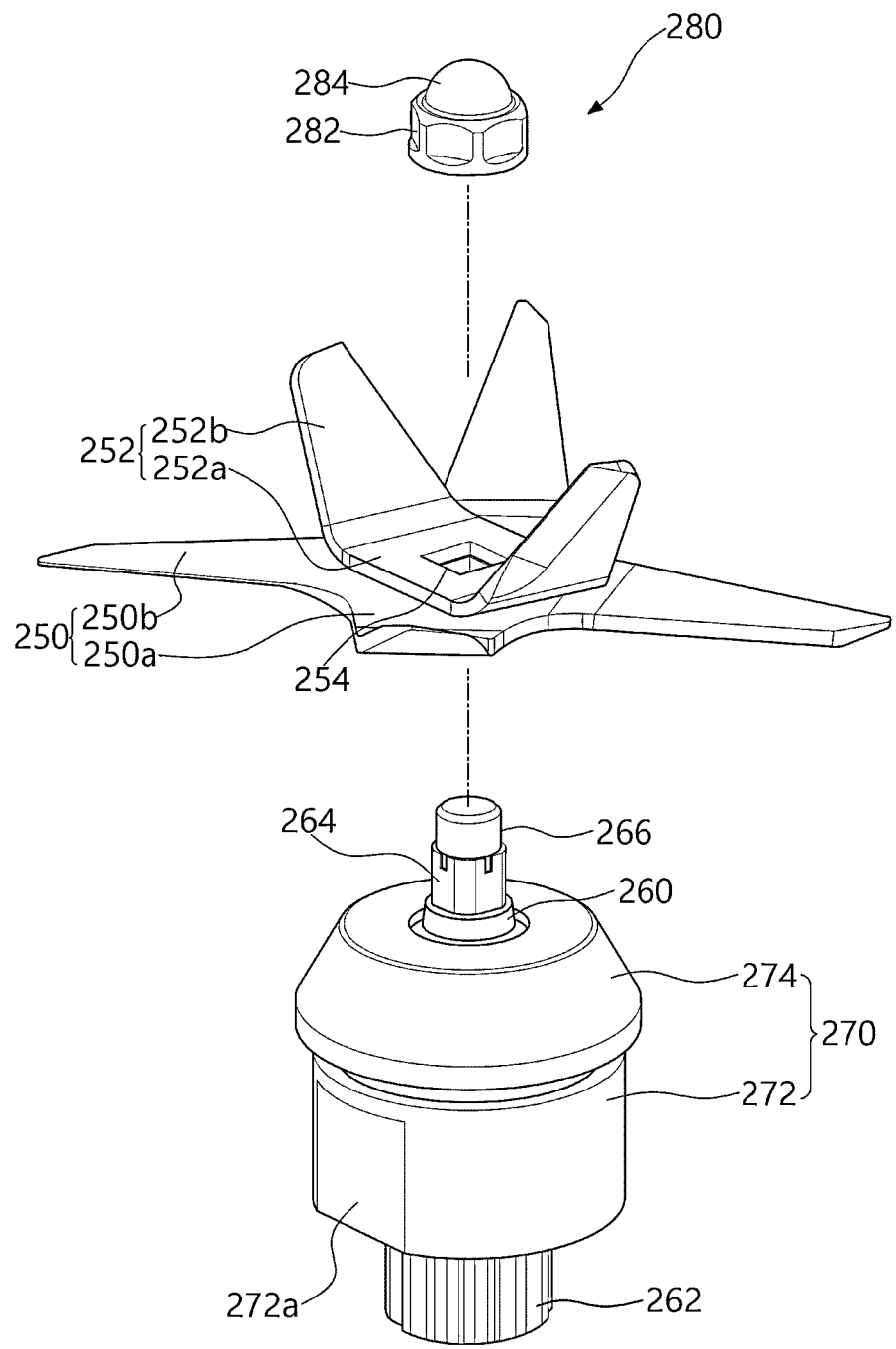
FIG. 15 is an exploded perspective view illustrating, in detail, the configuration of the blade assembly constituting the blender according to the embodiment of the present disclosure.

FIGS. 14 and 15 illustrate the configuration of the blade assembly 200. That is, FIG. 14 illustrates the perspective view of the blade assembly 200, and FIG. 15 illustrates the exploded perspective view of the blade assembly 200.

As illustrated in these drawings, the blade assembly 200 may include the main blade unit 250 having multiple main blades 250b, the auxiliary blade unit 252 having the auxiliary blade 252b located between the multiple main blades 250b, a blade shaft 260 which is the rotation center of each of the main blade unit 250 and the auxiliary blade unit 252, the support body 270 mounted to the lower end of the container body 100 and configured to support the blade shaft 260 such that the blade shaft 260 is rotatable, and a fastening cap 280 fastened to the blade shaft 260 and allowing the main blade unit 250 and the auxiliary blade unit 252 to be fastened to the blade shaft 260.

The blade assembly 200 may allow food to be finely crushed or mixed by the blade units 250 and 252. Accordingly, the blade units 250 and 252 for crushing food may include the main blade unit 250 and the auxiliary blade unit 252.

The main blade unit 250 may perform the major function of crushing food, and the auxiliary blade unit 252 may perform the supporting function of helping the main blade unit 250 to crush food more finely and easily.

The main blade unit 250 may include a main coupling part 250a coupled to the blade shaft 260, and the multiple main blades 250b formed on the main coupling part 250a by protruding therefrom to the outside.

As illustrated in FIG. 14, the main coupling part 250a may be a part which is formed at the center portion of the main blade unit 250 and is coupled to the blade shaft 260, and may support the multiple main blades 250b formed on the outer sides of the main coupling part 250a to be integrated therewith.

The main blades 250b may include four blades formed by protruding radially from the main coupling part 250a. The four blades may be configured to be symmetrical to each other to form the same angles therebetween relative to the center of the main coupling part 250a.

Figure 16:
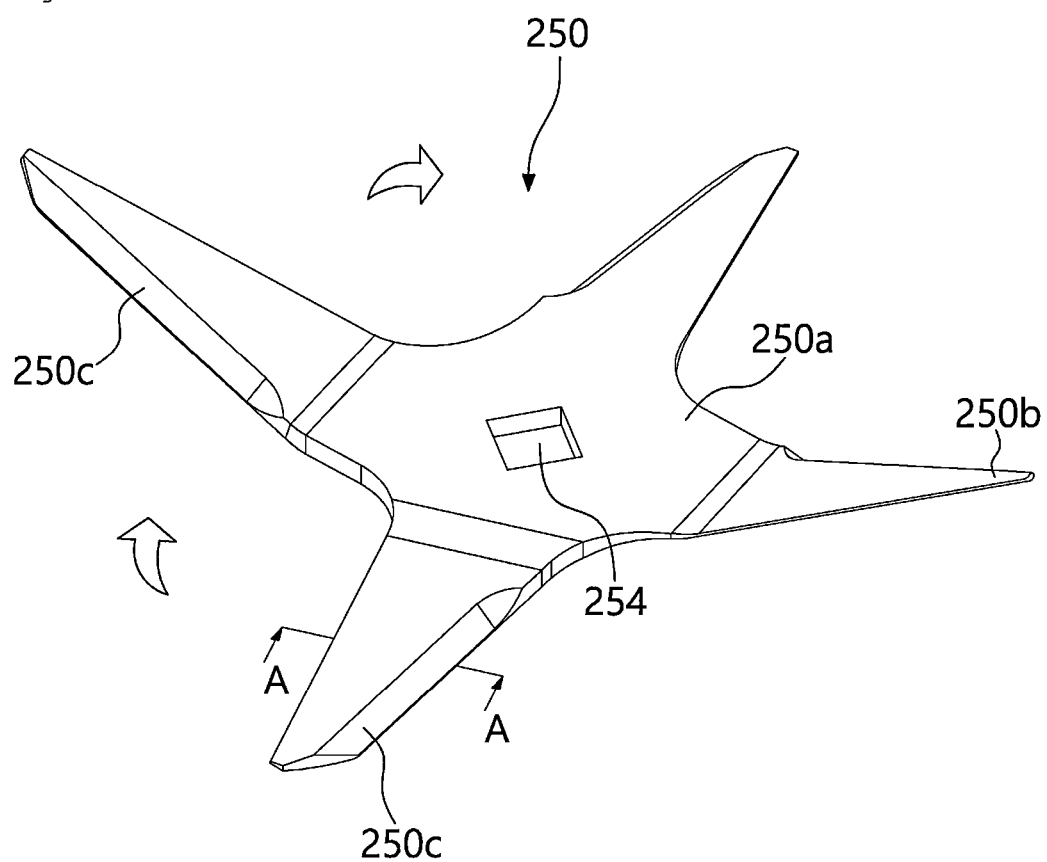
FIG. 16 is a top perspective view illustrating a first embodiment of the configuration of the main blade unit constituting the blender of the present disclosure.

Specifically, as illustrated in FIG. 16, the main coupling part 250a having a flat plate shape and a predetermined size may be formed on the center portion of the main blade unit 250, and four main blades 250b may be formed to be integrated with the outer sides of the main coupling part 250a.

The main blades 250b may include even-numbered main blades and may be configured to be symmetrical to each other at front, rear, left, and right sides relative to the blade shaft 260.

Of course, in the blender of the present disclosure, four main blades 250b are provided, but three main blades 250b may be provided or five main blades 250b may be provided to have the same angles. That is, the main blades 250b may include odd-numbered main blades.

Each of the main blades 250b may be configured to be parallel with the main coupling part 250a or to have a predetermined angle to the main coupling part 250a.

Specifically, the main blade 250b may be configured by extending horizontally from the end of the main coupling part 250a to the outside, or may be configured by extending upward or downward after bending at a predetermined angle upward or downward from the end of the main coupling part 250a.

As illustrated in FIGS. 14 and 15, in the blender of the present disclosure, among four main blades 250b, main blades 250b formed at the left and right sides may be configured to be parallel to the main coupling part 250a, and main blades 250b formed at the front and rear sides may bend at predetermined angles upward respectively from the front and rear ends of the main coupling part 250a.

Figure 17:
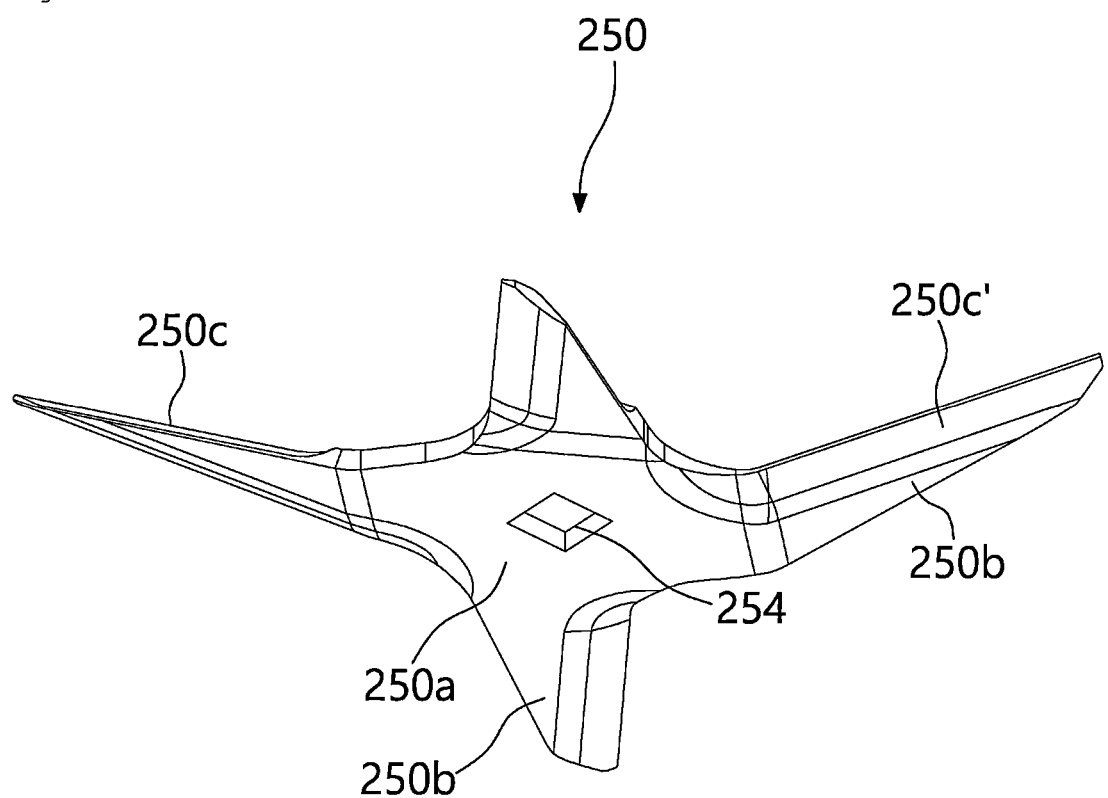
FIG. 17 is a bottom perspective view of the first embodiment of the main blade unit illustrated in FIG. 16.

In addition to such a configuration, the main blades 250b may bend at predetermined angles downward from the main coupling part 250a (see FIG. 17)

Furthermore, in FIGS. 14 and 15, the main blades 250b are configured to have shapes symmetrical to each other forward and rearward or leftward and rightward relative to the center of the main coupling part 250a, but may be configured to have shapes asymmetrical to each other forward and rearward or leftward and rightward relative to the center of the main coupling part 250a.

For example, the main blades 250b formed on the opposite sides of the main coupling part 250a may be configured to be bent horizontally or upward/downward. Furthermore, the main blades 250b formed on the opposite sides of the main coupling part 250a may be respectively configured to be bent in directions different from each other. That is, in a pair of main blades 250b formed on the opposite sides of the main coupling part 250a, a main blade 250b formed on the left side may be configured to be bent downward, and a main blade 250b formed on the right side may be configured to be bent upward (see FIG. 17).

The auxiliary blade unit 252 may be composed of an auxiliary coupling part 252a coupled to the blade shaft 260, and multiple auxiliary blades 252b formed on the auxiliary coupling part 252a by protruding therefrom to the outside.

The auxiliary blade unit 252 may normally have size smaller than the main blade unit 250.

As illustrated in FIG. 15, the auxiliary coupling part 252a may be formed on the center portion of the auxiliary blade unit 252 and may be coupled to the blade shaft 260, and may support at least one auxiliary blade 252b formed integrally on the outer side of the auxiliary coupling part 252a.

The auxiliary blade 252b is preferably smaller in number than the main blade 250b, and the length of the auxiliary blade 252b is preferably shorter than the length of the main blade 250b.

Of course, the auxiliary blade 252b and the main blade 250b may be the same in number and size, but in the blender of the present disclosure, the auxiliary blade 252b may be configured to be smaller in number and size than the main blade 250b, and may support the crushing operation of the main blade 250b.

It is preferable that the auxiliary blade 252b also includes even-numbered auxiliary blades. That is, as illustrated in FIG. 15, two auxiliary blades 252b bent upward respectively from the opposite ends of the auxiliary coupling part 252a is preferably provided. In some cases, the auxiliary blade 252b may also include four auxiliary blades like the main blades 250b.

As illustrated in FIG. 15, in the blender of the present disclosure, two auxiliary blades 252b are formed on the auxiliary coupling part 252a to be symmetrical to each other by protruding therefrom to the outside.

The auxiliary blade 252b may be configured to bend upward from an end of the auxiliary coupling part 252a and to have a predetermined angle to the auxiliary coupling part 252a.

Furthermore, an angle formed between the auxiliary blade 252b and the auxiliary coupling part 252a is preferable smaller than an angle formed between the main blade 250b and the main coupling part 250a.

Specifically, the auxiliary blade 252b may bend more upward than the main blade 250b. That is, an angle formed between the auxiliary blade 252b and the upper surface of the auxiliary coupling part 252a is preferably smaller than an angle formed between the main blade 250b and the main coupling part 250a.

This allows the auxiliary blade unit 252 to support the crushing of food by the main blade unit 250 and at the same time, to control the movement of food located at the inner center portion of the container body 100. That is, the auxiliary blade 252b of the auxiliary blade unit 252 may be located at the center portion of the container body 100, and thus may rotate and mix food located at the inner center portion of the container body 100.

Specifically, the auxiliary blade 252b may partially cut food placed at a center portion except for space in which the main blades 250b operate and may push or rotate the food of the center portion upward or outward such that the food is moved to the main blade 250b or upward.

Accordingly, the main blade unit 250 may perform the main function of moving and crushing food received in the container body 100, and the auxiliary blade unit 252 may function to crush and move food located at the center portion of the container body 100 by supporting the function of the main blade unit 250.

Meanwhile, the auxiliary blade 252b may be installed to be located between the multiple main blades 250b. That is, the multiple main blades 250b may be installed at equal intervals of 90° relative to the center of the main coupling part 250a, and the auxiliary blade 252b may be located between such main blades 250b.

In this case, when the main blades 250b do not reach food, the auxiliary blades 252b may reach the food such that the efficiency of crushing the food is increased.

A fastening hole 254 may be formed vertically through the center of each of the main blade unit 250 and the auxiliary blade unit 252 such that the fastening part 264 to be described later is received in the fastening hole 254. That is, the fastening hole 254 may be formed vertically through the center of each of the main coupling part 250a of the main blade unit 250 and the auxiliary coupling part 252a of the auxiliary blade unit 252.

The fastening hole 254 may be formed to have a shape corresponding to the outer surface of the fastening part 264 to be described below, and the main blade unit 250 and the auxiliary blade unit 252 may be configured to rotate according to the rotation of the blade shaft 260.

Accordingly, as illustrated in FIG. 15, the fastening hole 254 may be formed to have a square shape.

The support body 270 may include a body seating part 272 mounted fixedly to the bottom surface of the container body 100, and a protruding part 274 formed on the body seating part 272 and exposed to the upper side of the bottom surface of the container body 100.

As illustrated in FIG. 15, the body seating part 272 may be configured to have a cylindrical shape as a whole, and may be mounted to the bottom surface of the container body 100. Accordingly, an anti-rotation surface 272a may be formed on at least one surface of the body seating part 272 so as to hold the body seating part 272 such that the body seating part 272 is not rotated when the body seating part 272 is inserted into the bottom surface of the container body 100 from the upper side thereof. That is, the anti-rotation surface 272a may be formed on the body seating part 272 such that the support body 270 is inserted into and held in the bottom surface of the container body 100.

Specifically, in a state in which the support body 270 is mounted to the container body 100, even during the rotation of the blade shaft 260, the support body 270 may be required to be held without being rotated, and thus the anti-rotation surface 272a may be formed on the body seating part 272 such that the support body 270 is inserted into the bottom surface of the container body 100.

The anti-rotation surface 272a may be formed on the outer surface of the body seating part 272 by being recessed inward therefrom and have a flat surface. Such a the anti-rotation surface 272a°] may be located at the corresponding surface (not shown) of the container body 100 and may prevent the rotation of the support body 270.

As illustrated in FIG. 14, the anti-rotation surface 272a may be configured to have a shape of a recess having a flat surface with an open lower side, and may include a pair of the anti-rotation surface 272a formed to be symmetrical to each other at opposite sides of the body seating part 272. Accordingly, the body seating part 272 may maintain the state of the body seating part 272 inserted into and held in the bottom surface of the container body 100 from the upper side thereof.

As illustrated in FIG. 15, the protruding part 274 may be formed on the upper side of the body seating part 272. Furthermore, the lower end of such a protruding part 274 may be configured to have an outer diameter larger than the outer diameter of the body seating part 272.

Accordingly, the outer diameter of the lower end of the protruding part 274 may be configured to be larger than the inner diameter of a support body insertion hole (not shown) formed through the bottom surface of the container body 100.

Accordingly, when the support body 270 is mounted to the bottom surface of the container body 100, the protruding part 274 may be exposed to the upper side of the bottom surface of the inner container body 100.

As illustrated in FIG. 15, the protruding part 274 preferably has a tapered shape having an outer diameter gradually decreasing upward.

The blade shaft 260 may be formed to have a predetermined vertical length and may be installed to pass through the inner center of the support body 270.

In addition, the blade shaft 260 may be rotatably installed inside the support body 270. Accordingly, although not shown, a bearing may be installed inside the support body 270 such that the blade shaft 260 can be rotated while being inserted in the support body 270.

A connecting part 262 may be provided on the lower end of the blade shaft 260, the connecting part 262 being configured to transmit the power of the motor assembly 600 in cooperation therewith to the blade shaft 260.

As illustrated in FIG. 14, the connecting part 262 may be configured as a spline shaft having a corrugated cross section. Accordingly, although not shown, a spline boss corresponding to the connecting part 262 may be provided in the connection part of the upper end of the motor assembly 600 to which the connecting part 262 is coupled.

The fastening part 264 to which the main blade unit 250 and the auxiliary blade unit 252 are mounted, and a fastening end 266 to which the fastening cap 280 is fastened may be provided on the upper end of the blade shaft 260.

Specifically, the fastening end 266 to which the fastening cap 280 is coupled may be provided on the upper end of the blade shaft 260, and the fastening part 264 may be provided on the lower side of such a fastening end 266.

As illustrated in FIG. 15, the fastening part 264 may be configured to have an outer diameter smaller than the outer diameter of the blade shaft 260 received in the support body 270.

Accordingly, while the main blade unit 250 and the auxiliary blade unit 252 are mounted to the fastening part 264, the main blade unit 250 and the auxiliary blade unit 252 may not move downward any longer. Accordingly, without the lower surface of each of the main blade unit 250 and the auxiliary blade unit interfering with the upper surface of the support body 270, the main blade unit 250 and the auxiliary blade unit may rotate.

While the main blade unit 250 and the auxiliary blade unit 252 are mounted to the fastening part 264, the main blade unit 250 and the auxiliary blade unit 252 may rotate together with the blade shaft 260.

Accordingly, the outer surface of the fastening part 264 may have a shape corresponding to the inner surface of the fastening hole 254. That is, the fastening hole 254 formed in each of the main blade unit 250 and the auxiliary blade unit 252 may have a square shape. Accordingly, when the outer surface of the fastening part 264 has size and shape corresponding to the fastening hole 254, the main blade unit 250 and the auxiliary blade unit 252 may rotate together with the blade shaft 260 without a separate fastening device in a state in which the main blade unit 250 and the auxiliary blade unit 252 are mounted to the fastening part 264.

Accordingly, the fastening part 264 preferably has a square shaped cross section corresponding to the fastening hole 254. Furthermore, the size of the perimeter of the outer surface of the fastening part 264 is required to be smaller than the size of the perimeter of the inner surface of the fastening hole 254 such that the fastening part 264 is received in the fastening hole 254, and the size of the diagonal length of the cross section of the fastening part 264 is required to be configured to be larger than a distance between surfaces facing each other inside the fastening hole 254 such that the main blade unit 250 and the auxiliary blade unit 252 do not rotate while mounted to the fastening part 264.

The fastening cap 280 may be fastened to the upper end of the blade shaft 260, and may maintain a state in which the main blade unit 250 and the auxiliary blade unit 252 are mounted and fastened to the blade shaft 260 without being removed upward therefrom.

The fastening cap 280 may include a nut part 282 coupled to the fastening end 266, a cap part 284 formed on the upper surface of the nut part 282 by protruding upward therefrom such that the cap part 284 has a dome shape.

A tap may be formed inside the nut part 282, and the fastening end 266 may be threaded, and thus the fastening cap 280 may be screwed to the fastening end 266.

The cap part 284 may be configured to have a dome shape, which is a hemispherical roof shape, and may be configured to be integrated with the nut part 282. Such a cap part 284 may function to prevent food or foreign matter from being introduced into a hole formed in the center of the nut part 282 and located inside the cap part 284, and may induce food to slide from the cap part without adhering to the upper surface thereof.

In FIGS. 16 to 26, and in FIGS. 27A, 27B, 28, 29A, 29B, 29C, 29D, 30, 31A, 31B, 31C, 32A, 32B, 33A, 33B, 33C, 33D, 34, 35, 36A, and 36B, various configurations of the main blade unit constituting the blade assembly 200 are illustrated. That is, in FIGS. 16 to 26, and in FIGS. 27A, 27B, 28, 29A, 29B, 29C, 29D, 30, 31A, 31B, 31C, 32A, 32B, 33A, 33B, 33C, 33D, 34, 35, 36A, and 36B, four embodiments of the configuration of the main blade unit 250 constituting the blade assembly 200 are illustrated. Furthermore, the five embodiments of the configuration of the main blade unit 250 described herein may be applied even to the auxiliary blade unit 252.

Figure 18:
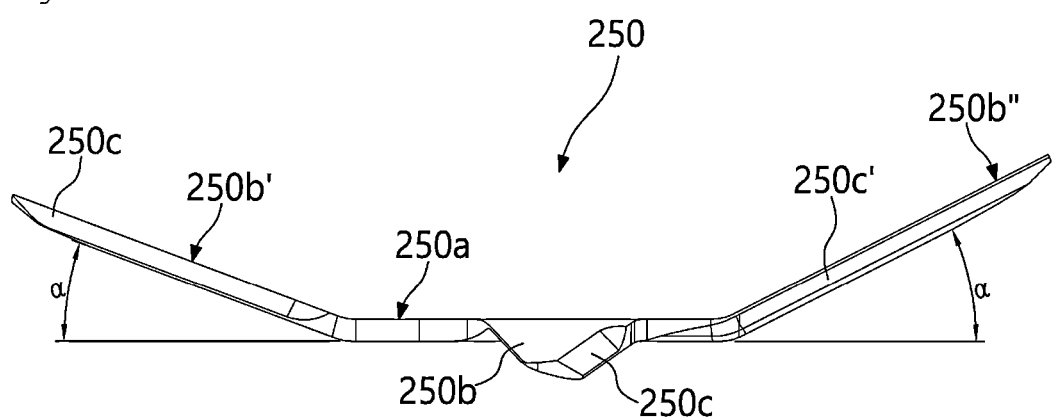
FIG. 18 is a front view of the first embodiment of the main blade unit illustrated in FIG. 16.
Figure 19:
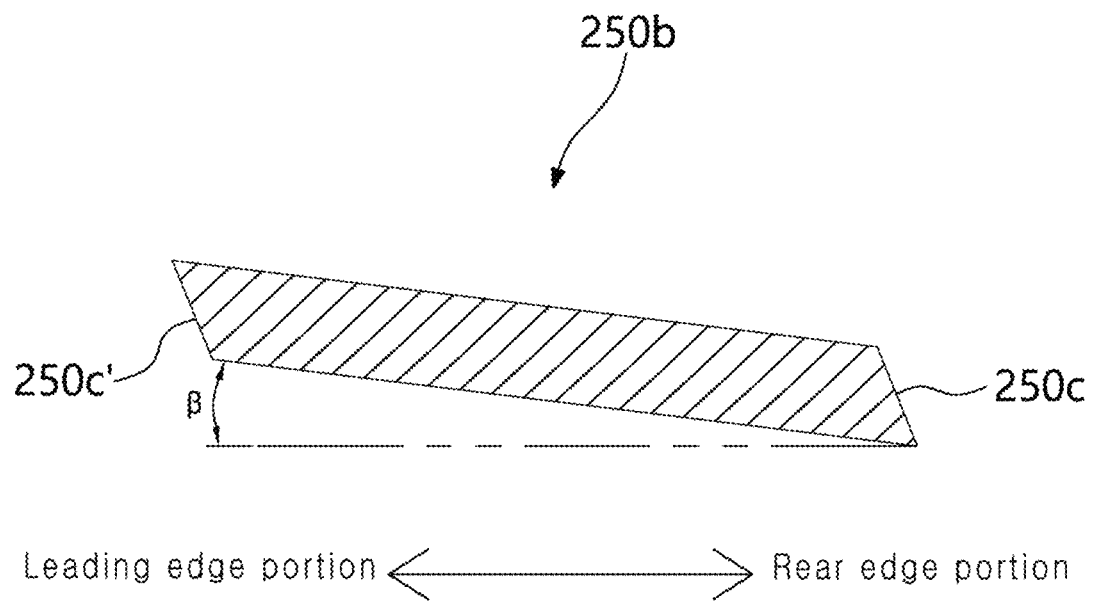
FIG. 19 is a sectional view taken along line A-A of FIG. 16.
Figure 20:
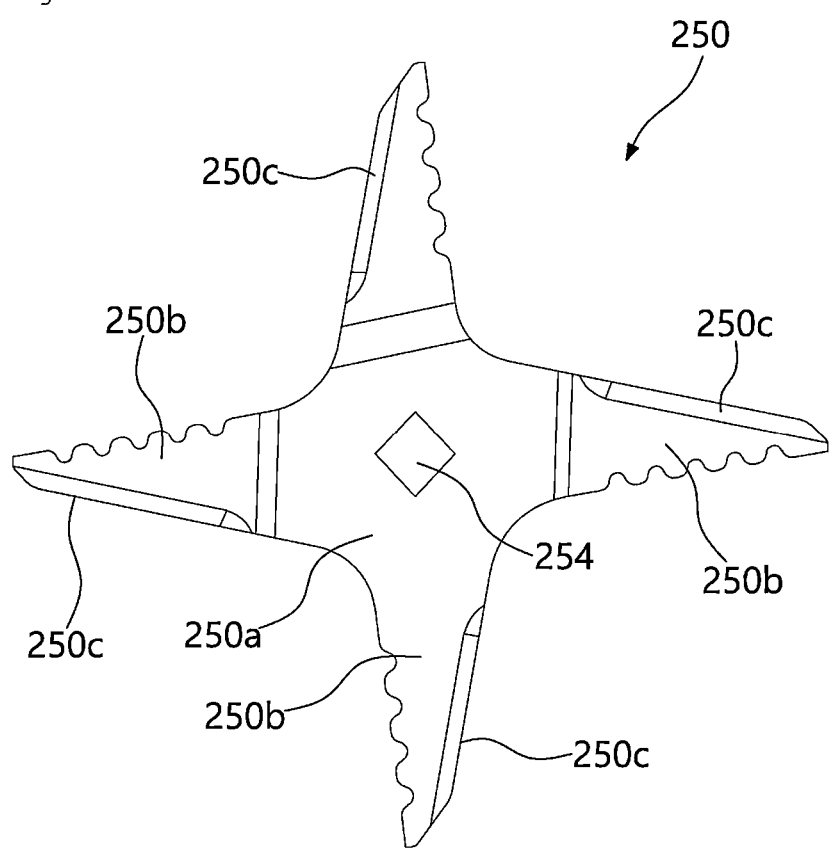
FIG. 20 is a top plan view illustrating a second embodiment of the configuration of a main blade unit constituting the blender of the present disclosure.
Figure 21:
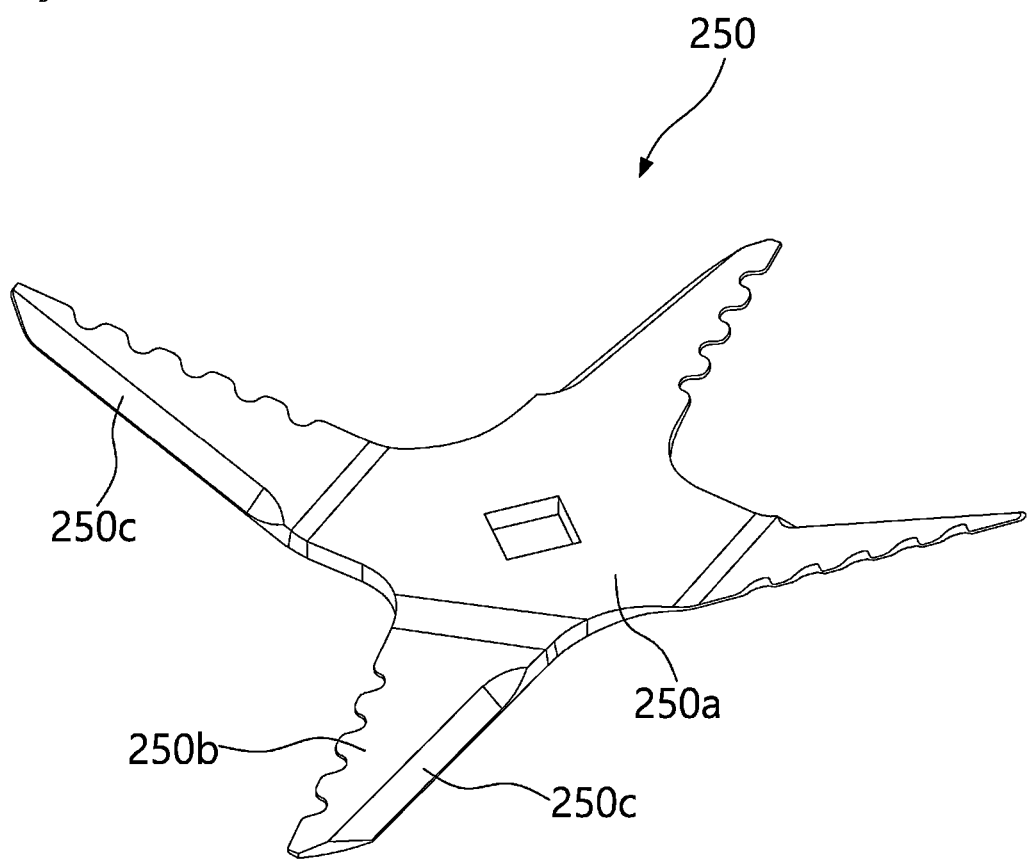
FIG. 21 is a top perspective view of the second embodiment of the main blade unit illustrated in FIG. 20.

First, referring to FIGS. 16 to 19, a first embodiment of the configuration of the main blade unit constituting the blade assembly 200 will be described. FIGS. 16 and 17 respectively illustrate the top and bottom perspective views of the configuration of the main blade unit constituting the blade assembly 200 according to the first embodiment, FIG. 18 illustrates the front view of the main blade unit according to the first embodiment, and FIG. 19 illustrates a sectional view taken along line A-A of FIG. 16.

In these drawings, the embodiment of the main blade unit 250 of the blade units 250 and 252 is illustrated. Accordingly, hereinafter, the configuration of the main blade unit 250 will be described as an example, and the auxiliary blade unit 252 may have the same configuration as the main blade unit 250, and may have a configuration different from the main blade unit 250.

Hereinafter, components having the same functions among the components of the main blade unit 250 described above use the same reference numerals, and for convenience, the detailed description of overlapping components and functions thereof will be omitted.

As described above, the main blade unit 250 may include the main coupling part 250a coupled to the blade shaft 260, and the multiple main blades 250b formed on the main coupling part 250a by protruding therefrom to the outside.

The main blades 250b may include four main blades formed by protruding radially from the main coupling part 250a, and may be configured to form the same angles therebetween relative to the center of the main coupling part

250*a*. That is, four main blades 250*b* may be configured to be integrated with the outer sides of the main coupling part 250*a*.

In the blender of the present disclosure, the main blade 250*b* is illustrated to include four main blades, and may be configured to have the same plane as or a predetermined angle to the main coupling part 250*a*.

As a specific example, as illustrated in FIG. 17, among the four main blades 250*b*, main blades 250*b* formed at the left and right of the main coupling part 250*a* are configured to be bent upward to form predetermined angles α to the main coupling part 250*a*, and main blades 250*b* formed on the front and rear of the main coupling part 250*a* are bent at predetermined angles downward respectively from the front and rear ends of the main coupling part 250*a*.

Furthermore, in addition to such a configuration, at least one of the main blades 250*b* may be formed by extending laterally from the main coupling part 250*a* such that the main blade 250*b* has the same plane as the main coupling part 250*a* to be horizontal thereto.

In addition, the main blades 250*b* may be configured to be symmetrical to each other at the front and rear or the left and right relative to the center of the main coupling part 250*a*, but may have asymmetrical shapes.

For example, all of the main blades 250*b* formed at the left and right of the main coupling part 250*a* may be configured to be horizontal to each other or to be bent upward/downward.

Furthermore, the main blade 250*b* formed at the left and right may be configured to be bent in directions different from each other. That is, in a pair of main blades 250*b* formed at the left and right of the main coupling part 250*a*, a main blade 250*b* formed at the left may be configured to be bent downward, and a main blade 250*b* formed at the right may be configured to be bent upward.

Meanwhile, even if a pair of main blades 250*b* formed at the left and right of the main coupling part 250*a* is bent upward or downward in the same directions, the main blades 250*b* may be configured to have different bending angles. That is, referring to FIG. 18 as an example, an angle α formed between a main blade 250*b'* formed at the left of the main coupling part 250*a* and the main coupling part 250*a* may be configured to be different from an angle α formed between a main blade 250*b"* formed at the right of the main coupling part 250*a* and the main coupling part 250*a*. Hereinafter, the upward/downward bending angle of such a main blade 250*b'* is referred to as a bending angle α.

Besides, all of the four main blades 250*b* formed at the front, back, the left, and right of the main coupling part 250*a* may be configured to be horizontal, or all of the four main blades 250*b* may be configured to be bent at different angles or directions.

Accordingly, when the main blades 250*b* are configured to have various bending angles, the portion of food crushed or cut by the main blades 250*b* may increase, and thus crushing efficiency of the main blades may be improved.

Meanwhile, at least an end portion of the blade of the blade unit 250 or 252 may be configured to be thinner than a center portion thereof. That is, an end portion of the blade of the main blade unit 250 or the auxiliary blade unit 252 may be configured to have thickness decreasing gradually toward an edge thereof.

As illustrated in FIG. 19, each of the leading edge portion and rear edge portion of the main blade of the main blade unit 250 may be configured to have thickness decreasing gradually toward an end (the front or rear) thereof.

Hereinafter, for convenience of description, the front end of the main blade of the main blade unit 250 indicates the leading edge portion of the main blade which performs the function of the blade surface of the main blade, and the rear edge portion of the main blade indicates a side opposite to the blade surface. That is, in FIG. 16, when the main blade unit 250 rotates clockwise (when viewed from above) as indicated by an arrow, the blade surface of the main blade which cuts food is a leading edge portion thereof, and a part of the main blade which is not used to cut food and is located at a side opposite to the blade surface is referred to as a rear edge portion of the main blade. In this case, in FIG. 19, a left end is the leading edge portion of the main blade of the main blade unit 250, and a right end is the rear edge portion of the main blade of the main blade unit 250.

Accordingly, in the embodiment, at least one surface of the main blade 250*b* may have an inclined surface 250*c* or 250*c'* having thickness decreasing gradually toward an end thereof. That is, at least one of the leading edge portion and the rear edge portion of the main blade 250*b* of the main blade unit 250 may have the inclined surface 250*c* or 250*c'*.

More specifically, the inclined surface 250*c* or 250*c'* may be formed on the upper or lower surface of the main blade 250*b* of the blade unit 250, the inclined surface having thickness decreasing gradually toward the edge of the leading or rear edge portion. That is, the inclined surface 250*c* or 250*c'* may be formed on the end part of the upper or lower surface of the main blade 250*b* of the main blade unit 250 such that the inclined surface has thickness decreasing gradually toward an end thereof.

In the embodiment, an inclined surface 250*c* or 250*c'* is formed on each of the leading edge portion and rear edge portion of the main blade of the main blade unit 250. That is, an upward inclined surface 250*c* may be formed on the rear edge portion of the upper surface of the main blade 250*b* of the main blade unit 250 such that height of the upper surface of the upward inclined surface 250*c* decreases gradually toward an end (a rear end) thereof, and a downward inclined surface 250*c'* may be formed on the leading edge portion of the lower surface of the main blade 250*b* of the main blade unit 250 such that height of the lower surface of the downward inclined surface 250*c'* increases gradually toward an end (a front end) thereof.

Such an inclined surface 250*c* or 250*c'* may facilitate the crushing of food and may function to reduce vortices of liquid and food. That is, when the leading edge portion of the main blade 250*b* of the main blade unit 250 is configured to be sharp as the inclined surface 250*c* or 250*c'*, the blade surface of the main blade may be sharp and easily cut food, and when the rear edge portion of the main blade 250*b* of the main blade unit 250 is configured as the inclined surface 250*c* or 250*c'*, vortices may be prevented or reduced, compared to the rear edge portion of the main blade 250*b* which is configured vertically, so the resistance of the main blade may be reduced, thereby decreasing the load and noise of the motor assembly 600.

In addition, the main blade 250*b* of the main blade unit 250 may be configured to be inclined and thus the leading edge portion may be configured to have a position higher than the rear edge portion. That is, as illustrated in FIG. 19, the leading edge portion (the left end in FIG. 19) of the main blade 250*b* of the main blade unit 250 may be configured to be higher by a predetermined angle β than the rear edge portion thereof (the right end in FIG. 19).

Accordingly, when the leading edge portion of the main blade 250*b* of the main blade unit 250 is configured to be higher by a predetermined angle β than the rear edge portion thereof, food may be pushed downward by the main blade 250*b*, which simultaneously causes the crushing and movement of food, thereby facilitating the mixing of food.

The fact that the leading edge portion of the main blade 250*b* of the main blade unit 250 is configured to be higher by a predetermined angle β than the rear edge portion thereof may mean that the main blade 250*b* is twisted by a twisting angle β relative to a center line crossing the center of the main blade unit 250, and the twisting angle β of the main blade of the main blade unit 250 may be referred to as "an angle of attack".

Figure 22:
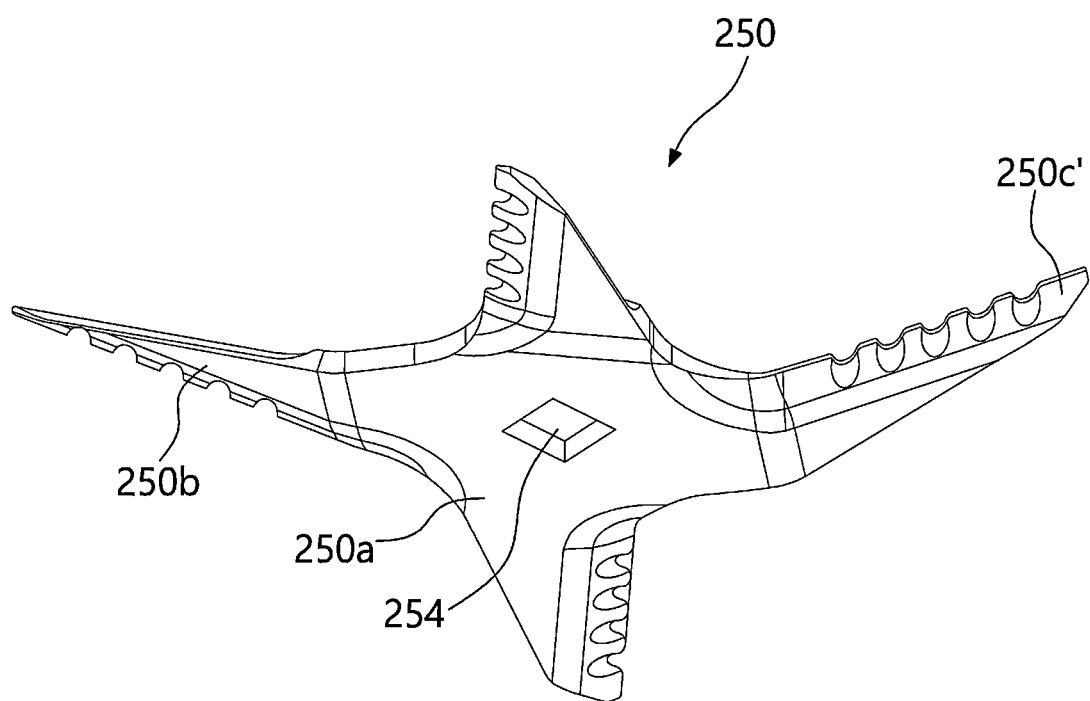
FIG. 22 is a bottom perspective view of the second embodiment of the main blade unit illustrated in FIG. 21.
Figure 23:
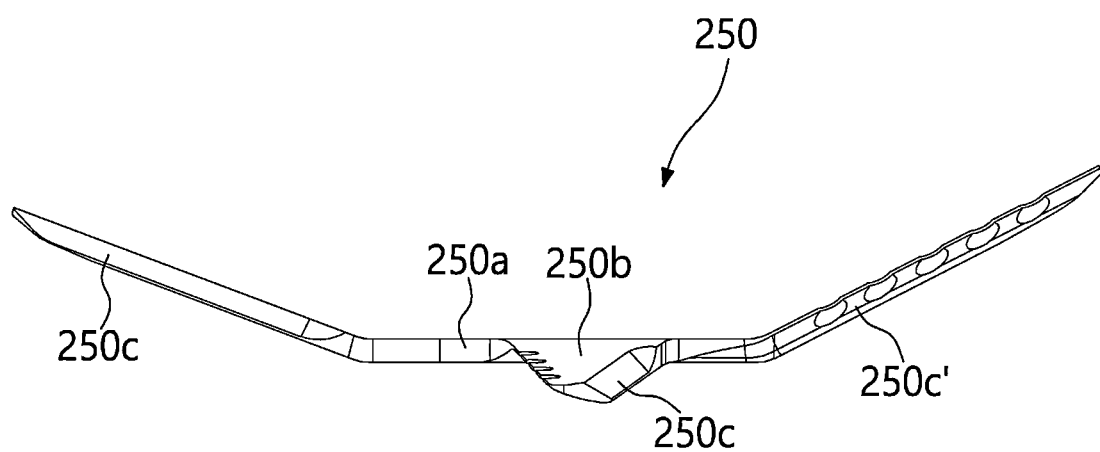
FIG. 23 is a front view of the second embodiment of the main blade unit illustrated in FIG. 21.

FIGS. 20 to 23 illustrate the second embodiment of the configuration of the main blade unit 250. That is, FIGS. 20 and 21 respectively illustrate a top plan view and a top perspective view of the configuration of the main blade unit 250 according to the second embodiment, FIG. 22 illustrates the bottom perspective view of the main blade unit 250 according to the second embodiment, and FIG. 23 illustrates the front view of the main blade unit 250 according to the second embodiment.

As illustrated in these drawings, the leading edge portion or rear edge portion of the blade of the blade unit 250 or 252 may be configured to be corrugated. That is, the leading edge portion or rear edge portion of the main blade 250*b* of the main blade unit 250 may be configured to be corrugated. Furthermore, such a corrugation may be formed on the inclined surface 250*c* or 250*c'*.

In the embodiment, corrugated shapes are formed on the leading edge portion of the main blade 250*b* of the main blade unit 250. These corrugated shapes may be referred to as serrated shapes.

Accordingly, when the leading edge portion of the main blade 250*b* of the main blade unit 250 is corrugated, the area of the blade surface of the main blade in contact with food may be increased, thereby improving the crushing ability of food by the main blade.

The corrugation formed on the leading edge portion of the main blade 250*b* of the main blade unit 250 may be configured to have curvature. That is, as illustrated in the drawings, the corrugated shapes of the main blade 250*b* of the main blade unit 250 may be configured to have convex parts and concave recess having semi-circular shapes (when viewed from above).

Accordingly, when the main blade 250*b* of the main blade unit 250 rotates, food contained in the container body 100 may be held between the concave recesses having the corrugated shapes for a while to be cut, thereby improving the crushing ability of food by the main blade.

Furthermore, such corrugated shapes may be formed on the rear edge portion of the main blade 250*b* of the main blade unit 250. In this case, noise generated during the rotation of the main blade 250*b* of the main blade unit 250 may be reduced. That is, noise may be trapped in furrows (the concave recesses) among multiple corrugated shapes so as not to spread out of the furrows, and noise wavelengths generated in these multiple concave furrows (the concave recesses) may be cancelled out each other by phase differences thereof, and thus noise may be reduced.

In the second embodiment of the main blade unit 250, five corrugated shapes are formed on the main blade 250*b* of the main blade unit 250.

Figure 24:
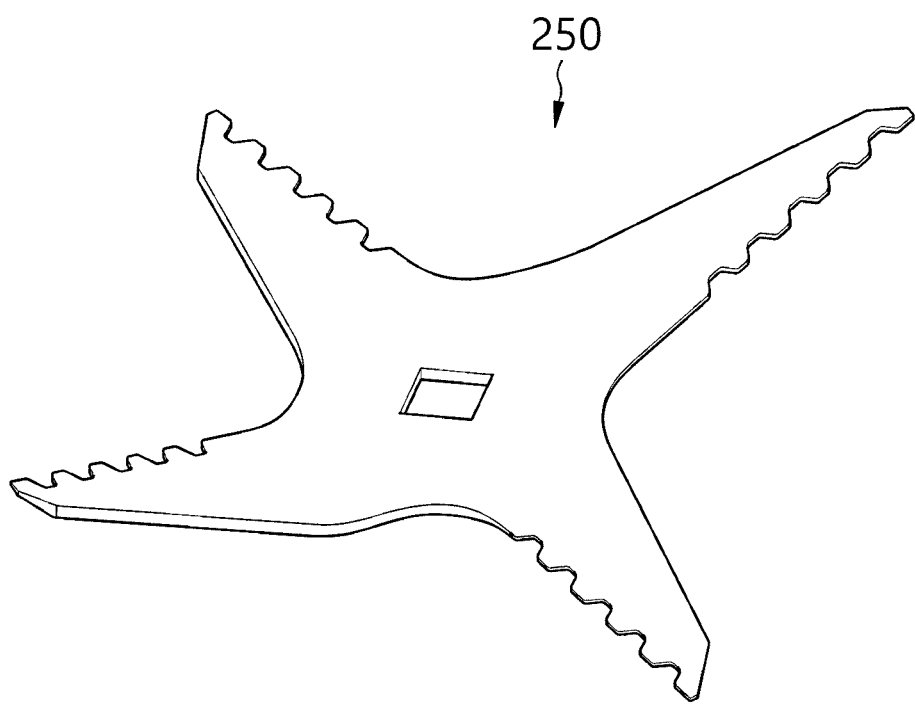
FIG. 24 is a top perspective view illustrating a third embodiment of the configuration of the main blade unit constituting the blender of the present disclosure.
Figure 25:
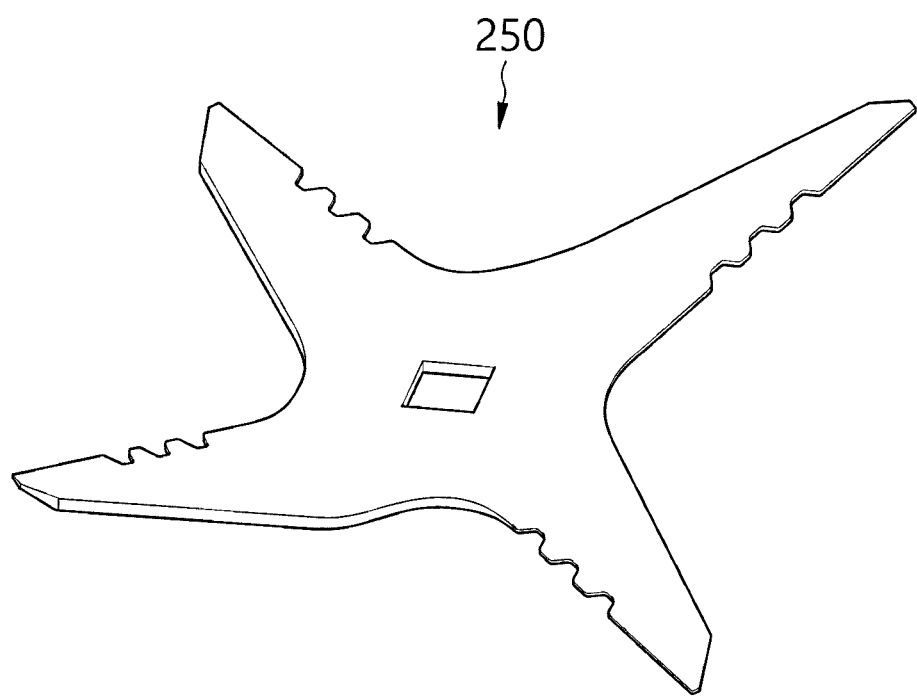
FIG. 25 is a top perspective view illustrating a fourth embodiment of the configuration of the main blade unit constituting the blender of the present disclosure.

FIGS. 24 and 25 respectively illustrate the third and fourth embodiments of the configuration of the main blade unit 250. That is, FIGS. 24 and 25 respectively illustrate the perspective views of the main blade unit 250 according to the third and fourth embodiments.

As illustrated in these drawings, corrugated shapes may be formed on the leading edge portion of the blade of the blade unit 250 or 252. Furthermore, these corrugated shapes may be formed on the inclined surface 250*c* or 250*c'*. The corrugated shapes formed on the main blade 250*b* of the main blade unit 250 may have curvatures or have the shape of sawteeth.

Specifically, four corrugated shapes are formed on the main blade of the main blade unit 250 illustrated in FIG. 24 according to the third embodiment, and three corrugated shapes are formed on the main blade of the main blade unit 250 illustrated in FIG. 25 according to the fourth embodiment.

In the fourth embodiment illustrated in FIG. 25, three corrugated shapes are formed on the main blade, and these corrugated shapes may be formed on the inner side of the main blade. Accordingly, corrugated shapes may not be formed on the outer side (an end portion) of the main blade, and thus the end portion of the main blade may faithfully perform a unique cutting function thereof. That is, the end portion of the main blade may be used to easily cut hard or large materials (food), and the sawtooth-shaped corrugation of the main blade may be used to effectively cut soft materials, thereby improving ability to cut various materials by the main blade.

Figure 26:
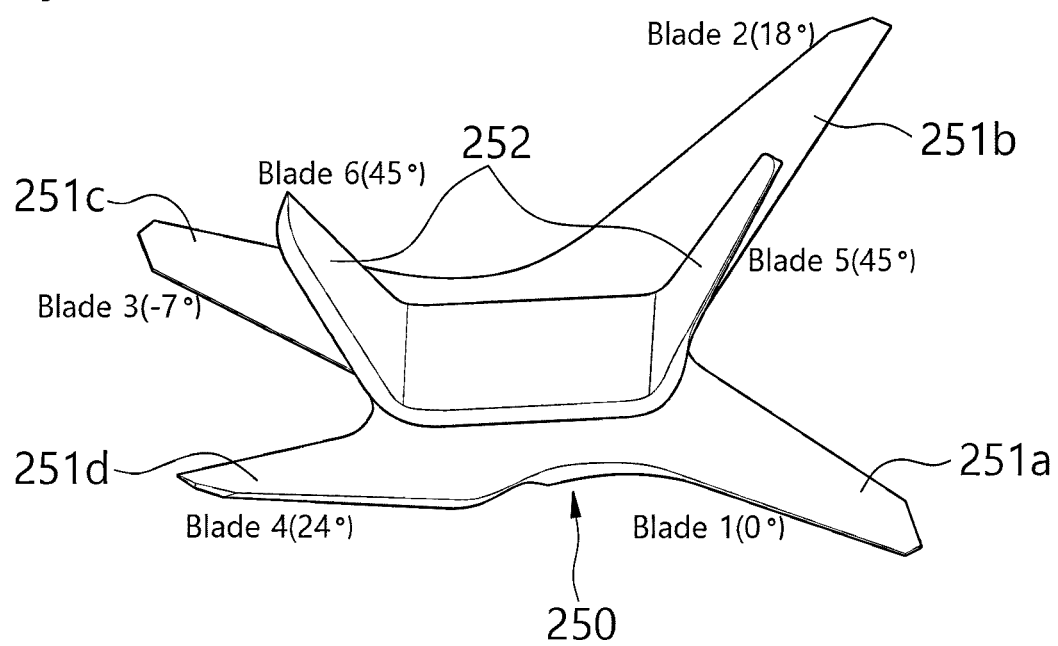
FIG. 26 is the top perspective view of the main blade unit illustrating that the multiple main blades of the main blade unit constituting the blender of the present disclosure have bending angles different from each other.
Figure 27A:
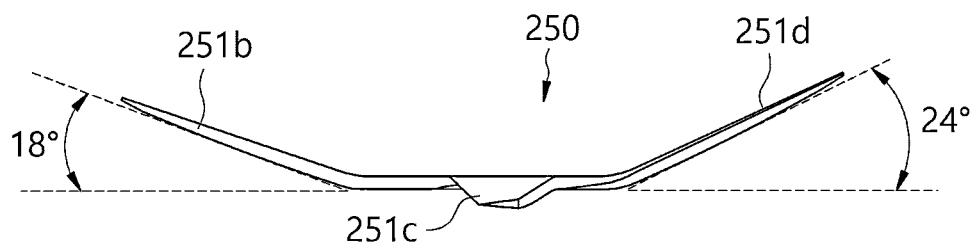
FIGS. 27A and 27B are the front views of the main blade unit illustrated in FIG. 26.
Figure 27B:
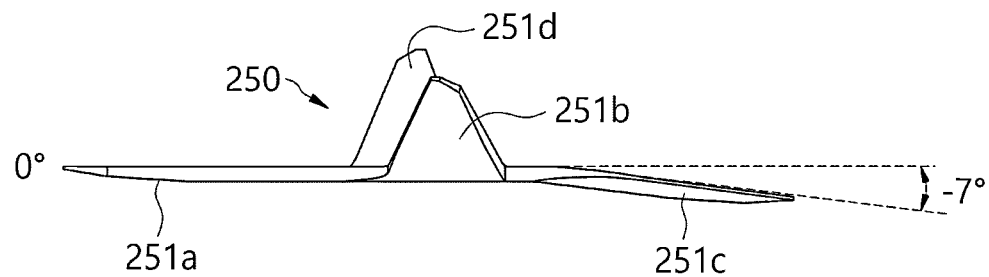
Figure 28:
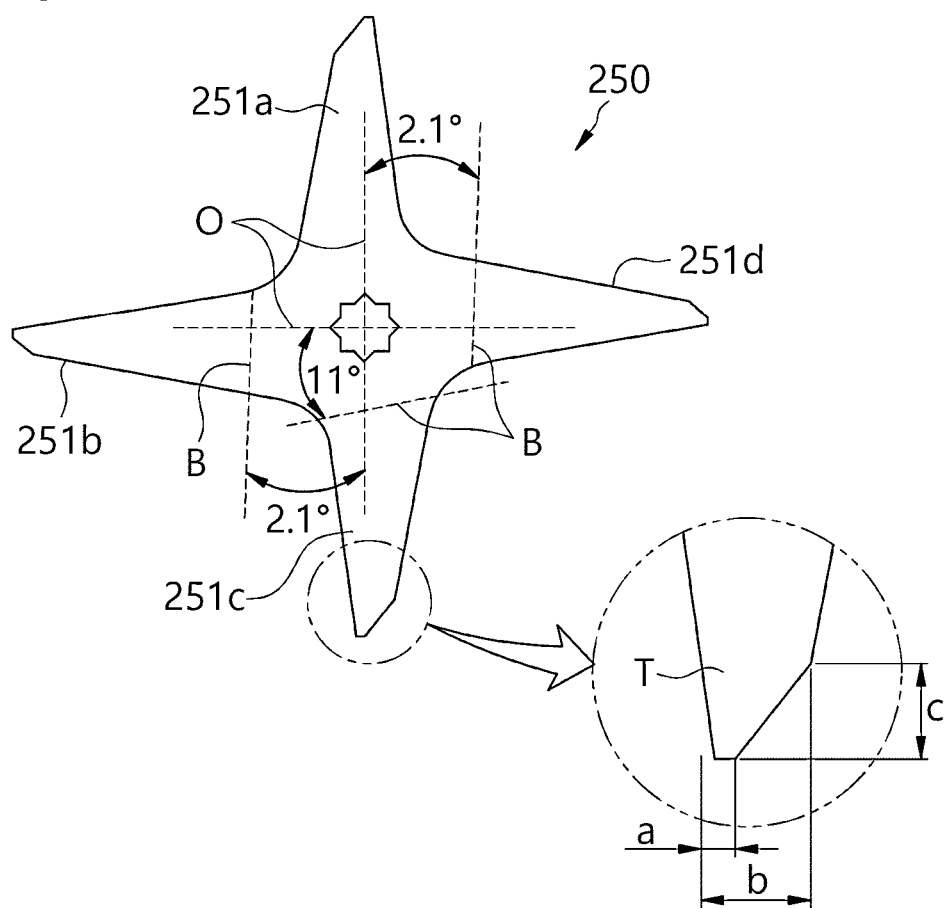
FIG. 28 illustrates a top plan view of the main blade unit illustrated in FIGS. 27A and 27B and an enlarged view of an end portion of the main blade thereof.

FIGS. 26, 27A, 27B, and 28 illustrate views for describing a bending angle α and a twisting angle β formed on the blade constituting the blender according to the embodiment of the present disclosure. That is, FIG. 26 illustrates a perspective view of a basic blade unit constituting the blender according to the embodiment of the present disclosure, FIGS. 27A and 27B illustrate the front views of the main blade unit 250 illustrated in FIG. 26, and FIG. 28 illustrates the top plan view of the main blade unit 250 illustrated in FIGS. 27A and 27B and an enlarged view of an end portion of the main blade thereof.

In the blade units used in the embodiment of the present disclosure, the multiple main blades 250*b* constituting the main blade unit 250 are preferably configured to have bending angles α different from each other and twisting angles β different from each other. More specifically, as illustrated in FIG. 26, four main blades constituting the main blade unit 250 have bending angles α different from each other and the twisting angle β different from each other, and two auxiliary blades 252*b* (Blade 5 and Blade 6) constituting the auxiliary blade unit 252 may be respectively configured to have the same bending angles α and the same twisting angles β or to have different bending angles.

According to the embodiments of the present disclosure, as an example, the main blade unit 250 may have a horizontal blade, an upward blade, and a downward blade. That is, according to the embodiments of the present disclosure, two main blades of the four main blades 250*b* may be configured to be directed upward while facing each other, and another main blade thereof may be configured to be directed downward, and the remaining one main blade thereof may be configured to be horizontal.

Accordingly, the reason in which the four main blades 250*b* is configured to have bending angles α different from each other is to more effectively and evenly cut food contained in the blender. Furthermore, the upward blade is configured to be larger in number than the downward blade in consideration that the blade assembly 200 is normally mounted to the inner bottom surface of the container body 100 of the blender.

In addition, each of the four main blades 250*b* is preferably configured to have a twisting angle β different from each other. This is intended such that during the rotation of a main blade 250b, a vortex generated by a main blade 250b located in front of the main blade 250b is avoided to decrease load and noise. Besides, the bending angle α and twisting angle β of the main blade 250 may be configured to be different from each other so as to generate lift and non-uniform vortices.

Here, as described above, the bending angle α is an angle bent upward or downward by each of the multiple main blades 250b constituting the main blade unit 250. That is, the bending angle α may mean an angle bent upward or downward by the main blade 250b' or 250b" of the main blade unit 250 relative to the main coupling part 250a which is horizontal.

FIG. 27A illustrates an optimal bending angle α of each of a second blade 251b and a fourth blade 251d of the main blade unit 250, and FIG. 27B illustrates an optimal bending angle α of each of a first blade 251a and a third blade 251c of the main blade unit 250.

In addition, the twisting angle β may mean an angle at which each of the multiple blades of the main blade unit 250 is twisted relative to a center line thereof. That is, the twisting angle β may be an angle formed between a bending line B to which the main blade 250b' or 250b" of the main blade unit 250 is bent upward/downward and the center line O. FIG. 28 illustrates the optimal twisting angle β of each blade of the main blade unit 250.

Meanwhile, a blade tip T which is the end part of the main blade unit 250 may be configured as a triangular shape (when viewed from the upper side) as a whole such that food materials are easily cut. Accordingly, as illustrated in FIG. 28, it is preferable that the blade tip T has an end part a of 1 mm, a tip width b of 4.9 mm, and a tip length c of 4.8 mm. Furthermore, each edge of such a blade tip T may be configured to have a streamlined shape or curvature. The numerical values of the blade tip are determined in consideration of the frictional resistance, cutting force, strength, and noise of the blade during the rotation of the blade.

The bending angle α and twisting angle β of each of the main blade unit 250 and the auxiliary blade unit 252 described above may be different and the sizes of the angles may be different. In the blender of the present disclosure, each of the second blade 251b and the fourth blade 251d facing each other is an upward blade directed upward and has the bending angle α and twisting angle β of positive values, and the first blade 251a is a horizontal blade and has a bending angle α and the twisting angle β of zero values. Furthermore, the third blade 251c is a downward blade formed between the upward blades and preferably has a bending angle α of a negative value and the twisting angle β of a positive value. Accordingly, the end part of the third blade 251c may be configured downward to be directed toward the bottom surface of the container body 100.

Each of the multiple main blades of the main blade unit 250 may be configured to have a twisting angle β different from each other. Each of the multiple main blades of the main blade unit 250 preferably has a twisting angle β of a zero or positive value, and may have the same twisting angle β. The auxiliary blades of the auxiliary blade unit 252 may also have the same twisting angles β or twisting angles β different from each other, and more preferably, each of the auxiliary blades of the auxiliary blade unit 252 may have the twisting angle β of a zero or positive value.

In addition, the upward blade is preferably larger in number than the downward blade, and in the blender of the present disclosure, two upward blades such as the second blade 251b and the fourth blade 251d are provided, and one downward blade such as the third blade 251c is provided.

The horizontal blade such as the first blade 251a may faithfully perform a fundamental crushing function, and the upward blades such as the second blade 251b and the fourth blade 251d may generate lift and perform a crushing function, and the downward blade such as the third blade 251c may move and crush food materials at the bottom portion of the container body 100.

These first blade 251a, second blade 251b, third blade 251c, and fourth blade 251d respectively are components corresponding to the main blades 250b described above.

The table below shows objects of an actual test and results thereof to obtain the optimal bending angle α and twisting angle β of each blade. That is, tables 1 to 5 show the specification of each of blades which are objects used in the test, and table 6 shows the test results of the crushing test of dried beans through the objects.

TABLE 1

First object

| Item | First blade | Second blade | Third blade | Fourth blade |
|---|---|---|---|---|
| Bending angle α | 0 | 18 | −4 | 24 |
| Twisting angle β | 0 | 4 | 11 | 0 |
| Blade length(mm) | 40 | 46 | 40 | 46 |

TABLE 2

Second object

| Item | First blade | Second blade | Third blade | Fourth blade |
|---|---|---|---|---|
| Bending angle α | 0 | 24 | −7 | 18 |
| Twisting angle β | 0 | 4.1 | 11 | 4.1 |
| Blade length(mm) | 40 | 46 | 40 | 46 |

TABLE 3

Third object

| Item | First blade | Second blade | Third blade | Fourth blade |
|---|---|---|---|---|
| Bending angle α | 0 | 24 | −7 | 18 |
| Twisting angle β | 0 | 3.1 | 11 | 3.1 |
| Blade length(mm) | 40 | 46 | 40 | 46 |

TABLE 4

Fourth object

| Item | First blade | Second blade | Third blade | Fourth blade |
|---|---|---|---|---|
| Bending angle α | 0 | 24 | −7 | 18 |
| Twisting angle β | 0 | 2.1 | 11 | 2.1 |
| Blade length(mm) | 40 | 46 | 40 | 46 |

TABLE 5

Fifth object

| Item | First blade | Second blade | Third blade | Fourth blade |
|---|---|---|---|---|
| Bending angle α | 0 | 24 | −7 | 18 |
| Twisting angle β | 0 | 1 | 11 | 1 |
| Blade length(mm) | 40 | 46 | 40 | 46 |

TABLE 6

Crushing test results

| Dried bean size | First object | Second object | Third object | Fourth object | Fifth object |
|---|---|---|---|---|---|
| 0 mm | 45.5 | 45.5 | 50.5 | 52.5 | 44.5 |
| 0.125 mm | 18 | 18 | 15 | 19 | 16 |
| 0.25 mm | 45 | 45 | 46 | 49 | 53 |
| 0.5 mm | 27 | 27 | 22 | 22 | 27 |
| 1 mm | 7 | 7 | 5 | 2 | 2 |
| 2 mm | 1 | 1 | 1.5 | 1 | 1 |
| 4 mm | 0 | 0 | 0 | 0 | 0 |
| 0.5 mm or less particle weight (g) | 109 | 109 | 112 | 121 | 114 |

As shown in the test result table, as a result of the crushing test by using dried beans, particles of 0.5 mm or less were produced the most in the fourth object. This means that a cutting force is the best when the fourth object is used.

To summarize these results, among the four blades of the main blade unit, the first blade 251a is a blade which is not bent. That is, the first blade 251a is a blade formed horizontally from the center portion of the main blade unit 250, and accordingly, the bending angle α of the first blade 251a is zero, and the twisting angle β thereof is also zero.

The second blade 251b may be provided at a position of the counterclockwise direction of the first blade 251a, and the upward bending angle α of the second blade 251b may be 18°. Accordingly, the second blade 251b corresponding to the main blade 250b may be configured to be horizontal or to be inclined at an angle of 18° upward relative to the main coupling part 250a which is the center part of the main blade unit 250, and the twisting angle β of the second blade 251b may be 2.1°.

The third blade 251c may be provided at a position of the counterclockwise direction of the second blade 251b, and the bending angle α of the third blade 251c may be -7°. Accordingly, the third blade 251c corresponding to the main blade 250b may be configured to be horizontal or to be inclined at an angle of 7° downward relative to the main coupling part 250a which is the center part of the main blade unit 250, and the twisting angle β of the third blade 251c may be 11°.

The fourth blade 251d may be provided at a position of the counterclockwise direction of the third blade 251c, and the upward bending angle α of the fourth blade 251d may be 24°. Accordingly, the fourth blade 251d corresponding to the main blade 250b may be configured to be horizontal or to be inclined at an angle of 24° upward relative to the main coupling part 250a which is the center part of the main blade unit 250, and the twisting angle β of the fourth blade 251d may be 2.1°.

Accordingly, the first blade 251a, the second blade 251b, the third blade 251c, and the fourth blade 251d which constitute the main blade unit 250 may be configured to be located at the same intervals (about 90°) apart from each other counterclockwise.

As illustrated in the drawings, the auxiliary blade unit 252 may be located between the blades of the main blade unit 250. That is, as illustrated in the drawings, two auxiliary blades constituting the auxiliary blade unit 252 may be located between the first blade 251a and the second blade 251b, and between the third blade 251c and the fourth blade 251d. Additionally, each of the two auxiliary blades is preferably configured to have a bending angle α of 45° or 60° upward. The auxiliary blades of the auxiliary blade unit 252 are mainly for facilitating early cutting of large food materials. Accordingly, each of the auxiliary blades preferably has a large bending angle α such that the auxiliary blade directly faces materials (food) placed on the upper side of the main blade unit 250 and thus may be configured to have the bending angle α of 45° or 60°.

Table 7 shows a test result for obtaining the optimal bending angle of the auxiliary blade of the auxiliary blade unit 252. Here, table 7 shows the result of the test performed by being divided into a case in which bending angles α of a pair of auxiliary blades of the auxiliary blade unit 252 are respectively 45° and 60° and a case in which all of bending angles α of a pair of auxiliary blades of the auxiliary blade unit 252 are 60°.

TABLE 7

Crushing test result table according to the bending angle of the auxiliary blade and the length of the blade

| Bending angle (°) | Blade length (mm) | Average particle diameter |
|---|---|---|
| 45° and 60° | 24(long) | 384 |
| 60° and 60° | 17(shot) | 305 |

As a result of the test, as shown in table 7, when all of the auxiliary blades of the auxiliary blade unit 252 have bending angles α of 60° and the lengths of the auxiliary blades are 17 mm, the average diameter (mm) of a particle may be checked to be relatively small. Accordingly, all of the auxiliary blades of the auxiliary blade unit 252 preferably have bending angles α of 60°.

Figure 29A:
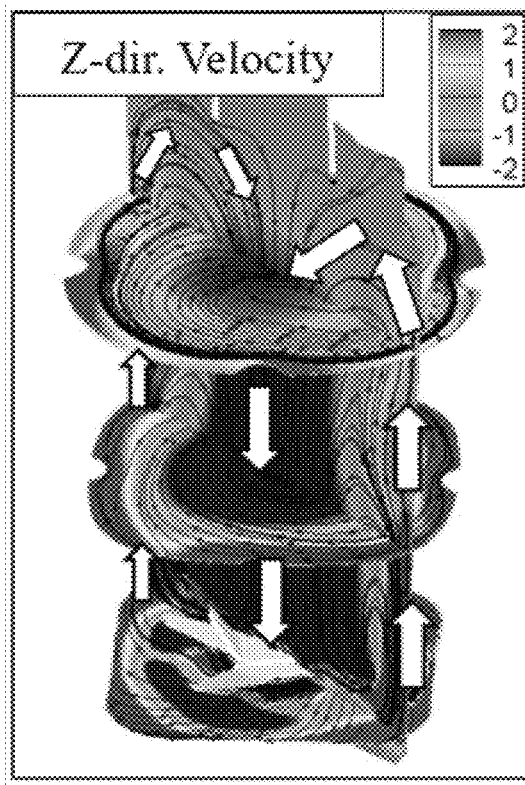
FIGS. 29A, 29B, 29C, and 29D are analysis images illustrating the moving flow of food contained inside the blender generated by the blades of the blade units illustrated in FIG. 26.
Figure 29B:
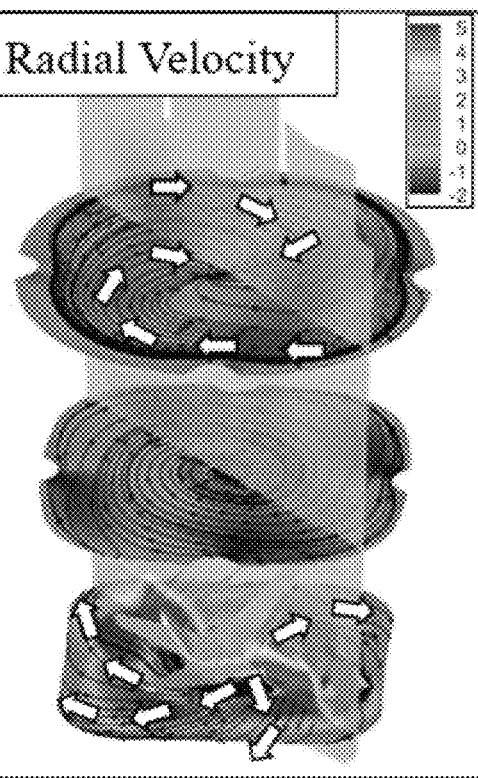
Figure 29C:
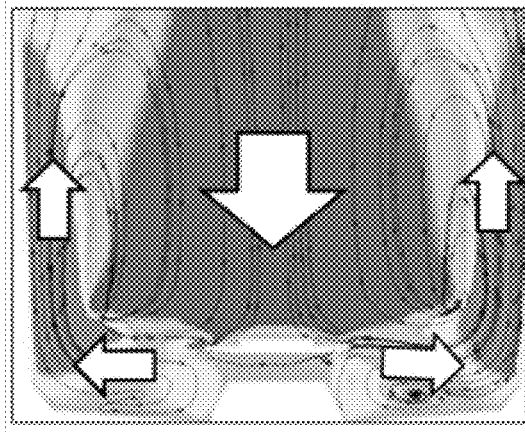
Figure 29D:
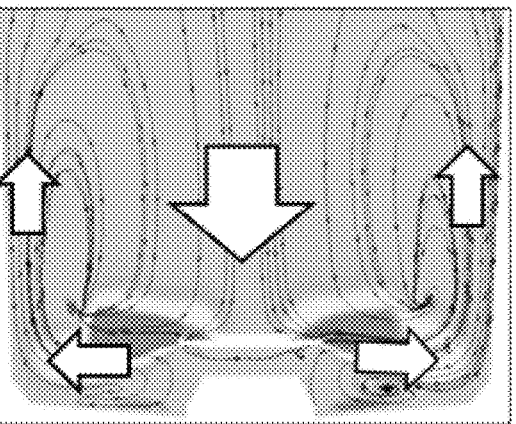
Figure 30:
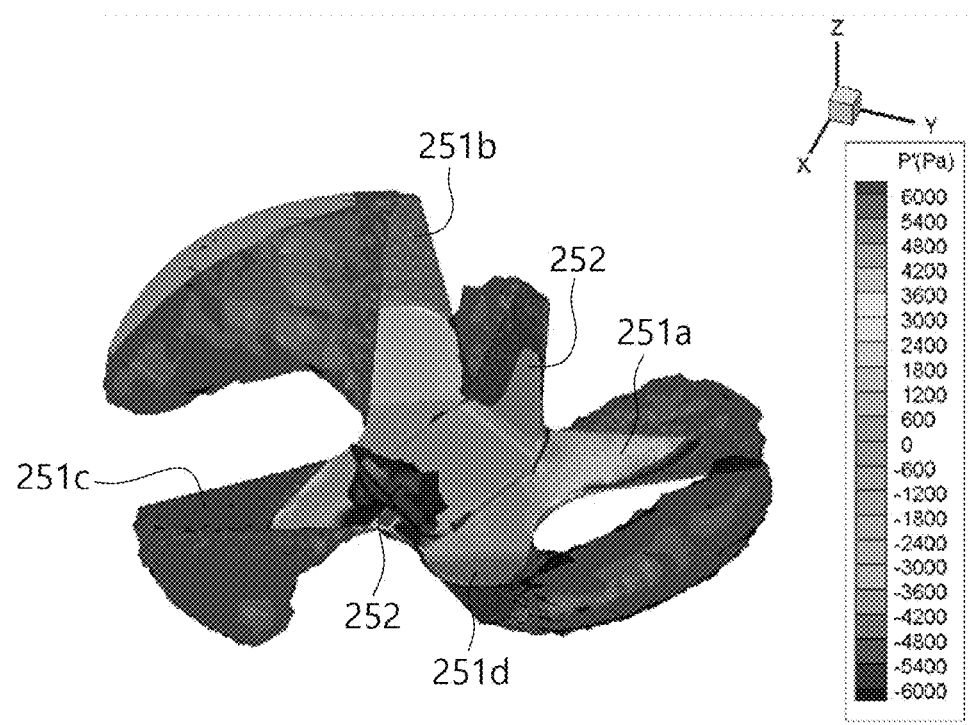
FIG. 30 is an analysis image which embodies the noise source of the blade unit illustrated in FIG. 26.

FIGS. 29A, 29B, 29C, 29D and 30 illustrate the experiment result of the blades having bending angles α different from each other as described above. That is, FIGS. 29A, 29B, 29C, 29D and illustrate the analysis result of the movement of food generated by blades illustrated in FIG. 26. Specifically, FIGS. 29A, 29B, 29C, and 29D illustrate the images of the moving flow of food generated inside the blender, and FIG. 30 illustrates the image of noise sources of the blades.

As illustrated in these drawings, looking at the movement of food in the container body by assuming that the container body of the blender is cut in section, as illustrated in FIGS. 29A and 29B, a velocity field and the moving flow of food in the container body are generated, and as illustrated in FIGS. 29C and 29D, food moving down to the center of the bottom of the container body may meet the blades and scattered to the inner wall surface of the container body, and may meet rib shaped inner guides formed on the inner wall surface of the container body and may move the upper end part of the container body.

As illustrated in FIG. 29A, the food moving upward along the inner wall surface may be collected to a center of the container body at the upper end part thereof and may fall down again. As illustrated in FIG. 29B, food may rotate in a clockwise direction which is the rotating direction of the blades of the blender, and as illustrated in FIG. 29C, food located at the center of the bottom of the container body may scattered to the inner wall surface of the container body, and as illustrated in FIG. 29D, food located at the upper end part of the container body may be collected to the center of the container body from the inner wall surface of the container body.

Meanwhile, in the container body, initially, air and water are evenly distributed, and when blades rotate, a cavitation is generated and disappears in a low pressure part. The size of the cavitation is different according to the bending angle of each of the blades as illustrated in FIG. 30. As illustrated in the drawing, a cavitation is formed the largest at the rear side of each of the second blade 251b and the fourth blade 251d which are bent upward, and a relatively small cavitation is formed at the rear side of each of two auxiliary blades of the auxiliary blade unit 252 located on the main blade unit 250. Furthermore, looking at pressure fluctuation generated on the surface of a blade, a large pressure fluctuation is generated along the curve of the third blade 251c directed downward, which shows that the pressure fluctuation is generated according to the shape of the small cavitation.

Figure 31A:
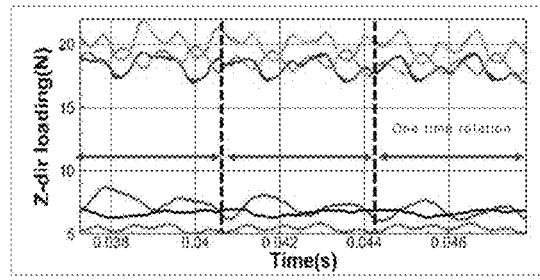
FIGS. 31A, 31B, and 31C are graphs illustrating a load applied to each blade illustrated in FIG. 26.
Figure 31B:
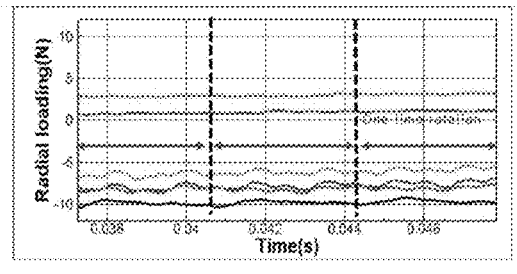
Figure 31C:
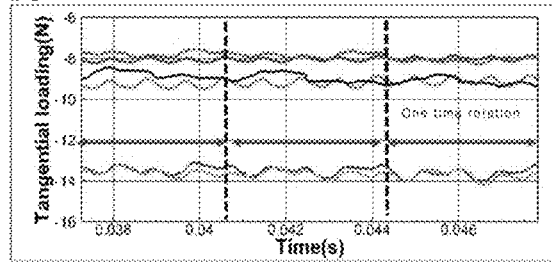

FIGS. 31A, 31B, and 31C illustrate loads applied to six blades illustrated in FIG. 26. That is, in order to extract a noise source, force received by each of the six blades is measured.

As illustrated in the drawings, the load of Z-axis direction may be generated the most under the influence of the movement of food descending from the center, which is one of main movement characteristics. Each data may be data of three time rotation, and when viewing the data of one time rotation, it can be seen that similar movement characteristics are repeated twice. This is because the second blade 251b and the fourth blade 251d which are the upward bending blades of the main blade unit 250 and are loaded the most due to the movement are located to be symmetrical to each other.

In order to detect a cavitation noise source, a cavitation volume generated by each blade may be extracted, and the change rate of the cavitation volume may be calculated and described as the cavitation noise source. When looking at the amount of change by each cavitation volume, the bent blades may have larger changes than the first blade 251a, which is a flat blade. Particularly, cavities may be more generated and disappear by the second blade 251b and the fourth blade 251d than by the other blades. Accordingly, the generation of cavitation noise may be greatly influenced by the second blade 251b and the fourth blade 251d.

FIGS. 32A, 32B, 33A, 33B, 33C, and 33D respectively illustrate main blade units 250 and auxiliary blade units 252 used in analysis and experiment for the measurement of the movement and noise of food.

Figure 32A:
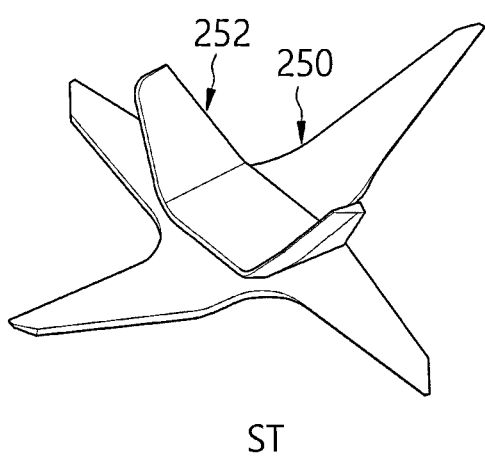
FIGS. 32A and 32B are top perspective views illustrating straight-shaped blades constituting the blender according to the embodiment of the present disclosure.
Figure 32B:
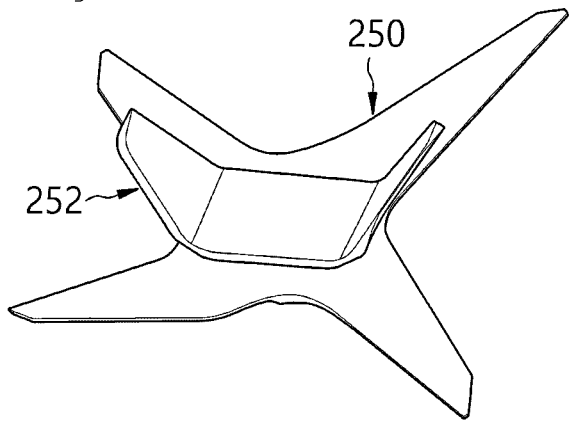

Specifically, FIGS. 32A and 32B illustrate the coupled states of the main blade unit 250 and the auxiliary blade unit 252 to each other which are configured as the shapes of basic blade units. That is, FIG. 32A illustrates a state in which the auxiliary blade unit 252 is coupled to the main blade unit 250 side by side, and FIG. 32B illustrates a state in which the auxiliary blade unit 252 is coupled to the main blade unit 250 such that the blades thereof intersect with each other at 45°.

Figure 33A:
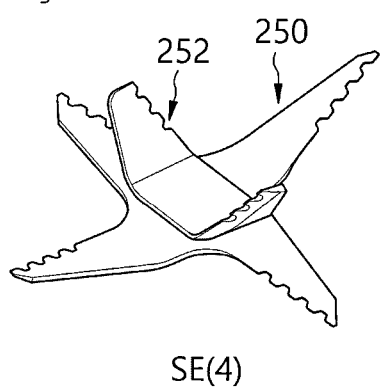
FIGS. 33A, 33B, 33C, and 33D are perspective views illustrating the configurations of multiple blades having corrugated shapes constituting the blender according to the embodiment of the present disclosure.
Figure 33B:
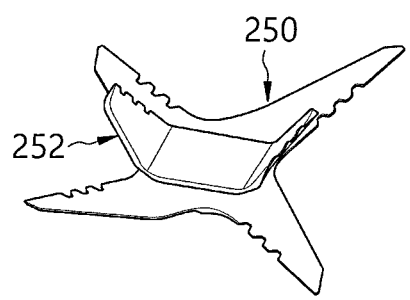
Figure 33C:
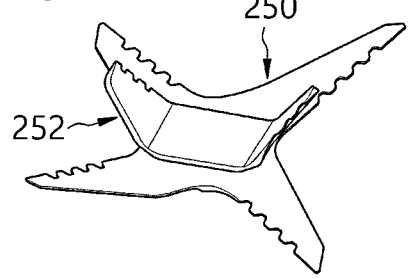
Figure 33D:
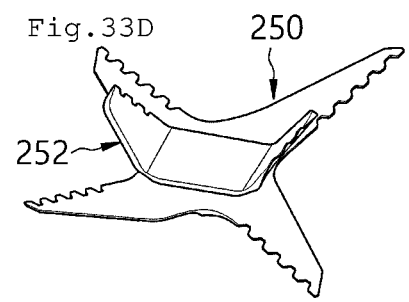

In addition, FIGS. 33A, 33B, 33C, and 33D illustrate the coupled states of the main blade unit 250 and the auxiliary blade unit 252 to each other which have blades corrugated at each leading edge portion of the blades. That is, FIG. 33A illustrates a state in which the auxiliary blade of the auxiliary blade unit 252 having three corrugated shapes formed at the leading edge portion thereof is coupled to the main blade of the main blade unit 250 having four corrugated shapes side by side, FIG. 33B illustrates a state in which the auxiliary blade unit 252 is coupled to the main blade unit 250 such that the auxiliary blade having three corrugated shapes formed at the leading edge portion thereof and the main blade having three corrugated shapes formed on the leading edge portion thereof intersect with each other at 45°, FIG. 33C illustrates a state in which the auxiliary blade unit 252 is coupled to the main blade unit 250 such that the auxiliary blade having three corrugated shapes formed at the leading edge portion thereof and the main blade having four corrugated shapes formed at the leading edge portion thereof intersect with each other at 45°, and FIG. 33D illustrates a state in which the auxiliary blade unit 252 is coupled to the main blade unit 250 such that the auxiliary blade having three corrugated shapes formed on the leading edge portion thereof and the main blade having five corrugated shapes formed on the leading edge portion thereof intersect with each other at 45°.

As for the shape and configuration of each blade used herein, as described as an example above, the main blades constituting the main blade unit 250 may be configured at equal intervals from each other, and may include the horizontal blade, the upward blade, and the downward blade which have bending angles different from each other. That is, the first blade 251a may not be bent to have a bending angle $\alpha$ of 0°, the second blade 251b may have an upward bending angle $\alpha$ of 18°, the third blade 251c may have a downward bending angle $\alpha$ of −7°, and the fourth blade 251d may have an upward bending angle $\alpha$ of 24°.

In addition, all of the auxiliary blades of the auxiliary blade unit 252 may be installed to be directed upward, and more specifically, the auxiliary blades of the auxiliary blade unit 252 may be installed to have upward bending angles of 45° or 60°.

Figure 34:
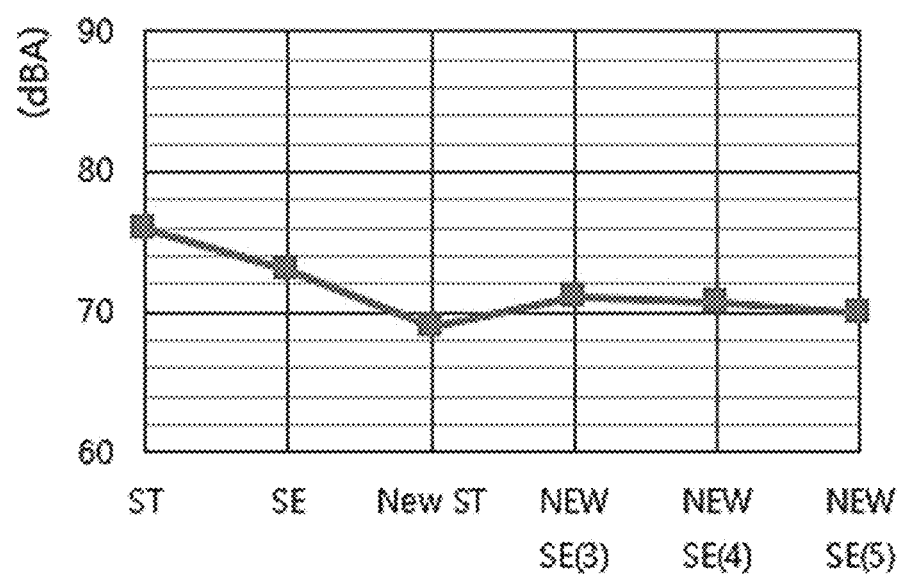
FIG. 34 is an analysis graph illustrating the noise power of each blade illustrated in FIGS. 32A, 32B, 33A, 33B, 33C, and 33D.

The results of analyzing and testing the effects of the noise and load of each of these blades will be described hereinafter. First, FIG. 34 illustrates the analysis result of the value of the noise power of each blade.

Here, "ST" may mean a sample in which the auxiliary blade unit 252 is coupled to the main blade unit 250 side by side while each blade of the blade units has a straight shape having no corrugation as illustrated in FIG. 32A, and "SE" may mean a sample in which the auxiliary blade unit 252 is coupled to the main blade unit 250 side by side while the leading edge portion of each blade of the blade units is corrugated as illustrated in FIG. 33A.

In addition, "NEW" added before ST or SE may mean a blade configured newly in the embodiment of the present disclosure and may mean a sample in which the auxiliary blade unit 252 is coupled to the main blade unit 250 such that the blades thereof intersect with each other at 45°. That is, "NEW ST" may mean that the auxiliary blade unit 252 is coupled to the main blade unit 250 such that the straight blades thereof intersect with each other at 45° as illustrated in FIG. 32B, and "NEW SE" may mean that the auxiliary blade unit 252 is coupled to the main blade unit 250 such that the corrugated blades thereof intersect with each other at 45° as illustrated in FIGS. 33B, 33C, and 33D. Additionally, a numeral marked in a parenthesis next to "NEW SE" indicates the number of corrugated shapes formed on the leading edge portion of the main blade of the main blade unit 250. Accordingly, "NEW SE(3)" indicates FIG. 33B, "NEW SE(4)" indicates FIG. 33C, and "NEW SE(5)" indicates FIG. 33D.

Here, it can be seen that compared to the existing blade, the blade provided in the embodiment of the present disclosure as illustrated in FIGS. 32A and 33A generates less noise as a whole. Particularly, it can be seen that as illustrated in FIG. 33A, as the number of corrugated shapes formed on the leading edge portion of the main blade of the main blade unit 250 increases, cavitation decreases. That is, it is expected that cavitation is further decreased and noise is also decreased when five corrugated shapes having sawtooth shapes are formed on the leading edge portion of the main blade of the main blade unit 250 than when three or four corrugated shapes having sawtooth shapes are formed on the leading edge portion of the main blade of the main blade unit 250. When corrugated shapes having sawtooth shapes are formed on the leading edge portion of the blade, the crushing performance of soft and tough materials (food) by the blade may be improved.

Figure 35:
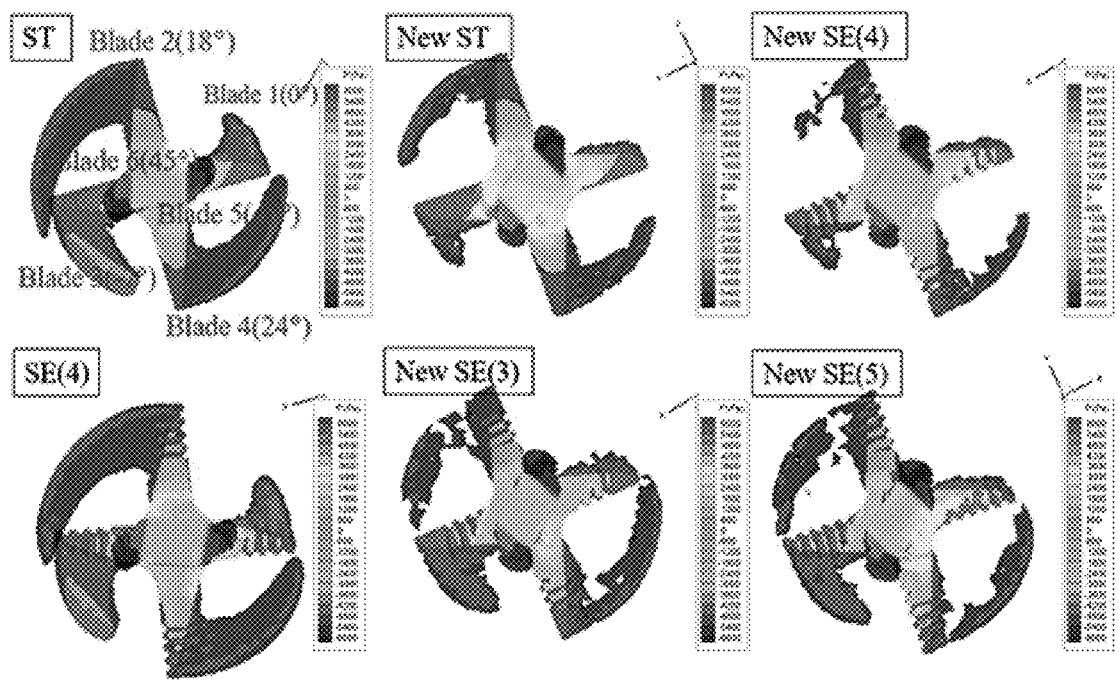
FIG. 35 illustrates analysis result images illustrating the pressure fluctuation and cavitation volume of the surface of each blade illustrated in FIGS. 32A, 32B, 33A, 33B, 33C, and 33D.

FIG. 35 illustrates result images illustrating the pressure fluctuation and cavitation volume of the surface of each blade which is a noise source for each blade of the samples described above. Here, the amount of a vortex and cavitation occurring respectively at the rear and lower side of the main blade of the main blade unit 250 may be decreased, and the shape of the cavitation may appear as a broken shape. In addition, in a corrugated blade having sawtooth shapes rather than a straight blade, cavitation may be broken due to the corrugated shapes of the leading edge portion of the corrugated blade.

Accordingly, in the embodiment of the present disclosure, cavitation may be less generated as a whole and noise may also be less generated in other blades intersecting with each other at 45° than in the blades illustrated in FIGS. 32A and 33A.

Figure 36A:
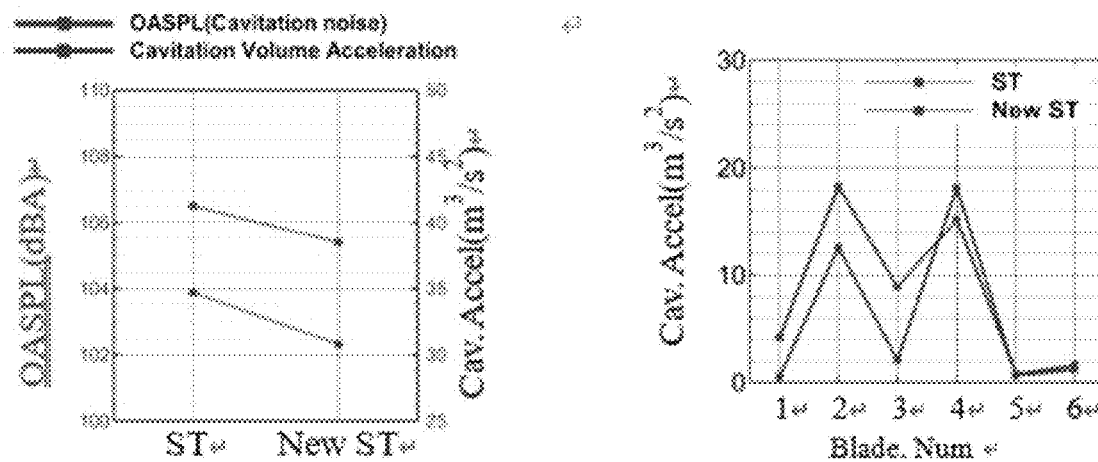
FIGS. 36A and 36B are graphs illustrating the result values of a cavitation noise source and a non-cavitation noise source in straight-shaped blades illustrated in FIGS. 32A and 32B according to the installed angles of the auxiliary blade unit and the main blade unit.
Figure 36B:
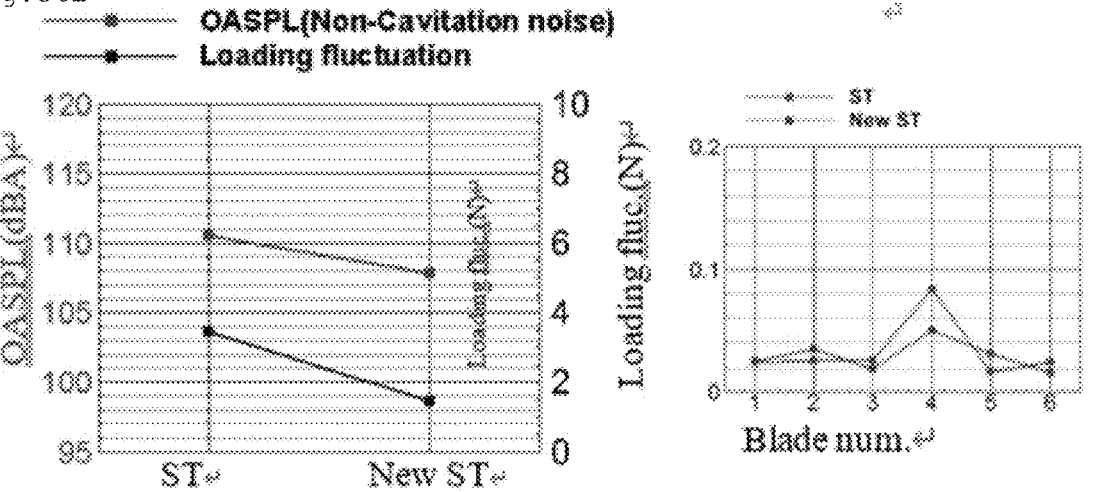

FIGS. 36A and 36B illustrate graphs comparing the result values of a cavitation noise source with the result values of a non-cavitation noise source in straight-shaped blades. As illustrated in the drawings, it can be seen that cavitation noise and non-cavitation noise are decreased in the sample of "New ST" of FIG. 32B than in the sample of "ST" of FIG. 32A. Accordingly, it may be more advantageous to reduce noise when the blade of the auxiliary blade unit 252 and the blade of the main blade unit 250 intersect with each other at 45° as illustrated in FIG. 32B than when the auxiliary blade unit 252 is coupled to the main blade unit 250 such that the blades thereof are arranged side by side as illustrated in FIG. 32A.

Figure 37A:
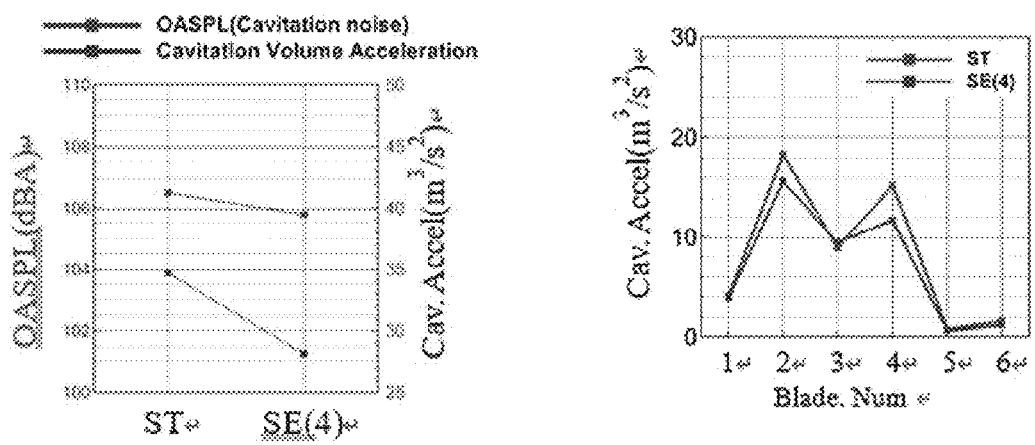
FIGS. 37A and 37B are graphs of result values obtained by comparing the noise source and loading fluctuation of each blade to each other depending on whether corrugation is formed on each of the blades constituting the blender according to the embodiment of the present disclosure.
Figure 37B:
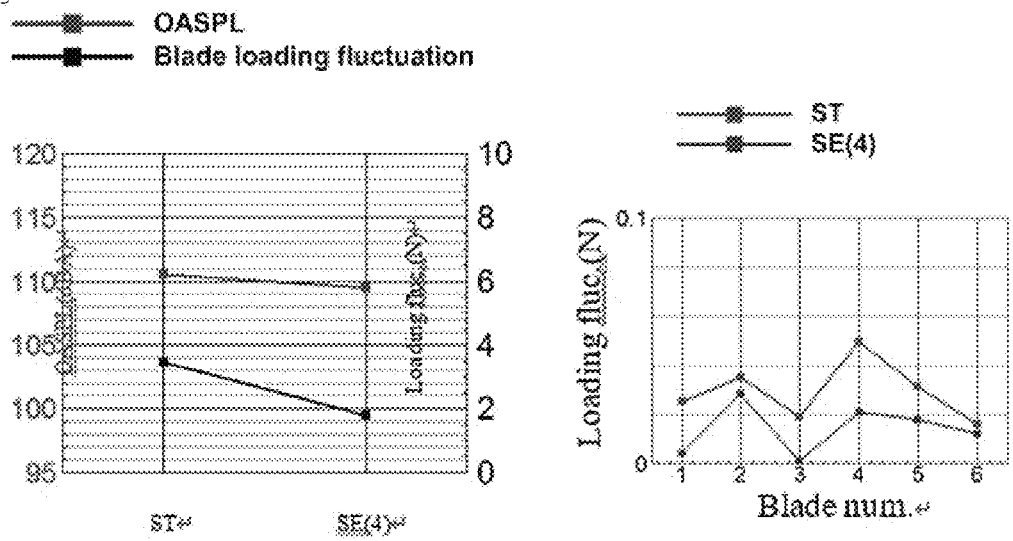

FIGS. 37A and 37B illustrate graphs of result values obtained by comparing the noise source and blade loading fluctuation of a corrugated blade and a straight blade to each other. As illustrated in the drawings, cavitation noise and non-cavitation noise may be more decreased and load applied to the blades may also be decreased as a whole in the blades having corrugation as illustrated in FIGS. 33A, 33B, 33C, and 33D than in the blades having no corrugation as illustrated in FIGS. 32A and 32B.

Figure 38:
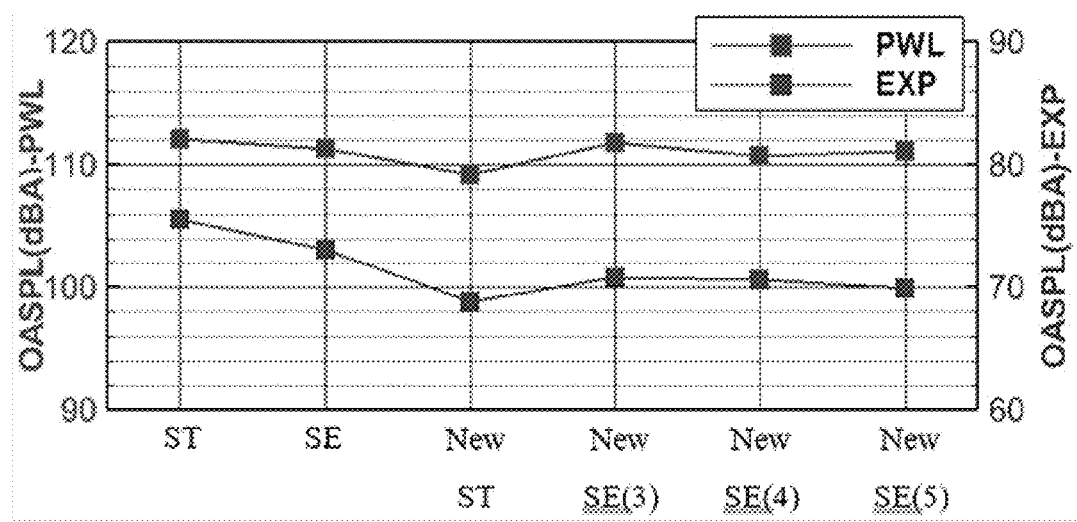
FIG. 38 is a graph comparing analysis values with experimental values for the noise power of each blade illustrated in FIGS. 32A, 32B, 33A, 33B, 33C, and 33D.

FIG. 38 illustrates a graph comparing analysis values with experimental values for the noise power of each component of the present disclosure described above. The experimental values are measured as overall values, and the analysis values are compared with each other and verified by calculating the noise powers. As illustrated in the drawing, except for the minute difference of "New SE(5)" which indicates five corrugated shapes, the analysis values and experimental values correspond to each other as a whole.

The scope of the present disclosure is not limited to the embodiments illustrated above, and many other modifications based on the present disclosure will be possible for those skilled in the art within the scope of the present disclosure.

What is claimed is:

1. A blender comprising:
a container body in which food is received;
a main body to support the container body;
a container lid detachably mountable to an upper surface of the container body to open and close the upper surface of the container body; and
a blade assembly comprising a main blade unit and an auxiliary blade unit to crush food contained in the container body,
wherein main blades of the main blade unit have different bending and twisting angles, respectively, and
wherein an inclined surface having a thickness decreasing gradually toward an edge is formed at a leading and rear edge portion of the main blades, and the leading edge portion of the blades is configured to have a position higher than the rear edge portion of the main blades.

2. The blender of claim 1, wherein the multiple main blades comprise a horizontal blade, an upward blade directed more upward than the horizontal blade, and a downward blade directed more downward than the horizontal blade.

3. The blender of claim 2, wherein the upward blade is larger in number than the downward blade among the multiple main blades.

4. The blender of claim 1, wherein a leading edge portion of a main blade of the multiple main blades has a corrugated shape.

5. The blender of claim 4, wherein the corrugated shape comprises at least three corrugated shapes.

6. The blender of claim 4, wherein the corrugated shape is a shape corresponding to a shape of a sawtooth.

7. The blender of claim 1, wherein the auxiliary blade unit has a size smaller than a size of the main blade unit.

8. The blender of claim 7, wherein an auxiliary blade of the auxiliary blade unit and a main blade of the main blade unit are disposed to intersect with each other.

9. The blender of claim 8, wherein the auxiliary blade of the auxiliary blade unit and the main blade of the main blade unit are disposed to intersect with each other at 45°.

10. The blender of claim 2, wherein the multiple main blades comprise four main blades disposed at equal intervals from each other.

11. The blender of claim 10, wherein the four main blades comprise one horizontal blade, two upward blades, and one downward blade.

12. The blender of claim 11, wherein a bending angle of the two upward blades is 18° and 24°, respectively, with respect to a main coupling part of the main blade unit.

13. The blender of claim 11, wherein a bending angle of the downward blade is −7° with respect to a main coupling part of the main blade unit.

14. The blender of claim 8, wherein the auxiliary blade of the auxiliary blade unit is disposed to be directed upward.

15. The blender of claim 14, wherein the auxiliary blade of the auxiliary blade unit has an upward bending angle of 45° or 60° with respect to an auxiliary coupling part of the auxiliary blade unit.

* * * * *